(12) United States Patent
Murakami et al.

(10) Patent No.: US 10,931,343 B2
(45) Date of Patent: Feb. 23, 2021

(54) TRANSMITTING METHOD, TRANSMITTING DEVICE, RECEIVING METHOD AND RECEIVING DEVICE

(71) Applicant: Panasonic Intellectual Property Corporation of America, Torrance, CA (US)

(72) Inventors: Yutaka Murakami, Kanagawa (JP); Tomohiro Kimura, Osaka (JP); Mikihiro Ouchi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/770,961

(22) PCT Filed: Oct. 25, 2016

(86) PCT No.: PCT/JP2016/004684
§ 371 (c)(1),
(2) Date: Apr. 25, 2018

(87) PCT Pub. No.: WO2017/073048
PCT Pub. Date: May 4, 2017

(65) Prior Publication Data
US 2018/0331741 A1 Nov. 15, 2018

Related U.S. Application Data

(60) Provisional application No. 62/279,176, filed on Jan. 15, 2016, provisional application No. 62/248,411, filed on Oct. 30, 2015.

(30) Foreign Application Priority Data

Sep. 21, 2016 (JP) .................................. 2016-184795

(51) Int. Cl.
*H04B 7/02* (2018.01)
*H01Q 3/26* (2006.01)
(Continued)

(52) U.S. Cl.
CPC ......... *H04B 7/0617* (2013.01); *H04B 7/0408* (2013.01); *H04B 7/061* (2013.01)

(58) Field of Classification Search
CPC ...... H04B 7/02; H04B 7/0408; H04B 7/0413; H04B 7/0613; H04B 7/0617; H04B 7/08; (Continued)

(56) References Cited

U.S. PATENT DOCUMENTS 8,519,888 B2 * 8/2013 Zhang .................. H04B 7/0617 342/372
8,537,737 B2 * 9/2013 Zhang .................. H04B 7/0408 370/312

(Continued)

FOREIGN PATENT DOCUMENTS

JP 2015-523757 8/2015
JP 2015-530018 10/2015
(Continued)

OTHER PUBLICATIONS

International Search Report (ISR) dated Dec. 27, 2016 in International (PCT) Application No. PCT/JP2016/004684.
(Continued)

*Primary Examiner* — Blane J Jackson
(74) *Attorney, Agent, or Firm* — Wenderoth, Lind & Ponack, L.L.P.

(57) ABSTRACT

A transmitting device includes a plurality of transmission antennas, and includes: a signal processor which generates a first baseband signal by modulating data of a first stream, and a second baseband signal by modulating data of a second stream; and a transmitter which generates, from the
(Continued)

first baseband signal, first transmission signals having different directivities, generates, from the second baseband signal, second transmission signals having different directivities, and transmits the first transmission signals and the second transmission signals at a same time.

6 Claims, 36 Drawing Sheets

(51) Int. Cl.
*H04B 7/06* (2006.01)
*H04B 7/0408* (2017.01)

(58) Field of Classification Search
CPC . H04B 7/088; H04B 7/04; H01Q 3/26; H01Q 3/00
See application file for complete search history.

(56) References Cited

U.S. PATENT DOCUMENTS

| | | |
|---|---|---|
| 2012/0220239 A1 | 8/2012 | Hosoya et al. |
| 2013/0286960 A1 | 10/2013 | Li et al. |
| 2014/0050280 A1 | 2/2014 | Stirling-Gallacher et al. |
| 2016/0006122 A1 | 1/2016 | Seol et al. |

FOREIGN PATENT DOCUMENTS

| | | | |
|---|---|---|---|
| WO | 2011/055536 | 5/2011 | |
| WO | 2013/165149 | 11/2013 | |
| WO | WO-2013165149 A1 * | 11/2013 | ........... H04B 7/0617 |
| WO | 2014/021633 | 2/2014 | |

OTHER PUBLICATIONS

Extended European Search Report dated Oct. 1, 2018 in corresponding European Application No. 16859286.3.

* cited by examiner

TRANSMITTING METHOD, TRANSMITTING DEVICE, RECEIVING METHOD AND RECEIVING DEVICE

TECHNICAL FIELD

The present disclosure relates to a transmitting method, a transmitting device, a receiving method, and a receiving device.

BACKGROUND ART

A conventional example of a communication method performed using a plurality of antennas is a communication method called multiple-input multiple-output (MIMO). In multi-antenna communication typified by MIMO, data reception quality and/or a data communication rate (per unit time) can be enhanced by modulating transmission data of a plurality of streams and simultaneously transmitting modulated signals from different antennas using the same frequency (common frequency).

Furthermore, in such multi-antenna communication, an antenna having a quasi-omni pattern which allows a transmitting device to have a substantially constant antenna gain in various directions in a space may be used when multicast/broadcast communication is performed. For example, Patent Literature (PTL) 1 discloses that a transmitting device transmits a modulated signal using an antenna having a quasi-omni pattern.

CITATION LIST

Patent Literature

PTL 1: WO2011/055536

SUMMARY OF THE INVENTION

Technical Problems

There is a demand for further improvement in performance achieved according to a communication method performed using a plurality of antennas.

Solutions to Problems

A transmitting device according to an aspect of the present disclosure is a transmitting device which includes a plurality of transmission antennas, the transmitting device including: a signal processor which generates a first baseband signal by modulating data of a first stream, and a second baseband signal by modulating data of a second stream; and a transmitter which generates, from the first baseband signal, a plurality of first transmission signals having different directivities, generates, from the second baseband signal, a plurality of second transmission signals having different directivities, and transmits the plurality of first transmission signals and the plurality of second transmission signals at a same time.

Advantageous Effects of Invention

According to the present disclosure, performance achieved according to a communication method performed using a plurality of antennas can be improved.

DESCRIPTION OF EXEMPLARY EMBODIMENTS

Embodiment 1

Figure 1:
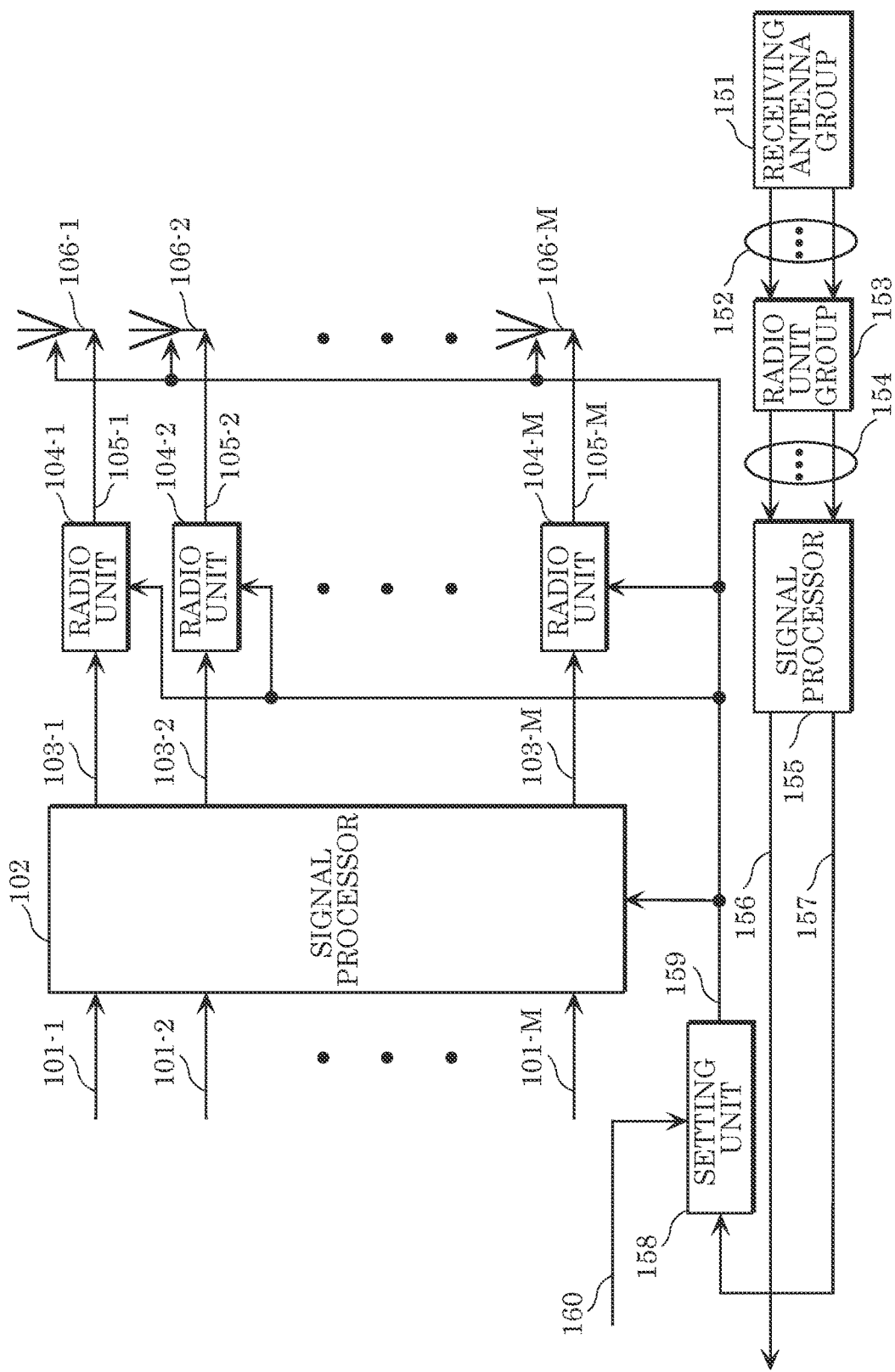
FIG. 1 is a diagram illustrating an example of a configuration of a base station.

FIG. 1 illustrates an example of a configuration of a base station (or an access point, for instance) in the present embodiment.

101-1 denotes #1 information, 101-2 denotes #2 information, ..., and 101-M denotes #M information. 101-$i$ denotes #i information, where i is an integer of 1 or greater and M or smaller. Note that M is an integer greater than or equal to 2. Note that not all the information items from #1 information to #M information are necessarily present.

Signal processor 102 receives inputs of #1 information 101-1, #2 information (101-2), ..., #M information 101-M, and control signal 159. Signal processor 102 performs signal processing based on information included in control signal 159 such as "information on a method of error correction coding (a coding rate, a code length (block length))", "information on a modulation method", "information on precoding", "a transmitting method (multiplexing method)", "whether to perform transmission for multicasting or transmission for unicasting (transmission for multicasting and transmission for unicasting may be carried out simultaneously)", "the number of transmission streams when multicasting is performed", and "a transmitting method performed when transmitting a modulated signal for multicasting (this point will be later described in detail)", and outputs signal 103-1 obtained as a result of the signal processing, signal 103-2 obtained as a result of the signal processing, ..., and signal 103-M obtained as a result of the signal processing, that is, signal 103-$i$ obtained as a result of the signal processing. Note that not all the signals from signal #1 obtained as a result of the signal processing to signal #M obtained as a result of the signal processing are necessarily present.

At this time, signal processor 102 performs error correction coding on #i information 101-$i$, and thereafter maps resultant information according to a modulation method which has been set, thus obtaining a baseband signal.

Signal processor 102 collects baseband signals corresponding to information items, and precodes the baseband signals. For example, orthogonal frequency division multiplexing (OFDM) may be applied.

Radio unit 104-1 receives inputs of signal 103-1 obtained as a result of the signal processing and control signal 159. Radio unit 104-1 performs processing such as band limiting, frequency conversion, and amplification, based on control signal 159, and outputs transmission signal 105-1. Then, transmission signal 105-1 is output as a radio wave from antenna unit 106-1.

Similarly, radio unit 104-2 receives inputs of signal 103-2 obtained as a result of the signal processing and control signal 159. Radio unit 104-2 performs processing such as band limiting, frequency conversion, and amplification, based on control signal 159, and outputs transmission signal 105-2. Then, transmission signal 105-2 is output as a radio wave from antenna unit 106-2. A description of radio unit 104-3 to radio unit 104-M−1 is omitted.

Radio unit 104-M receives inputs of signal 103-M obtained as a result of the signal processing and control signal 159. Radio unit 104-M performs processing such as band limiting, frequency conversion, and amplification, based on control signal 159, and outputs transmission signal 105-M. Then, transmission signal 105-M is output as a radio wave from antenna unit 106-M.

Note that the radio units may not perform the above processing when a signal obtained as a result of the signal processing is not present.

Radio unit group 153 receives inputs of received signal group 152 received by receiving antenna group 151. Radio unit group 153 performs processing such as frequency conversion and outputs baseband signal group 154.

Signal processor 155 receives an input of baseband signal group 154, and performs demodulation and error correction decoding, and thus also performs processing such as time synchronization, frequency synchronization, and channel estimation. At this time, signal processor 155 receives modulated signals transmitted by one or more terminals and performs processing, and thus obtains data transmitted by the one or more terminals and control information transmitted by the one or more terminals. Accordingly, signal processor 155 outputs data group 156 corresponding to the one or more terminals, and control information group 157 corresponding to the one or more terminals.

Setting unit 158 receives inputs of control information group 157 and setting signal 160. Setting unit 158 determines, based on control information group 157, "a method of error correction coding (a coding rate, a code length (block length))", "a modulation method", "a precoding method", "a transmitting method", "antenna settings", "whether to perform transmission for multicasting or transmission for unicasting (transmission for multicasting and transmission for unicasting may be carried out simultaneously)", "the number of transmission streams when multicasting is performed", and "a transmitting method performed when transmitting a modulated signal for multicasting, for instance, and outputs control signal 159 that includes such information items determined.

Antenna units 106-1, 106-2, ..., and 106-M each receive an input of control signal 159. The operation at this time is to be described with reference to FIG. 2.

Figure 2:
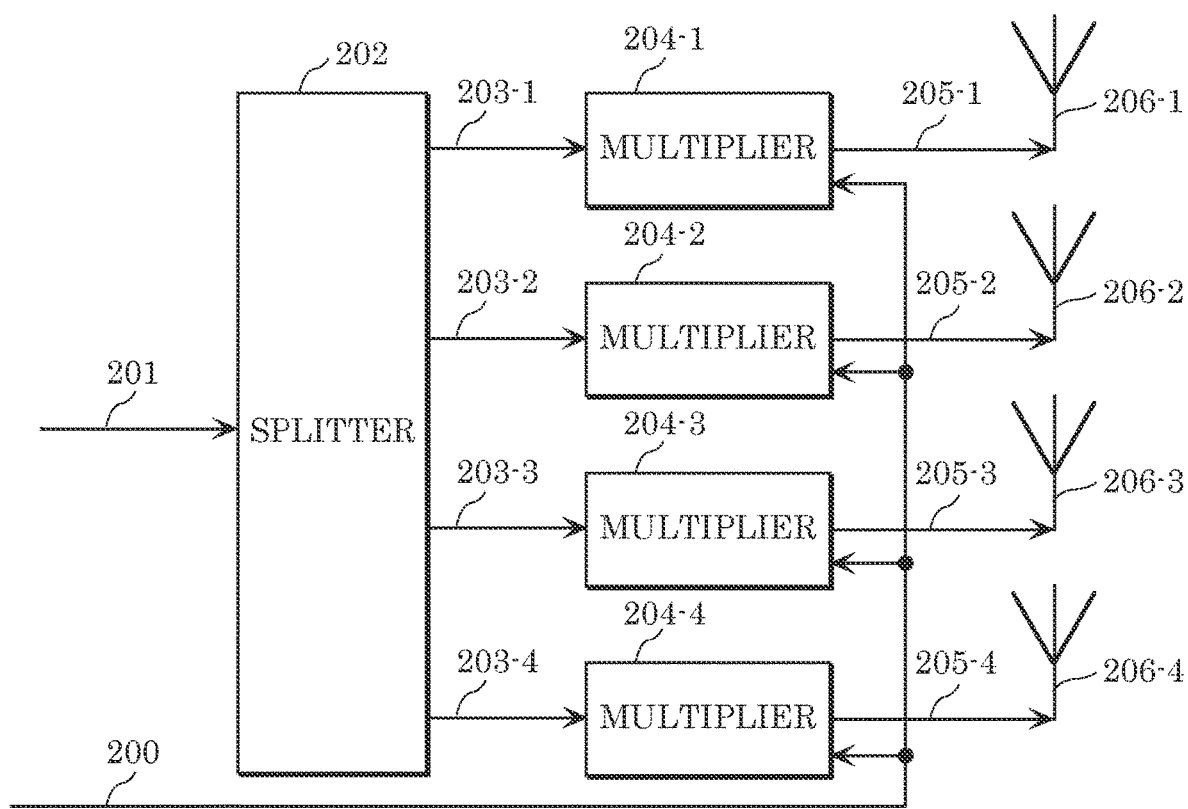
FIG. 2 is a diagram illustrating an example of a configuration of an antenna unit of the base station.

FIG. 2 illustrates an example of a configuration of antenna units 106-1, 106-2, ..., and 106-M. Each antenna unit includes a plurality of antennas, as illustrated in FIG. 2. Note that FIG. 2 illustrates four antennas, yet each antenna unit may include at least two antennas. Note that the number of antennas is not limited to 4.

FIG. 2 illustrates a configuration of antenna unit 106-$i$, where i is an integer of 1 or greater and M or smaller.

Splitter 202 receives an input of transmission signal 201 (corresponding to transmission signal 105-$i$ in FIG. 1). Splitter 202 splits transmission signal 201, and outputs signals 203-1, 203-2, 203-3, and 203-4.

Multiplier 204-1 receives inputs of signal 203-1 and control signal 200 (corresponding to control signal 159 in FIG. 1). Multiplier 204-1 multiplies signal 203-1 by coefficient W1, based on information on a multiplication coefficient included in control signal 200, and outputs signal 205-1 obtained as a result of the multiplication. Note that coefficient W1 can be defined by a complex number. Accordingly, W1 can also be a real number. Thus, if signal 203-1 is v1(t), signal 205-1 obtained as a result of the multiplication can be expressed by W1×v1(t) (t denotes time). Then, signal 205-1 obtained as a result of the multiplication is output as a radio wave from antenna 206-1.

Similarly, multiplier 204-2 receives inputs of signal 203-2 and control signal 200. Multiplier 204-2 multiplies signal 203-2 by coefficient W2, based on information on a multiplication coefficient included in control signal 200, and outputs signal 205-2 obtained as a result of the multiplication. Note that coefficient W2 can be defined by a complex number. Accordingly, W2 can also be a real number. Thus, if signal 203-2 is v2(t), signal 205-2 obtained as a result of the multiplication can be expressed by W2×v2(t) (t denotes time). Then, signal 205-2 obtained as a result of the multiplication is output as a radio wave from antenna 206-2.

Multiplier 204-3 receives inputs of signal 203-3 and control signal 200. Multiplier 204-3 multiplies signal 203-3 by coefficient W3, based on information on a multiplication coefficient included in control signal 200, and outputs signal 205-3 obtained as a result of the multiplication. Note that coefficient W3 can be defined by a complex number. Accordingly, W3 can also be a real number. Thus, if signal 203-3 is expressed by v3(t), signal 205-3 obtained as a result of the multiplication can be expressed by W3×v3(t) (t denotes time). Then, signal 205-3 obtained as a result of the multiplication is output as a radio wave from antenna 206-3.

Multiplier 204-4 receives inputs of signal 203-4 and control signal 200. Multiplier 204-2 multiplies signal 203-4 by coefficient W4, based on information on a multiplication coefficient included in control signal 200, and outputs signal 205-4 obtained as a result of the multiplication. Note that coefficient W4 can be defined by a complex number. Accordingly, W4 can also be a real number. Thus, if signal 203-4 is v4(t), signal 205-4 obtained as a result of the multiplication can be expressed by W4×v4(t) (t denotes time). Then, signal 205-4 obtained as a result of the multiplication is output as a radio wave from antenna 206-4.

Note that the absolute value of W1, the absolute value of W2, the absolute value of W3, and the absolute value of W4 may be equal to one another.

Figure 3:
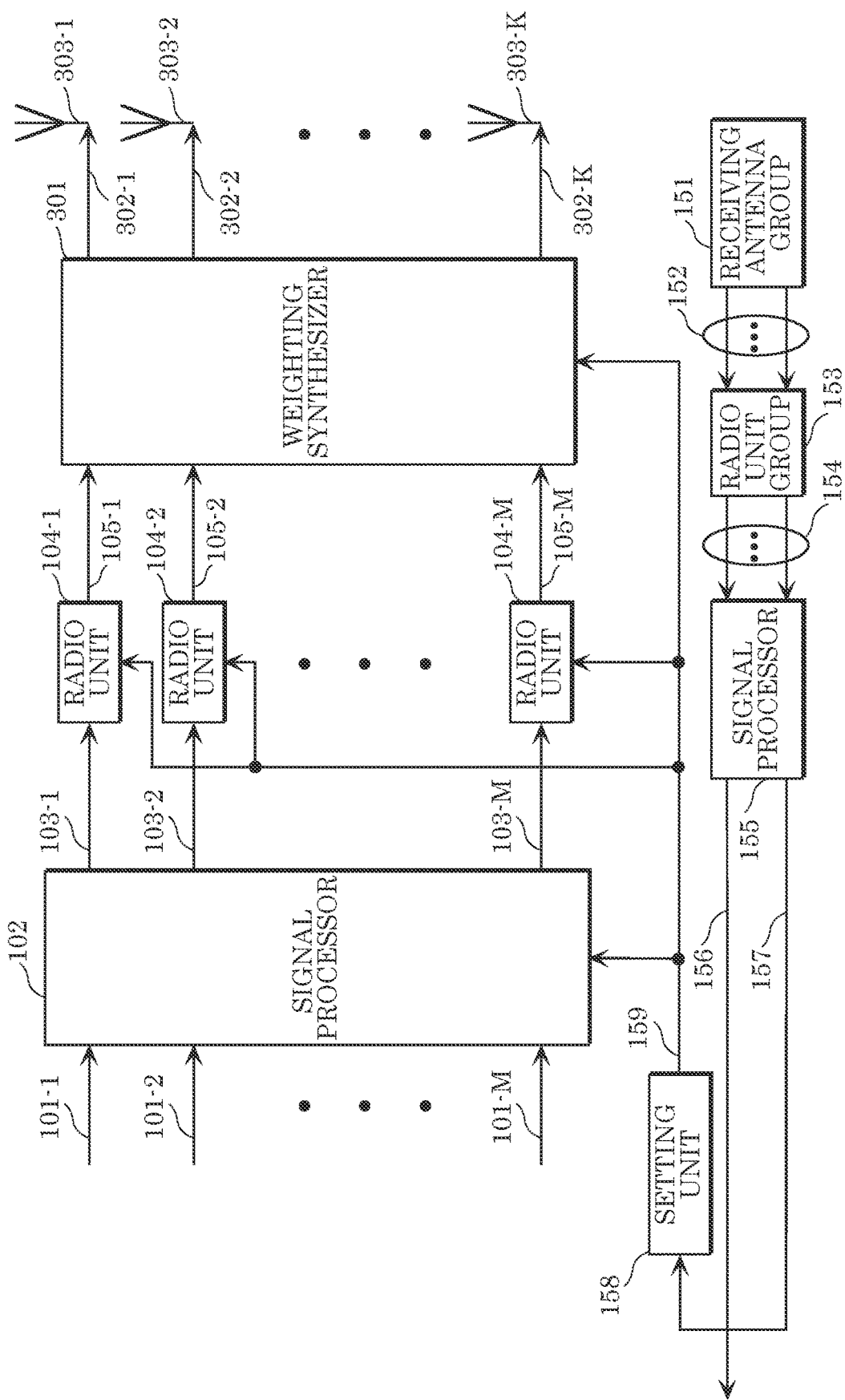
FIG. 3 is a diagram illustrating an example of a configuration of the base station.

FIG. 3 illustrates a configuration of the base station different from the configuration of the base station in FIG. 1 in the present embodiment. In FIG. 3, the same reference numerals are assigned to elements which operate in the same manner as those in FIG. 1, and a description thereof is omitted below.

Weighting synthesizer 301 receives inputs of modulated signal 105-1, modulated signal 105-2, . . . , modulated signal 105-M, and control signal 159. Then, weighting synthesizer 301 weighting synthesizes modulated signal 105-1, modulated signal 105-2, . . . , and modulated signal 105-M, based on information on weighting synthesis included in control signal 159, and outputs signals 302-1, 302-2, . . . , and 302-K obtained as a result of the weighting synthesis. K is an integer of 1 or greater. Signal 302-1 obtained as a result of the weighting synthesis is output as a radio wave from antenna 303-1, signal 302-2 obtained as a result of the weighting synthesis is output as a radio wave from antenna 303-2, . . . , and signal 302-K obtained as a result of the weighting synthesis is output as a radio wave from antenna 303-K.

Signal $y_i(t)$ 302-$i$ (i is an integer of 1 or greater and K or smaller) obtained as a result of the weighting synthesis is expressed as follows (t denotes time).

[Math 1]
$$y_i(t) = A_{i1} \times x_1(t) + A_{i2} \times x_2(t) + \ldots + A_{iM} \times x_M(t) \quad \text{Expression (1)}$$
$$= \sum_{j=1}^{M} A_{ij} \times x_j(t)$$

Note that in Expression (1), $A_{ij}$ is a value which can be defined by a complex number. Accordingly, $A_{ij}$ can also be a real number, and $x_j(t)$ is modulated signal 105-$j$, where j is an integer of 1 or greater and M or smaller.

Figure 4:
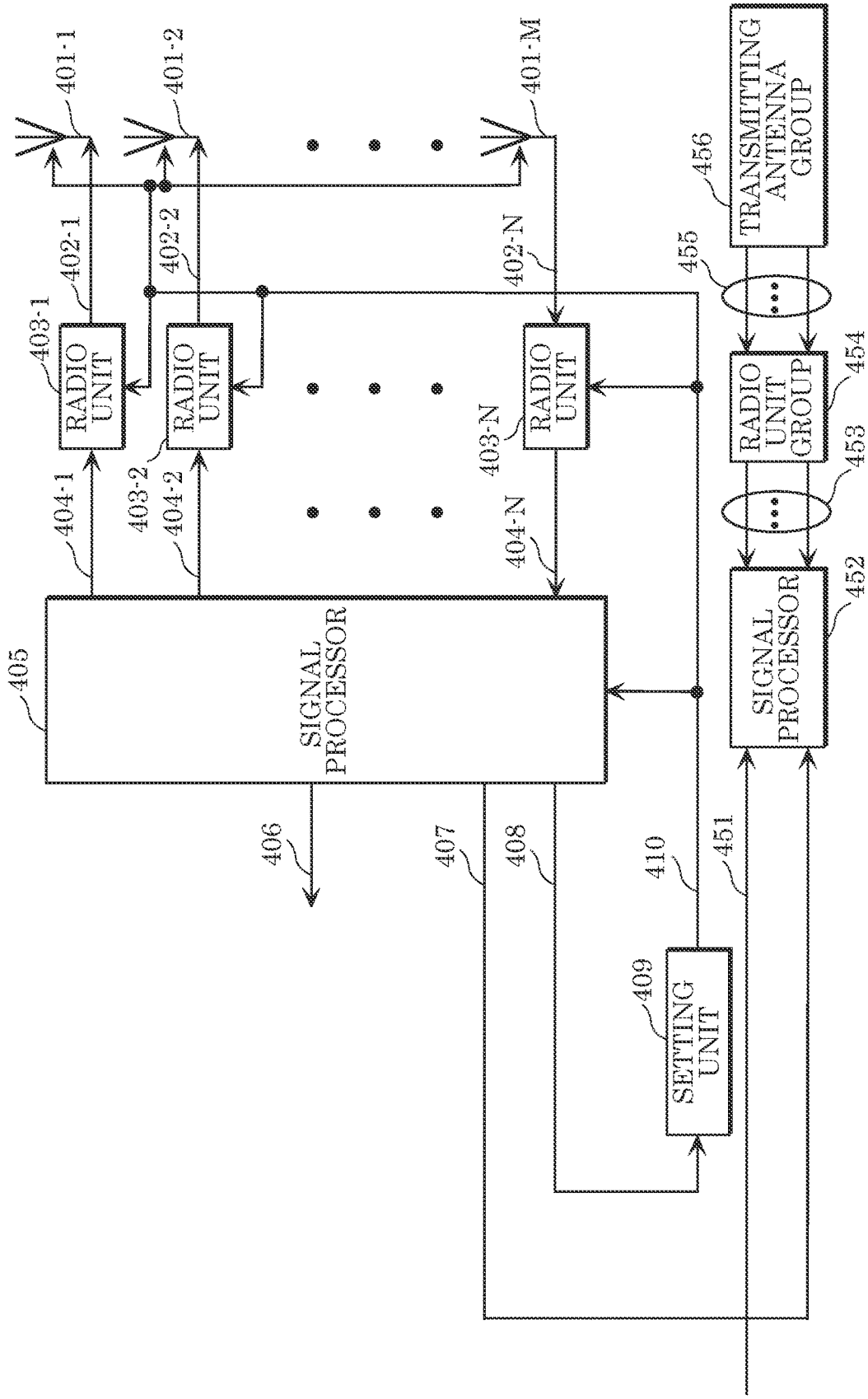
FIG. 4 is a diagram illustrating an example of a configuration of a terminal.

FIG. 4 illustrates an example of a configuration of a terminal. Antenna units 401-1, 401-2, . . . , and 401-N each receive an input of control signal 410, where N is an integer of 1 or greater.

Radio unit 403-1 receives inputs of received signal 402-1 received by antenna unit 401-1 and control signal 410. Based on control signal 410, radio unit 403-1 performs processing such as frequency conversion on received signal 402-1, and outputs baseband signal 404-1.

Similarly, radio unit 403-2 receives inputs of received signal 402-2 received by antenna unit 401-2 and control signal 410. Based on control signal 410, radio unit 403-2 performs processing such as frequency conversion on received signal 402-2, and outputs baseband signal 404-2. Note that a description of radio units 403-3 to 403-N−1 is omitted.

Radio unit 403-N receives inputs of received signal 402-N received by antenna unit 401-N and control signal 410. Based on control signal 410, radio unit 403-N performs processing such as frequency conversion on received signal 402-N, and outputs baseband signal 404-N.

Note that not all of radio units 403-1, 403-2, . . . , and 403-N may operate. Accordingly, not all of baseband signals 404-1, 404-2, . . . , and 404-N are necessarily present.

Signal processor 405 receives inputs of baseband signals 404-1, 404-2, . . . , 404-N, and control signal 410. Based on control signal 410, signal processor 405 performs demodulation and error correction decoding processing, and outputs data 406, control information 407 for transmission, and control information 408. Specifically, signal processor 405 also performs processing such as time synchronization, frequency synchronization, and channel estimation.

Setting unit 409 receives an input of control information 408. Setting unit 409 performs setting with regard to a receiving method, and outputs control signal 410.

Signal processor 452 receives inputs of information 451 and control information 407 for transmission. Signal processor 452 performs processing such as error correction coding and mapping according to a modulation method which has been set, and outputs baseband signal group 453.

Radio unit group 454 receives an input of baseband signal group 453. Radio unit group 454 performs processing such as band limiting, frequency conversion, and amplification, and outputs transmission signal group 455. Transmission signal group 455 is output as a radio wave from transmitting antenna group 456.

Figure 5:
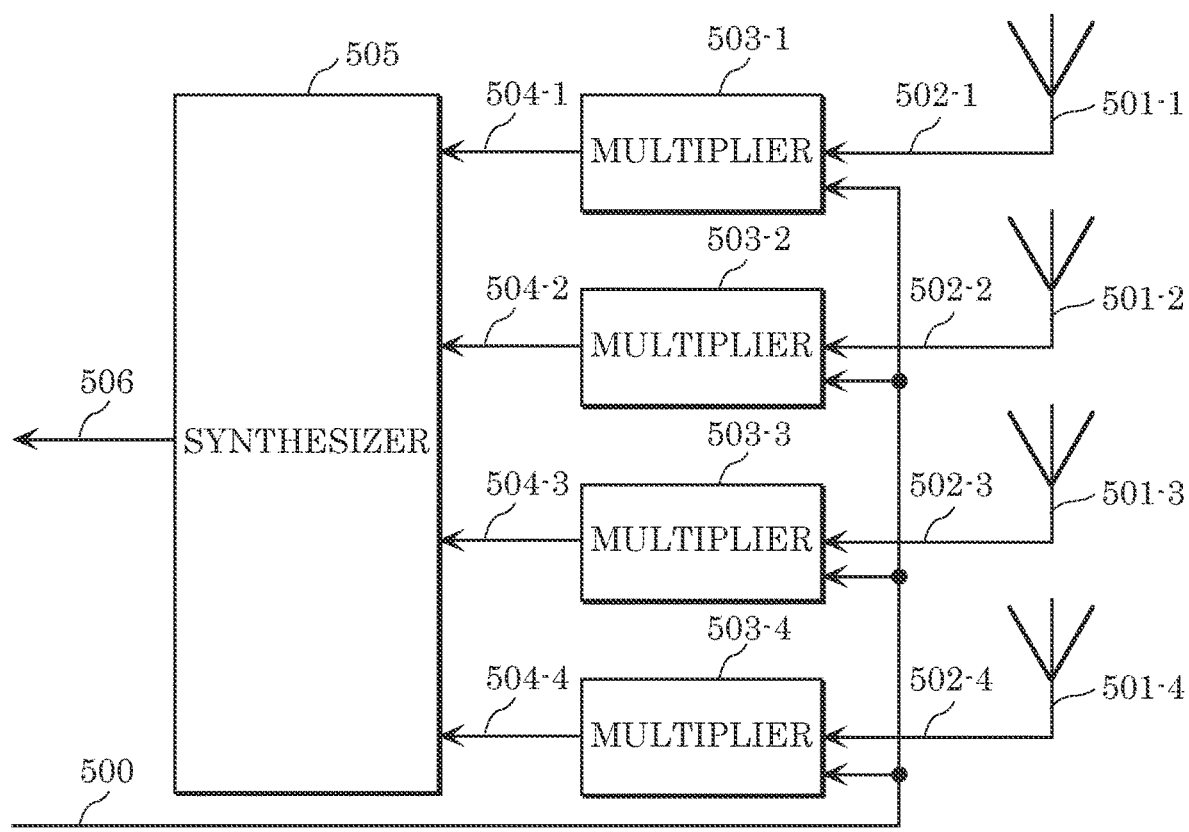
FIG. 5 is a diagram illustrating an example of a configuration of an antenna unit of a terminal.

FIG. 5 illustrates an example of a configuration of antenna units 401-1, 401-2, . . . , and 401-N. Each antenna unit includes a plurality of antennas, as illustrated in FIG. 5. Note that FIG. 5 illustrates four antennas, yet each antenna unit may include at least two antennas. Note that the number of antennas included in each antenna unit is not limited to 4.

FIG. 5 illustrates a configuration of antenna unit 401-$i$, where i is an integer of 1 or greater and N or smaller.

Multiplier 503-1 receives inputs of received signal 502-1 received by antenna 501-1 and control signal 500 (corresponding to control signal 410 in FIG. 4). Multiplier 503-1 multiplies received signal 502-1 by coefficient D1, based on information on a multiplication coefficient included in control signal 500, and outputs signal 504-1 obtained as a result of the multiplication. Note that coefficient D1 can be defined by a complex number. Accordingly, D1 can also be a real number. Thus, if received signal 502-1 is expressed by e1(t), signal 504-1 obtained as a result of the multiplication can be expressed by D1×e1(t) (t denotes time).

Similarly, multiplier 503-2 receives inputs of received signal 502-2 received by antenna 501-2 and control signal 500. Based on information on a multiplication coefficient included in control signal 500, multiplier 503-2 multiplies received signal 502-2 by coefficient D2, and outputs signal 504-2 obtained as a result of the multiplication. Note that coefficient D2 can be defined by a complex number. Accordingly, D2 can also be a real number. Thus, if received signal 502-2 is expressed by e2(t), signal 504-2 obtained as a result of the multiplication can be expressed by D2×e2(t) (t denotes time).

Multiplier 503-3 receives inputs of received signal 502-3 received by antenna 501-3 and control signal 500. Based on information on a multiplication coefficient included in control signal 500, multiplier 503-3 multiplies received signal 502-3 by coefficient D3, and outputs signal 504-3 obtained as a result of the multiplication. Note that coefficient D3 can be defined by a complex number. Accordingly, D3 can also be a real number. Thus, if received signal 502-3 is expressed by e3(t), signal 504-3 obtained as a result of the multiplication can be expressed by D3×e3(t) (t denotes time).

Multiplier 503-4 receives inputs of received signal 502-4 received by antenna 501-4 and control signal 500. Based on information on a multiplication coefficient included in control signal 500, multiplier 503-4 multiplies received signal 502-4 by coefficient D4, and outputs signal 504-4 obtained as a result of the multiplication. Note that coefficient D4 can be defined by a complex number. Accordingly, D4 can also be a real number. Thus, if received signal 502-4 is expressed by e4 (t), signal 504-4 obtained as a result of the multiplication can be expressed by D4×e4(t) (t denotes time).

Synthesizer 505 receives inputs of signals 504-1, 504-2, 504-3, and 504-4 obtained as a result of the multiplication. Synthesizer 505 adds signals 504-1, 504-2, 504-3, and 504-4 obtained as a result of the multiplication, and outputs synthesized signal 506 (corresponding to received signal 402-$i$ in FIG. 4). Thus, synthesized signal 506 is expressed by D1×e1(t)+D2×e2(t)+D3×e3(t)+D4×e4(t).

Figure 6:
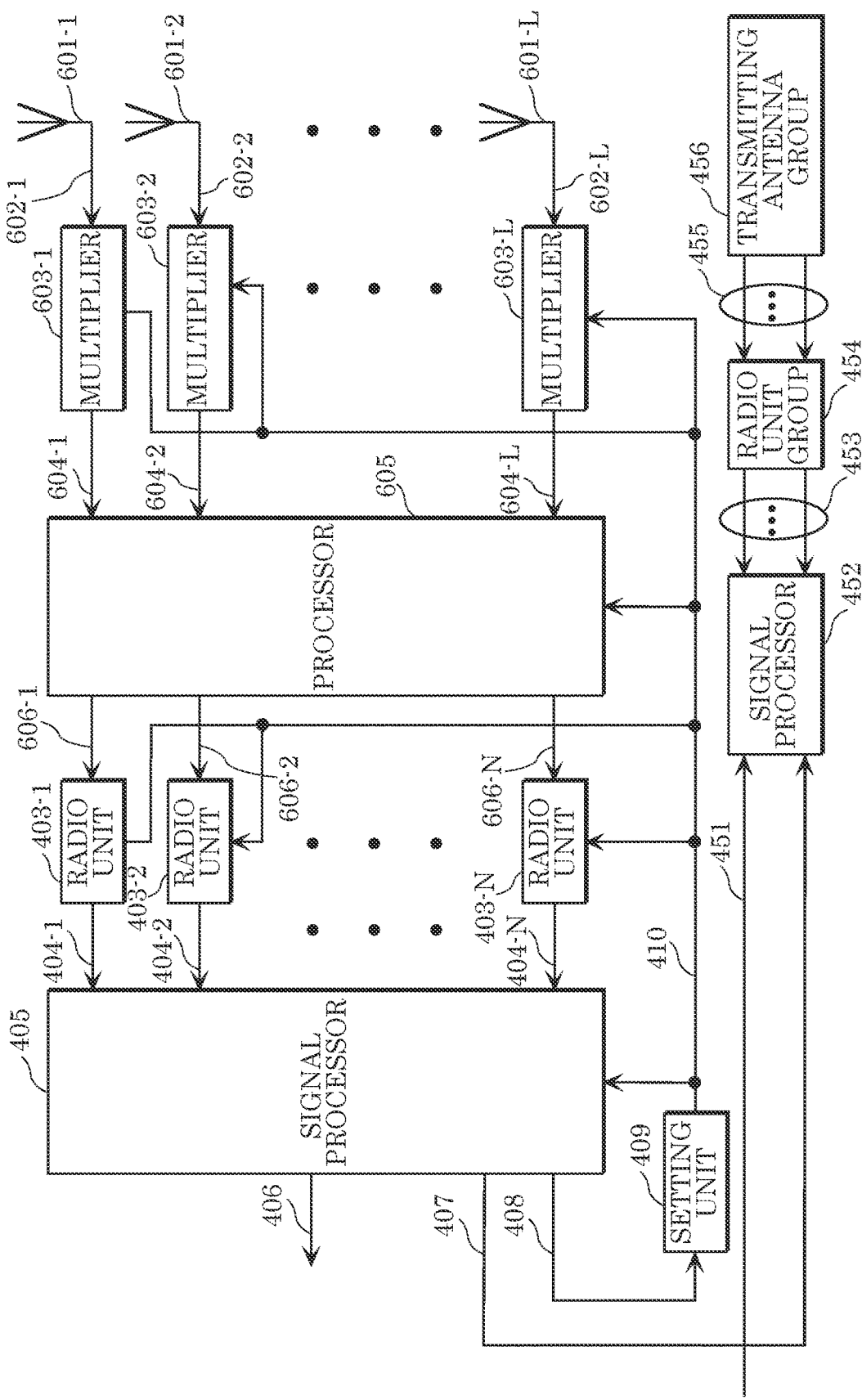
FIG. 6 is a diagram illustrating an example of a configuration of a terminal.

FIG. 6 illustrates a configuration of a terminal different from the configuration of the terminal in FIG. 4 in the present embodiment. Elements which operate in the same manner as those in FIG. 4 are assigned the same reference numerals in FIG. 6, and a description thereof is omitted below.

Multiplier 603-1 receives inputs of received signal 602-1 received by antenna 601-1 and control signal 410. Based on information on a multiplication coefficient included in control signal 410, multiplier 603-1 multiplies received signal 602-1 by coefficient G1, and outputs signal 604-1 obtained as a result of the multiplication. Note that coefficient G1 can be defined by a complex number. Accordingly, G1 can also be a real number. Thus, if received signal 602-1 is expressed by c1(t), signal 604-1 obtained as a result of the multiplication can be expressed by G1×c1(t) (t denotes time).

Similarly, multiplier 603-2 receives inputs of received signal 602-2 received by antenna 601-2 and control signal 410. Based on information on a multiplication coefficient included in control signal 410, multiplier 603-2 multiplies received signal 602-2 by coefficient G2, and outputs signal 604-2 obtained as a result of the multiplication. Note that coefficient G2 can be defined by a complex number. Accordingly, G2 can also be a real number. Thus, if received signal 602-2 is expressed by c2(t), signal 604-2 obtained as a result of the multiplication can be expressed by G2×c2(t) (t denotes time). A description of multiplier 603-3 to multiplier 603-L−1 is omitted.

Multiplier 603-L receives inputs of received signal 602-L received by antenna 601-L and control signal 410. Based on information on a multiplication coefficient included in control signal 410, multiplier 603-L multiplies received signal 602-L by coefficient GL, and outputs signal 604-L obtained as a result of the multiplication. Note that coefficient GL can be defined by a complex number. Accordingly, GL can also be a real number. Thus, if received signal 602-L is expressed by cL(t), signal 604-L obtained as a result of the multiplication can be expressed by GL×cL(t) (t denotes time).

Accordingly, multiplier 603-$i$ receives inputs of received signal 602-$i$ received by antenna 601-$i$ and control signal 410. Based on information on a multiplication coefficient included in control signal 410, multiplier 603-$i$ multiplies received signal 602-$i$ by coefficient G1, and outputs signal 604-$i$ obtained as a result of the multiplication. Note that coefficient Gi can be defined by a complex number. Accordingly, Gi can also be a real number. Thus, if received signal 602-$i$ is expressed by ci (t), signal 604-$i$ obtained as a result of the multiplication can be expressed by Gi×ci(t) (t denotes time). Note that $i$ is an integer of 1 or greater and L or smaller, and L is an integer of 2 or greater.

Processor 605 receives inputs of signals 604-1, 604-2, . . . , and 604-L obtained as a result of the multiplication and control signal 410. Based on control signal 410, processor 605 performs signal processing, and outputs signals 606-1, 606-2, . . . , and 606-N obtained as a result of the signal processing, where N is an integer of 2 or greater. At this time, signal 604-$i$ obtained as a result of the multiplication is expressed by $p_i(t)$, where i is an integer of 1 or greater and L or smaller.

Then, signal 606-$j$ ($r_j(t)$) as a result of the processing is expressed as follows (j is an integer of 1 or greater and N or smaller).

[Math 2]

$$r_j(t) = B_{j1} \times p_1(t) + B_{j2} \times p_2(t) + \ldots + B_{jL} \times p_L(t) \quad \text{Expression (2)}$$
$$= \sum_{i=1}^{L} B_{ji} \times p_i(t)$$

Note that in Expression (2), $B_{ji}$ is a value which can be defined by a complex number. Accordingly, $B_{ji}$ can also be a real number.

Figure 7:
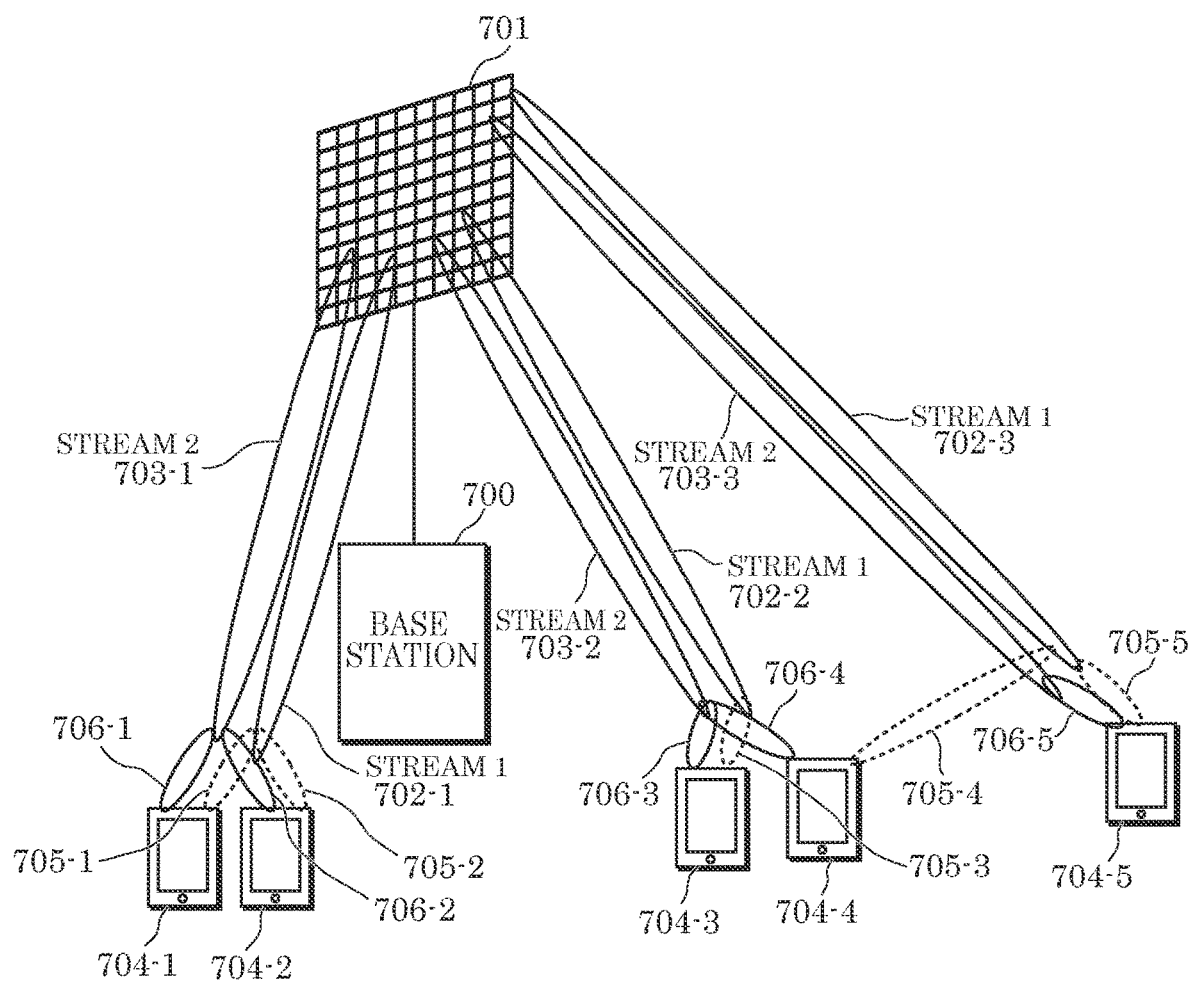
FIG. 7 is a diagram illustrating an example of a state of communication between the base station and terminals.

FIG. 7 illustrates an example of a state of communication between the base station and terminals. Note that the base station may be referred to as an access point or a broadcast station, for instance.

Base station 700 includes a plurality of antennas, and transmits a plurality of transmission signals from antenna 701 for transmission. At this time, base station 700 has a configuration as illustrated in FIG. 1 or 3, for example, and performs transmission beamforming (directivity control) by signal processor 102 (and/or weighting synthesizer 301) performing precoding (weighting synthesis).

FIG. 7 illustrates transmission beam 702-1 for transmitting data of stream 1, transmission beam 702-2 for transmitting data of stream 1, and transmission beam 702-3 for transmitting data of stream 1.

FIG. 7 illustrates transmission beam 703-1 for transmitting data of stream 2, transmission beam 703-2 for transmitting data of stream 2, and transmission beam 703-3 for transmitting data of stream 2.

Note that in FIG. 7, the number of transmission beams for transmitting data of stream 1 is 3 and the number of transmission beams for transmitting data of stream 2 is 3, yet the present disclosure is not limited to such numbers. The number of transmission beams for transmitting data of stream 1 may be at least two, and the number of transmission beams for transmitting data of stream 2 may be at least two.

FIG. 7 includes terminals 704-1, 704-2, 704-3, 704-4, and 704-5, and the terminals have the configuration same as the configuration of the terminals illustrated in FIGS. 4 and 5, for example.

For example, terminal 704-1 performs directivity control for receiving, via "signal processor 405" and/or "antennas 401-1 to 401-N" and/or "multipliers 603-1 to 603-L and processor 605", and forms receiving directivity 705-1 and receiving directivity 706-1. Receiving directivity 705-1 allows terminal 704-1 to receive and demodulate transmission beam 702-1 for transmitting data of stream 1, and receiving directivity 706-1 allows terminal 704-1 to receive and demodulate transmission beam 703-1 for transmitting data of stream 2.

Similarly, terminal 704-2 performs directivity control for receiving, via "signal processor 405" and/or "antennas 401-1 to 401-N" and/or "multipliers 603-1 to 603-L and processor 605", and forms receiving directivity 705-2 and receiving directivity 706-2. Receiving directivity 705-2 allows terminal 704-2 to receive and demodulate transmission beam 702-1 for transmitting data of stream 1, and receiving directivity 706-2 allows terminal 704-2 to receive and demodulate transmission beam 703-1 for transmitting data of stream 2.

Terminal 704-3 performs directivity control for receiving, via "signal processor 405" and/or "antennas 401-1 to 401-N" and/or "multipliers 603-1 to 603-L and processor 605", and forms receiving directivity 705-3 and receiving directivity 706-3.

Receiving directivity 705-3 allows terminal 704-3 to receive and demodulate transmission beam 702-2 for transmitting data of stream 1, and receiving directivity 706-3 allows terminal 704-3 to receive and demodulate transmission beam 703-2 for transmitting data of stream 2.

Terminal 704-4 performs directivity control for receiving, via "signal processor 405" and/or "antennas 401-1 to 401-N" and/or "multipliers 603-1 to 603-L and processor 605", and forms receiving directivity 705-4 and receiving directivity 706-4. Receiving directivity 705-4 allows terminal 704-4 to receive and demodulate transmission beam 702-3 for transmitting data of stream 1, and receiving directivity 706-4 allows terminal 704-4 to receive and demodulate transmission beam 703-2 for transmitting data of stream 2.

Terminal 704-5 performs directivity control for receiving, via "signal processor 405" and/or "antennas 401-1 to 401-N" and/or "multipliers 603-1 to 603-L and processor 605", and forms receiving directivity 705-5 and receiving directivity 706-5. Receiving directivity 705-5 allows terminal 704-5 to receive and demodulate transmission beam 702-3 for transmitting data of stream 1, and receiving directivity 706-5 allows terminal 704-5 to receive and demodulate transmission beam 703-3 for transmitting data of stream 2.

In FIG. 7, a terminal selects, according to a spatial position, at least one transmission beam from among transmission beams 702-1, 702-2, and 702-3 for transmitting data of stream 1, and can obtain data of stream 1 with high quality by directing a receiving directivity to the selected transmission beam(s). Furthermore, the terminal selects, according to a spatial position, at least one transmission beam from among transmission beams 703-1, 703-2, and 703-3 for transmitting data of stream 2, and can obtain data of stream 2 with high quality by directing a receiving directivity to the selected transmission beam(s).

Note that base station 700 transmits transmission beam 702-1 for transmitting data of stream 1 and transmission beam 703-1 for transmitting data of stream 2, using the same frequency (the same frequency band) at the same time. Base station 700 transmits transmission beam 702-2 for transmitting data of stream 1 and transmission beam 703-2 for transmitting data of stream 2, using the same frequency (the same frequency band) at the same time. Base station 700 transmits transmission beam 702-3 for transmitting data of stream 1 and transmission beam 703-3 for transmitting data of stream 2, using the same frequency (the same frequency band) at the same time.

Transmission beams 702-1, 702-2, and 702-3 for transmitting data of stream 1 may be beams having the same frequency (the same frequency band) or may be beams having different frequencies (different frequency bands). Transmission beams 703-1, 703-2, and 703-3 for transmitting data of stream 2 may be beams having the same frequency (the same frequency band), or may be beams having different frequencies (different frequency bands).

A description of operation of setting unit 158 of the base station in FIGS. 1 and 3 is to be given.

Setting unit 158 receives an input of setting signal 160. Setting signal 160 includes information with regard to "whether to perform transmission for multicasting or transmission for unicasting", and if the base station performs transmission as illustrated in FIG. 7, information indicating "to perform transmission for multicasting" is input to setting unit 158 according to setting signal 160.

Setting signal 160 includes information with regard to "the number of transmission streams when multicasting is performed" and if the base station performs transmission as illustrated in FIG. 7, information indicating that "the number of transmission streams is 2" is input to setting unit 158 according to setting signal 160.

Setting signal 160 may include information with regard to "how many transmission beams are to be used to transmit each stream". If the base station performs transmission as illustrated in FIG. 7, information indicating that "the number of transmission beams for transmitting stream 1 is 3 and the number of transmission beams for transmitting stream 2 is 3" is input to setting unit 158 according to setting signal 160.

Note that the base station in FIGS. 1 and 3 may transmit a control information symbol which includes, for instance, information with regard to "whether to perform transmission for multicasting or transmission for unicasting", information with regard to "the number of transmission streams when multicasting is performed", information with regard to "how many transmission beams are to be used to transmit each stream". Accordingly, a terminal can appropriately receive data. A configuration of a control information symbol will be later described in detail.

Figure 8:
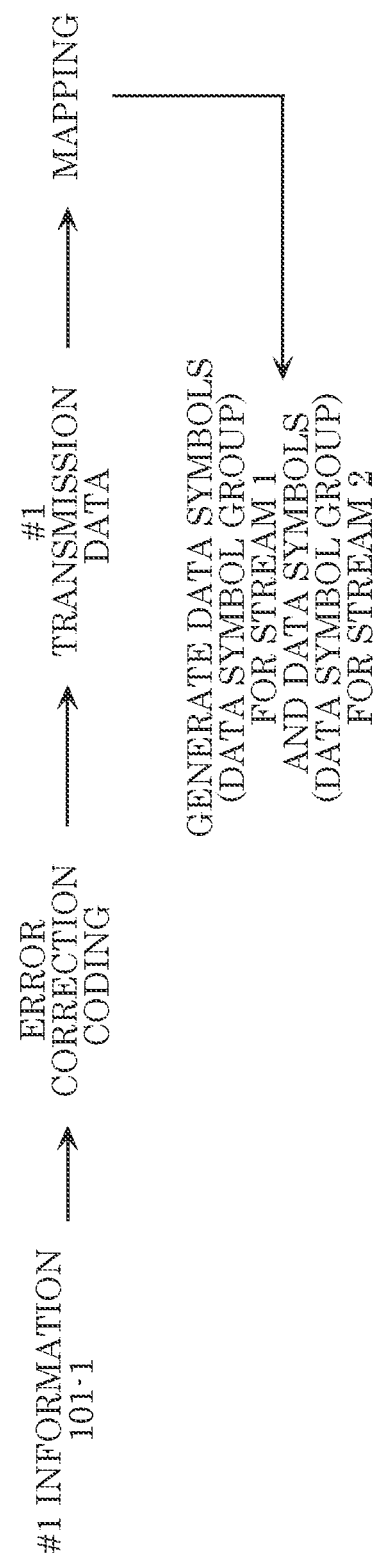
FIG. 8 is a diagram illustrating a relation of a plurality of streams.

FIG. 8 is a drawing for describing a relation between #i information 101-*i* in FIGS. 1 and 3 and "stream 1" and "stream 2" described with reference to FIG. 7. For example, processing such as error correction coding is performed on #1 information 101-1, and data obtained as a result of the error correction coding is obtained. The data obtained as a result of the error correction coding is named #1 transmission data. Data symbols are obtained by mapping #1 transmission data. By separating data symbols into data symbols for stream 1 and data symbols for stream 2, data symbols (data symbol group) for stream 1 and data symbols (data symbol group) for stream 2 are obtained. The symbol group for stream 1 includes data symbols (data symbol group) for stream 1, and is transmitted from the base station in FIGS. 1 and 3. The symbol group for stream 2 includes data symbols (data symbol group) for stream 2, and is transmitted from the base station in FIGS. 1 and 3.

Figure 9:
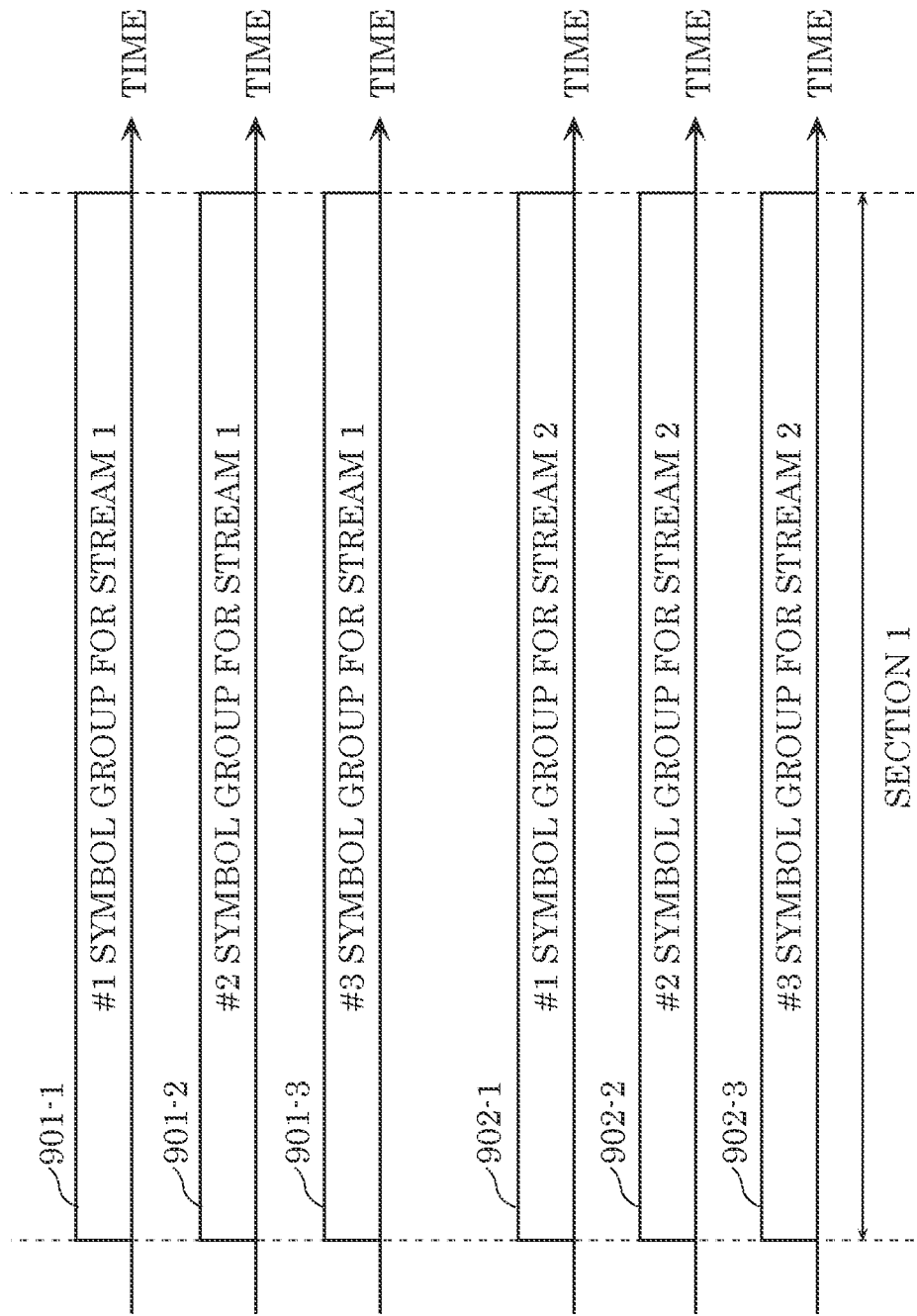
FIG. 9 is a diagram illustrating an example of a frame configuration.

FIG. 9 illustrates an example of a frame configuration when the horizontal axis indicates time.

1 symbol group 901-1 for stream 1 in FIG. 9 is a symbol group for transmission beam 702-1 for transmitting data of stream 1 in FIG. 7.

2 symbol group 901-2 for stream 1 in FIG. 9 is a symbol group for transmission beam 702-2 for transmitting data of stream 1 in FIG. 7.

3 symbol group 901-3 for stream 1 in FIG. 9 is a symbol group for transmission beam 702-3 for transmitting data of stream 1 in FIG. 7.

1 symbol group 902-1 for stream 2 in FIG. 9 is a symbol group for transmission beam 703-1 for transmitting data of stream 2 in FIG. 7.

2 symbol group 902-2 for stream 2 in FIG. 9 is a symbol group for transmission beam 703-2 for transmitting data of stream 2 in FIG. 7.

3 symbol group 902-3 for stream 2 in FIG. 9 is a symbol group for transmission beam 703-3 for transmitting data of stream 2 in FIG. 7.

1 symbol group 901-1 for stream 1, #2 symbol group 901-2 for stream 1, #3 symbol group 901-3 for stream 1, #1 symbol group 902-1 for stream 2, #2 symbol group 902-2 for stream 2, and #3 symbol group 902-3 for stream 2 are present in time section 1, for example.

As described above, #1 symbol group 901-1 for stream 1 and #2 symbol group 902-1 for stream 2 are transmitted using the same frequency (the same frequency band), #2 symbol group 901-2 for stream 1 and #2 symbol group 902-2 for stream 2 are transmitted using the same frequency (the same frequency band), and #3 symbol group 901-3 for stream 1 and #3 symbol group 902-3 for stream 2 are transmitted using the same frequency (the same frequency band).

For example, "data symbol group A for stream 1" and "data symbol group A for stream 2" are generated from information, following the procedure in FIG. 8. The symbol group, namely "data symbol group A-1 for stream 1" which includes the same symbols as symbols included in "data symbol group A for stream 1", the symbol group, namely "data symbol group A-2 for stream 1" which includes the same symbols as symbols included in "data symbol group A for stream 1", and the symbol group, namely "data symbol group A-3 for stream 1" which includes the same symbols as symbols included in "data symbol group A for stream 1" are prepared.

Thus, the symbols included in "data symbol group A-1 for stream 1", the symbols included in "data symbol group A-2 for stream 1", and the symbols included in "data symbol group A-3 for stream 1" are the same.

At this time, #1 symbol group 901-1 for stream 1 in FIG. 9 includes "data symbol group A-1 for stream 1", #2 symbol group 901-2 for stream 1 in FIG. 9 includes "data symbol group A-2 for stream 1", and #3 symbol group 901-3 for stream 1 in FIG. 9 includes "data symbol group A-3 for stream 1". Accordingly, #1 symbol group 901-1 for stream 1, #2 symbol group 901-2 for stream 1, and #3 symbol group 901-3 for stream 1 include the same data symbol group.

The symbol group, namely "data symbol group A-1 for stream 2" which includes the same symbols as symbols included in "data symbol group A for stream 2", the symbol group, namely "data symbol group A-2 for stream 2" which includes the same symbols as symbols included in "data symbol group A for stream 2", and the symbol group, namely "data symbol group A-3 for stream 2" which includes the same symbols as symbols included in "data symbol group A for stream 2" are prepared.

Accordingly, the symbols included in "data symbol group A-1 for stream 2", the symbols included in "data symbol group A-2 for stream 2", and the symbols included in "data symbol group A-3 for stream 2" are the same.

At this time, #1 symbol group 902-1 for stream 2 in FIG. 9 includes "data symbol group A-1 for stream 2", #2 symbol group 902-2 for stream 2 in FIG. 9 includes "data symbol group A-2 for stream 2", and #3 symbol group 902-3 for stream 2 in FIG. 9 includes "data symbol group A-3 for stream 2". Accordingly, #1 symbol group 902-1 for stream 2, #2 symbol group 902-2 for stream 2, and #3 symbol group 902-3 for stream 2 include the same data symbol group.

Figure 10:
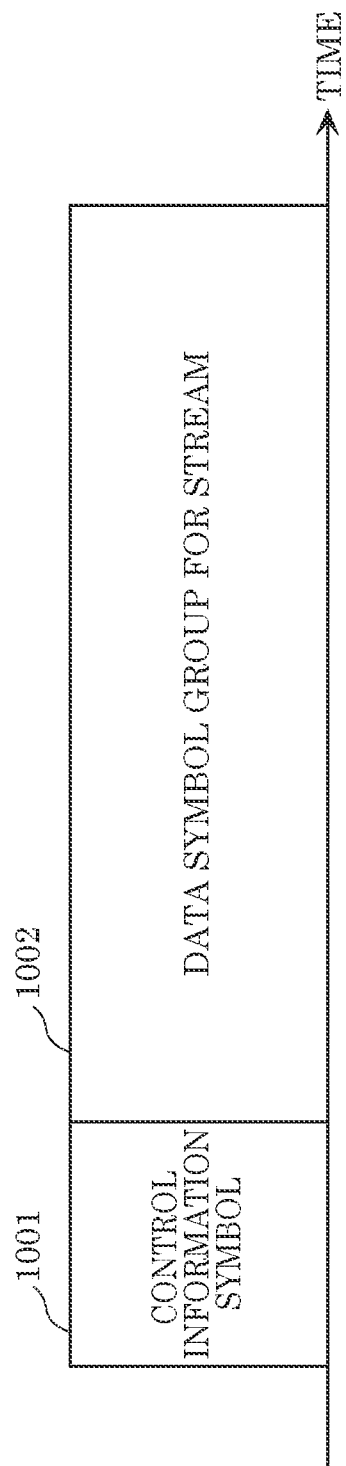
FIG. 10 is a diagram illustrating an example of a frame configuration.

FIG. 10 illustrates an example of a frame configuration of "symbol group #Y for stream X" (X=1, 2; Y=1, 2, 3) described with reference to FIG. 9. In FIG. 10, while the horizontal axis indicates time, 1001 denotes a control information symbol and 1002 denotes a data symbol group for a stream. At this time, data symbol group 1002 for the stream includes symbols for transmitting "data symbol group A for stream 1" or "data symbol group A for stream 2" described with reference to FIG. 9.

Note that a multi-carrier method such as the orthogonal frequency division multiplexing (OFDM) method may be used for the frame configuration in FIG. 10, and symbols may be present in the direction of the frequency axis, in this case. The symbols may include a reference symbol for a receiving device to perform time synchronization and frequency synchronization, a reference symbol for a receiving device to detect a signal, and a reference symbol for a receiving device to perform channel estimation, for instance. The frame configuration is not limited to the configuration in FIG. 10, and control information symbol 1001 and data symbol group 1002 for a stream may be arranged in any manner. Note that the reference symbol may be referred to as a preamble and a pilot symbol.

The following describes a configuration of control information symbol 1001.

Figure 11:
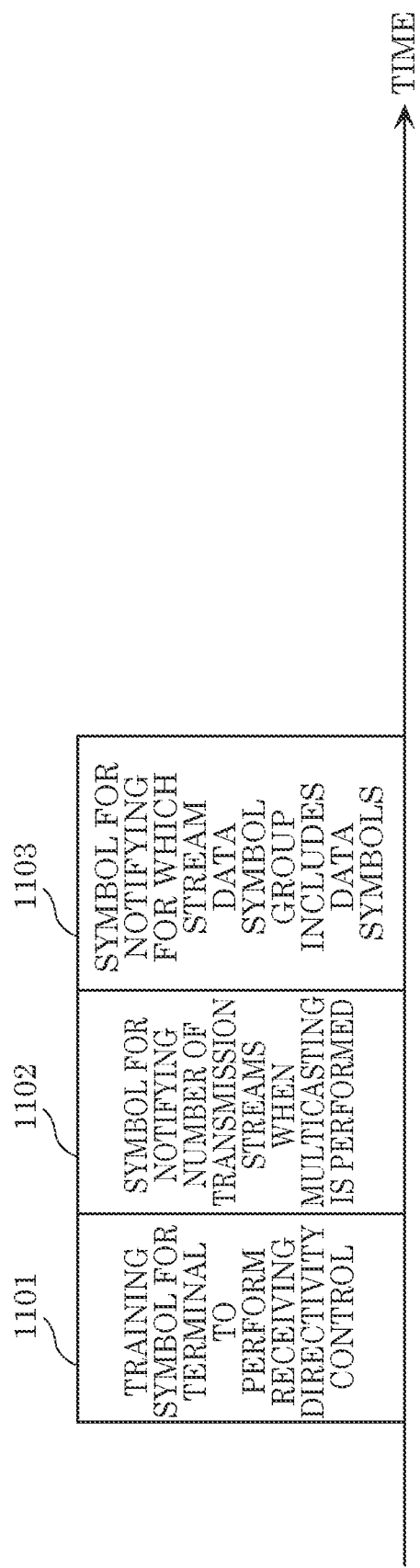
FIG. 11 is a diagram illustrating an example of a symbol configuration.

FIG. 11 illustrates an example of a configuration of symbols transmitted as a control information symbol in FIG. 10, and the horizontal axis indicates time. In FIG. 11, a terminal receives "training symbol for a terminal to perform receiving directivity control" 1101 to determine a signal processing method for the directivity control for receiving, which is implemented by "signal processor 405" and/or "antennas 401-1 to 401-N" and/or "multipliers 603-1 to 603-L and processor 605".

A terminal receives "symbol for notifying the number of transmission streams when multicasting is performed" 1102 so that the terminal is informed of the number of streams to be obtained.

A terminal receives "symbol for notifying for which stream data symbols are" 1103 so that the terminal can be informed which stream has been successfully received among the streams which the base station is transmitting.

A description of an example with regard to the above is to be given.

The case where the base station transmits streams using transmission beams as illustrated in FIG. 7 is to be described. Specific information indicated by a control information symbol in #1 symbol group 901-1 for stream 1 in FIG. 9 is to be described.

In the case of FIG. 7, since the base station is transmitting "stream 1" and "stream 2", information indicated by "symbol for notifying the number of transmission streams when multicasting is performed" 1102 indicates "2".

1 symbol group 901-1 for stream 1 in FIG. 9 is for transmitting data symbols for stream 1, and thus information indicated by "symbol for notifying for which stream data symbols are" 1103 indicates "stream 1".

The case where, for example, a terminal receives #1 symbol group 901-1 for stream 1 in FIG. 9 is to be described. At this time, the terminal becomes aware that "the number of transmission streams is 2" from "symbol for notifying the number of transmission streams when multicasting is performed" 1102, and that the terminal has obtained "data symbols for stream 1" from "symbol 1103 for notifying for which stream data symbol group includes data symbols".

After that, since the terminal becomes aware that "the number of transmission streams is 2" and the obtained data symbols are "data symbols for stream 1", the terminal is aware that the terminal is to obtain "data symbols for stream 2". Thus, the terminal can start operation for searching for a symbol group for stream 2. For example, the terminal searches for one of transmission beams for transmitting #1 symbol group 902-1 for stream 2, #2 symbol group 902-2 for stream 2, and #3 symbol group 902-3 for stream 2 in FIG. 9.

Then, the terminal obtains one of transmission beams for transmitting #1 symbol group 902-1 for stream 2, #2 symbol group 902-2 for stream 2, and #3 symbol group 902-3 for stream 2, to obtain data symbols for both streams 1 and 2.

Configuring control information symbols in this manner yields an advantageous effect that a terminal can obtain data symbols precisely.

As described above, the base station transmits data symbols using a plurality of transmission beams, and a terminal selectively receives a transmission beam with good quality among the plurality of transmission beams in multicast transmission and broadcast data transmission, and furthermore, transmission directivity control and receiving directivity control have been performed on modulated signals transmitted by the base station, thus achieving advantageous effects of increasing an area where high data receiving quality is achieved.

In the above description, a terminal performs receiving directivity control, yet advantageous effects can be obtained as mentioned above without the terminal performing receiving directivity control.

Note that the modulating method for "data symbol group for a stream" 1002 in FIG. 10 may be any modulating method, and a mapping method according to the modulating method for "data symbol group for a stream" 1002 may be changed for each symbol. Accordingly, a phase of a constellation may be changed for each symbol on an in-phase I-quadrature Q plane after mapping.

Figure 12:
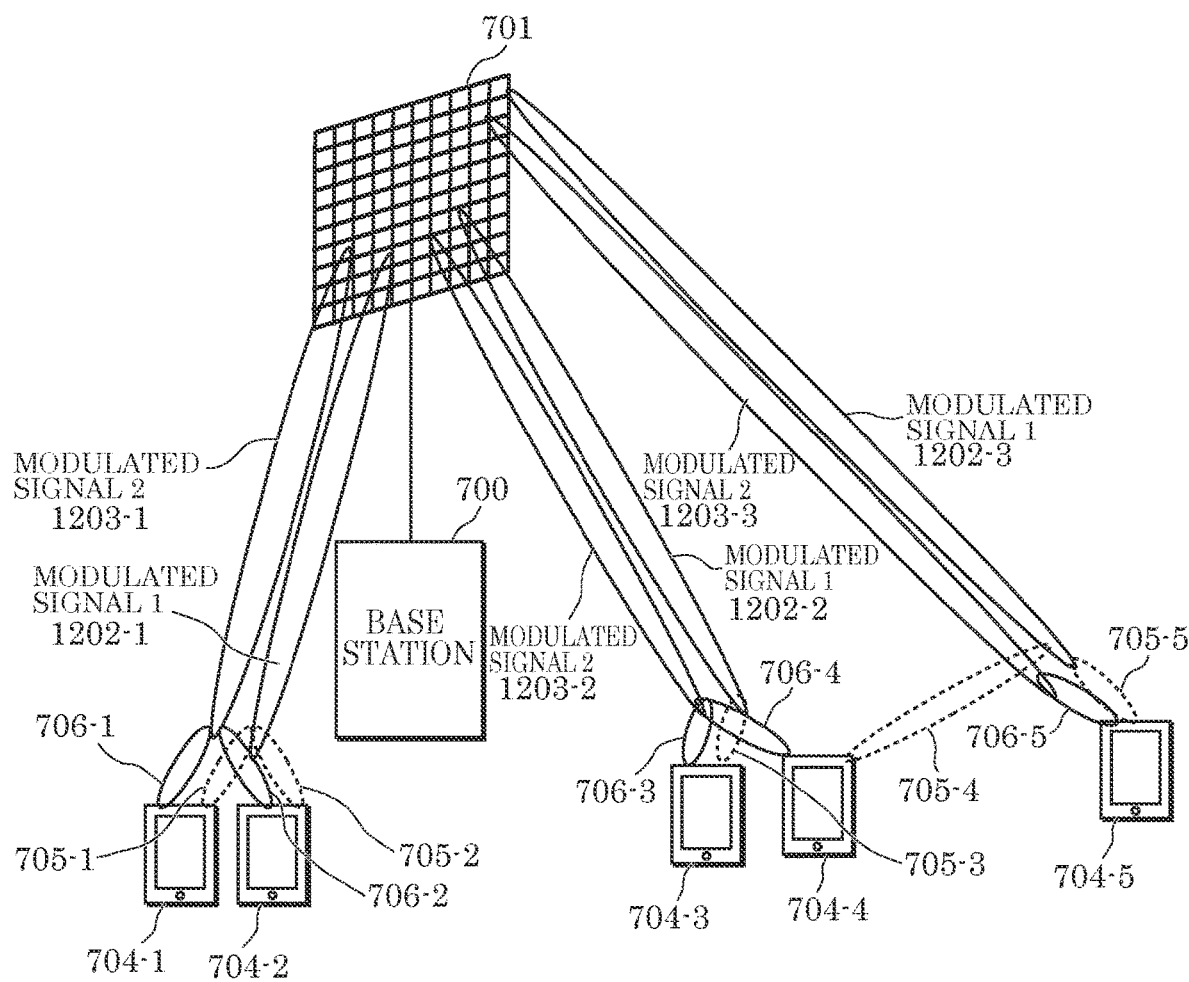
FIG. 12 is a diagram illustrating an example of a state of communication between the base station and terminals.

FIG. 12 illustrates an example of a state of communication between a base station and terminals different from the example in FIG. 7. Note that elements which operate in the same manner as those in FIG. 7 are assigned the same reference numerals in FIG. 12.

Base station 700 includes a plurality of antennas, and transmits a plurality of transmission signals through antenna 701 for transmission. At this time, base station 700 has a configuration as illustrated in, for example, FIG. 1 or 3, and performs transmission beamforming (directivity control) by signal processor 102 (and/or weighting synthesizer 301) performing precoding (weighting synthesis).

FIG. 12 illustrates transmission beam 1202-1 for transmitting "modulated signal 1", transmission beam 1202-2 for transmitting "modulated signal 1", and transmission beam 1202-3 for transmitting "modulated signal 1".

FIG. 12 illustrates transmission beam 1203-1 for transmitting "modulated signal 2", transmission beam 1203-2 for transmitting "modulated signal 2", and transmission beam 1203-3 for transmitting "modulated signal 2".

Note that although in FIG. 12, the number of transmission beams for transmitting "modulated signal 1" is 3 and the number of transmission beams for transmitting "modulated signal 2" is 3, the present disclosure is not limited to such numbers, and the number of transmission beams for transmitting "modulated signal 1" may be at least 2 and the number of transmission beams for transmitting "modulated signal 2" may be at least 2. A detailed description of "modulated signal 1" and "modulated signal 2" will be given later.

FIG. 12 includes terminals 704-1, 704-2, 704-3, 704-4, and 704-5, and the terminals have the same configuration as those in FIGS. 4 and 5, for example.

For example, terminal 704-1 performs directivity control for receiving, via "signal processor 405" and/or "antennas 401-1 to 401-N" and/or "multipliers 603-1 to 603-L and processor 605", and forms receiving directivity 705-1 and receiving directivity 706-1. Receiving directivity 705-1 allows terminal 704-1 to receive and demodulate transmission beam 1202-1 for transmitting "modulated signal 1", and receiving directivity 706-1 allows terminal 704-1 to receive and demodulate transmission beam 1203-1 for transmitting "modulated signal 2".

Similarly, terminal 704-2 performs directivity control for receiving, via "signal processor 405" and/or "antennas 401-1 to 401-N" and/or "multipliers 603-1 to 603-L and processor 605", and forms receiving directivity 705-2 and receiving directivity 706-2. Receiving directivity 705-2 allows terminal 704-2 to receive and demodulate transmission beam 1202-1 for transmitting "modulated signal 1", and receiving directivity 706-2 allows terminal 704-2 to receive and demodulate transmission beam 1203-1 for transmitting "modulated signal 2".

Terminal 704-3 performs directivity control for receiving, via "signal processor 405" and/or "antennas 401-1 to 401-N" and/or "multipliers 603-1 to 603-L and processor 605", and forms receiving directivity 705-3 and receiving directivity 706-3.

Receiving directivity 705-3 allows terminal 704-3 to receive and demodulate transmission beam 1202-2 for transmitting "modulated signal 1", and receiving directivity 706-3 allows terminal 704-3 to receive and demodulate transmission beam 1203-1 for transmitting "modulated signal 2".

Terminal 704-4 performs directivity control for receiving, via "signal processor 405" and/or "antennas 401-1 to 401-N" and/or "multipliers 603-1 to 603-L and processor 605", and forms receiving directivity 705-4 and receiving directivity 706-4. Receiving directivity 705-4 allows terminal 704-4 to receive and demodulate transmission beam 1202-3 for transmitting "modulated signal 1", and receiving directivity 706-4 allows terminal 704-4 to receive and demodulate transmission beam 1203-2 for transmitting "modulated signal 2".

Terminal 704-5 performs directivity control for receiving, via "signal processor 405" and/or "antennas 401-1 to 401-N" and/or "multipliers 603-1 to 603-L and processor 605", and forms receiving directivity 705-5 and receiving directivity 706-5. Receiving directivity 705-5 allows terminal 704-5 to receive and demodulate transmission beam 1202-3 for transmitting "modulated signal 1", and receiving directivity 706-5 allows terminal 704-5 to receive and demodulate transmission beam 1203-3 for transmitting "modulated signal 2".

Distinguishing points in FIG. 7 are that a terminal selects, based on a spatial position, at least one transmission beam from among transmission beams 1202-1, 1202-2, and 1202-3 for transmitting "modulated signal 1", and can obtain "modulated signal 1" with high quality by directing a receiving directivity to the selected transmission beam(s). Further, the terminal selects, based on a spatial position, at least one transmission beam from among transmission beams 1203-1, 1203-2, and 1203-3 for transmitting "modulated signal 2", and can obtain "modulated signal 2" with high quality by directing a receiving directivity to the selected transmission beam(s).

Note that base station 700 transmits transmission beam 1202-1 for transmitting "modulated signal 1" and transmission beam 1203-1 for transmitting "modulated signal 2" using the same frequency (the same frequency band) at the same time. Then, base station 700 transmits transmission beam 1202-2 for transmitting "modulated signal 1" and transmission beam 1203-2 for transmitting "modulated signal 2" using the same frequency (the same frequency band) at the same time. Further, base station 700 transmits transmission beam 1202-3 for transmitting "modulated signal 1" and transmission beam 1203-3 for transmitting "modulated signal 2" using the same frequency (the same frequency band) at the same time.

Transmission beams 1202-1, 1202-2, and 1202-3 for transmitting "modulated signal 1" may be beams having the same frequency (the same frequency band) or may be beams having different frequencies (different frequency bands). Transmission beams 1203-1, 1203-2, and 1203-3 for transmitting "modulated signal 2" may be beams having the same frequency (the same frequency band) or may be beams having different frequencies (different frequency bands).

A description of operation of setting unit 158 of the base station in FIGS. 1 and 3 is to be given.

Setting unit 158 receives an input of setting signal 160. Setting signal 160 includes information with regard to "whether to perform transmission for multicasting or transmission for unicasting", and if the base station performs transmission as illustrated in FIG. 7, information indicating "to perform transmission for multicasting" is input to setting unit 158 according to setting signal 160.

Setting signal 160 includes information with regard to "the number of transmission modulated signals when multicasting is performed" and if the base station performs transmission as illustrated in FIG. 12, information indicating that "the number of transmission modulated signals is 2" is input to setting unit 158 according to setting signal 160.

Setting signal 160 may include information with regard to "how many transmission beams are to be used to transmit each modulated signal". If the base station performs transmission as illustrated in FIG. 12, information indicating that "the number of transmission beams for transmitting modulated signal 1 is 3 and the number of transmission beams for transmitting modulated signal 2 is 3" is input to setting unit 158 according to setting signal 160.

Note that the base station in FIGS. 1 and 3 may transmit a control information symbol which includes, for instance, information with regard to "whether to perform transmission for multicasting or transmission for unicasting", information with regard to "the number of transmission modulated signals when multicasting is performed", information with regard to "how many transmission beams are to be used to transmit each modulated signal". Accordingly, a terminal can appropriately receive data. A configuration of a control information symbol will be later described in detail.

Figure 13:
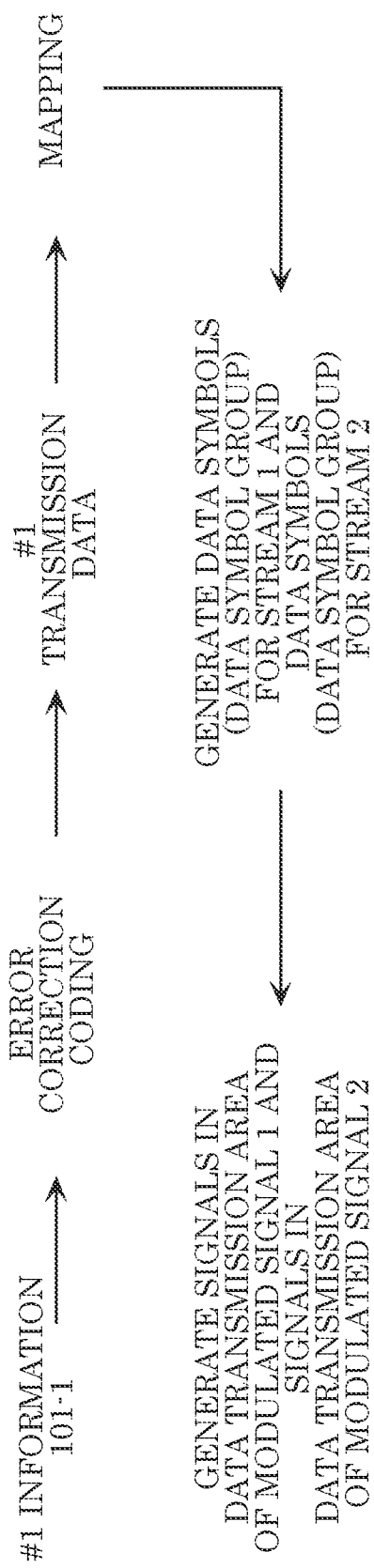
FIG. 13 is a diagram illustrating a relation of a plurality of modulated signals.

FIG. 13 is a drawing for describing a relation between #i information 101-$i$ in FIGS. 1 and 3 and "modulated signal 1" and "modulated signal 2" described with reference to FIG. 12.

For example, #1 information 101-1 is subjected to error correction coding, for instance, and data obtained as a result of the error correction coding is obtained. The data obtained as a result of the error correction coding is named #1 transmission data. Data symbols are obtained by mapping #1 transmission data. The data symbols are separated into data symbols for stream 1 and data symbols for stream 2, so that data symbols (data symbol group) for stream 1 and data symbols (data symbol group) for stream 2 are obtained. At this time, a data symbol having symbol number i for stream 1 is s1(i) and a data symbol having symbol number i for stream 2 is s2(i). Then, "modulated signal 1" tx1(i) having symbol number i is expressed as follows, for example.

[Math 3]

$$tx1(i)=\alpha(i)\times s1(i)+\beta(i)\times s2(i) \qquad \text{Expression (3)}$$

Then, "modulated signal 2" tx2(i) having symbol number i is expressed as follows, for example.

[Math 4]

$$tx2(i)=\gamma(i)\times s1(i)+\delta(i)\times s2(i) \qquad \text{Expression (4)}$$

Note that in Expressions (3) and (4), $\alpha(i)$ can be defined by a complex number (and thus may be a real number), $\beta(i)$ can be defined by a complex number (and thus may be a real number), $\gamma(i)$ can be defined by a complex number (and thus may be a real number), and $\delta(i)$ can be defined by a complex number (and thus may be a real number). Furthermore, although $\alpha(i)$ is indicated, $\alpha(i)$ may not be a function of symbol number i (may be a fixed value), although $\beta(i)$ is indicated, $\beta(i)$ may not be a function of symbol number i (may be a fixed value), although $\gamma(i)$ is indicated, $\gamma(i)$ may not be a function of symbol number i (may be a fixed value), and although $\delta(i)$ is indicated, $\delta(i)$ may not be a function of symbol number i (may be a fixed value).

Then, "a symbol group for modulated signal 1" which includes "signals in a data transmission area of modulated signal 1" which are constituted by data symbols is transmitted from the base station in FIG. 1 or 3. Further, "a symbol group for modulated signal 2" which includes "signals in a data transmission area of modulated signal 2" which are constituted by data symbols is transmitted from the base station in FIG. 1 or 3.

Note that signal processing such as phase modification and cyclic delay diversity (CDD) may be performed on "modulated signal 1" and "modulated signal 2". Note that the method for signal processing is not limited to those.

Figure 14:
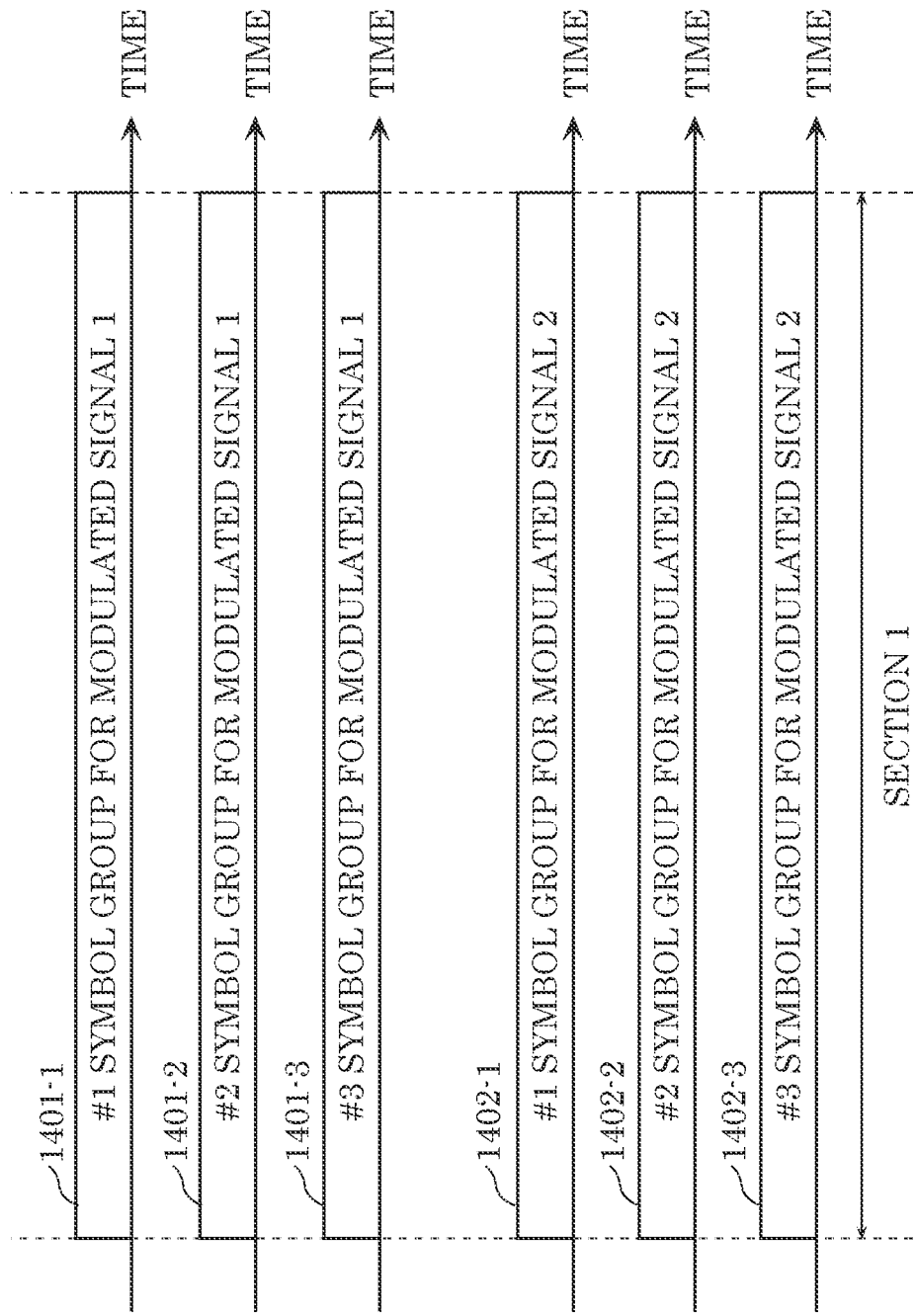
FIG. 14 is a diagram illustrating an example of a frame configuration.

FIG. 14 illustrates an example of a frame configuration when the horizontal axis indicates time.

1 symbol group (1401-1) for modulated signal 1 in FIG. 14 is a symbol group for transmission beam 1202-1 for transmitting data of modulated signal 1 in FIG. 12.

2 symbol group (1401-2) for modulated signal 1 in FIG. 14 is a symbol group for transmission beam 1202-2 for transmitting data of modulated signal 1 in FIG. 12.

3 symbol group (1401-3) for modulated signal 1 in FIG. 14 is a symbol group for transmission beam 1202-3 for transmitting data of modulated signal 1 in FIG. 12.

1 symbol group (1402-1) for modulated signal 2 in FIG. 14 is a symbol group for transmission beam 1203-1 for transmitting data of modulated signal 2 in FIG. 12.

2 symbol group (1402-2) for modulated signal 2 in FIG. 14 is a symbol group for transmission beam 1203-2 for transmitting data of modulated signal 2 in FIG. 12.

3 symbol group (1402-3) for modulated signal 2 in FIG. 14 is a symbol group for transmission beam 1203-3 for transmitting data of modulated signal 2 in FIG. 12.

1 symbol group (1401-1) for modulated signal 1, #2 symbol group (1401-2) for modulated signal 1, #3 symbol group (1401-3) for modulated signal 1, #1 symbol group (1402-1) for modulated signal 2, #2 symbol group (1402-2) for modulated signal 2, and #3 symbol group (1402-3) for modulated signal 2 are present in time section 1, for example.

As previously described, #1 symbol group (1401-1) for modulated signal 1 and #1 symbol group (1402-1) for modulated signal 2 are transmitted using the same frequency (the same frequency band), #2 symbol group (1401-2) for modulated signal 1 and #2 symbol group (1402-2) for modulated signal 2 are transmitted using the same frequency (the same frequency band), and #3 symbol group (1401-3) for modulated signal 1 and #3 symbol group (1402-3) for modulated signal 2 are transmitted using the same frequency (the same frequency band).

For example, "signal A in the data transmission area of modulated signal 1" and "signal A in the data transmission area of modulated signal 2" are generated from information in accordance with the procedure in FIG. 13.

"Signal A-1 in the data transmission area of modulated signal 1" which is a signal constituted by a signal equivalent to a signal which constitutes "signal A in the data transmission area of modulated signal 1", "signal A-2 in the data transmission area of modulated signal 1" which is a signal constituted by a signal equivalent to a signal which constitutes "signal A in the data transmission area of modulated signal 1", and "signal A-3 in the data transmission area of modulated signal 1" which is a signal constituted by a signal equivalent to a signal which constitutes "signal A in the data transmission area of modulated signal 1" are prepared (thus, the signal which constitutes "signal A-1 in the data transmission area of modulated signal 1", the signal which constitutes "signal A-2 in the data transmission area of modulated signal 1", and the signal which constitutes "signal A-3 in the data transmission area of modulated signal 1" are the same).

At this time, #1 symbol group (1401-1) for modulated signal 1 in FIG. 14 includes "signal A-1 in the data transmission area of modulated signal 1", #2 symbol group (1401-2) for modulated signal 1 in FIG. 14 includes "signal A-2 in the data transmission area of modulated signal 1", and #3 symbol group (1401-3) for modulated signal 1 in FIG. 14 includes "signal A-3 in the data transmission area of modulated signal 1". Specifically, #1 symbol group (1401-1) for modulated signal 1, #2 symbol group (1401-2) for modulated signal 1, and #3 symbol group (1401-3) for modulated signal 1 include equivalent signals.

Further, "signal A-1 in the data transmission area of modulated signal 2" which is a signal constituted by a signal equivalent to a signal which constitutes "signal A in the data transmission area of modulated signal 2", "signal A-2 in the data transmission area of modulated signal 2" which is a signal constituted by a signal equivalent to a signal which constitutes "signal A in the data transmission area of modulated signal 2", and "signal A-3 in the data transmission area of modulated signal 2" which is a signal constituted by a signal equivalent to a signal which constitutes "signal A in the data transmission area of modulated signal 2" are prepared (thus, the signal which constitutes "signal A-1 in the data transmission area of modulated signal 2", the signal which constitutes "signal A-2 in the data transmission area of modulated signal 2", and the signal which constitutes "signal A-3 in the data transmission area of modulated signal 2" are the same).

At this time, #1 symbol group (1402-1) for modulated signal 2 in FIG. 14 includes "signal A-1 in the data transmission area of modulated signal 2", #2 symbol group (1402-2) for stream 2 in FIG. 14 includes "signal A-2 in the data transmission area of modulated signal 2", and #3 symbol group (1402-3) for modulated signal 2 in FIG. 14 includes "signal A-3 in the data transmission area of modulated signal 2". Specifically, #1 symbol group (1402-1) for modulated signal 2, #2 symbol group (1402-2) for modulated signal 2, and #3 symbol group (1402-3) for modulated signal 2 include equivalent signals.

Figure 15:
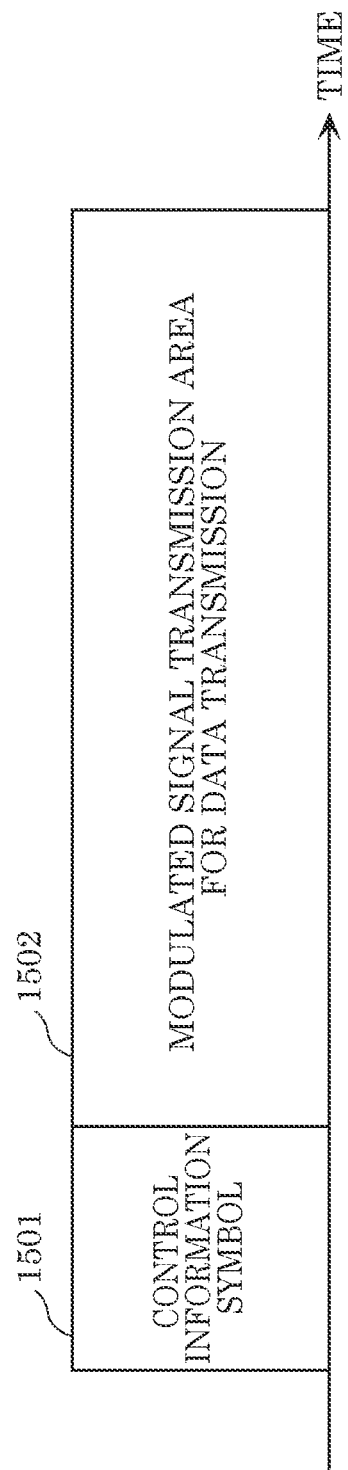
FIG. 15 is a diagram illustrating an example of a frame configuration.

FIG. 15 illustrates an example of a frame configuration of "symbol group #Y for modulated signal X" (X=1, 2; Y=1, 2, 3) described with reference to FIG. 14. In FIG. 15, the horizontal axis indicates time, 1501 indicates a control information symbol, and 1502 indicates a modulated signal transmission area for data transmission. At this time, modulated signal transmission area 1502 for data transmission includes symbols for transmitting "signal A in the data transmission area of modulated signal 1" or "signal A in the data transmission area of modulated signal 2" described with reference to FIG. 14.

Note that in the frame configuration in FIG. 15, a multi-carrier method such as an orthogonal frequency division multiplexing (OFDM) method may be used, and in this case, symbols may be present in the direction of the frequency axis. The symbols may each include a reference symbol for a receiving device to perform time synchronization and frequency synchronization, a reference symbol for a receiving device to detect a signal, and a reference symbol for a receiving device to perform channel estimation, for instance. The frame configuration is not limited to the configuration in FIG. 15, and control information symbol 1501 and modulated signal transmission area 1502 for data transmission may be arranged in any manner. A reference symbol may also be called a preamble and a pilot symbol, for example.

Next is a description of a configuration of control information symbol 1501.

Figure 16:
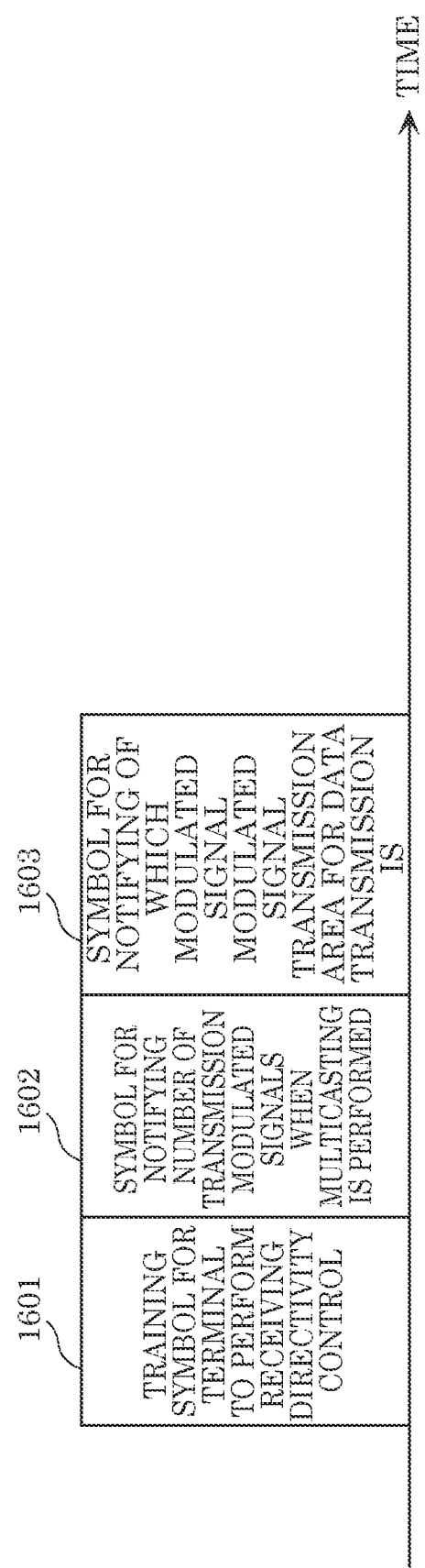
FIG. 16 is a diagram illustrating an example of a symbol configuration.

FIG. 16 illustrates an example of a configuration of symbols which are to be transmitted as a control information symbol in FIG. 15, and the horizontal axis indicates time. In FIG. 16, 1601 denotes "a training symbol for a terminal to perform receiving directivity control", and the terminal determines a signal processing method for the directivity control for receiving, which is performed by "signal processor 405" and/or "antennas 401-1 to 401-N" and/or "multipliers 603-1 to 603-L and processor 605", by receiving "training symbol for a terminal to perform receiving directivity control" 1601.

1602 denotes "a symbol for notifying the number of transmission modulated signals when multicasting is performed", and the terminal is informed of the number of modulated signals which are to be obtained, by receiving "symbol for notifying the number of transmission modulated signals when multicasting is performed" 1602.

1603 denotes "a symbol for notifying of which modulated signal a modulated signal transmission area for data transmission is", and the terminal can be informed of which modulated signal has been successfully received among modulated signals which the base station is transmitting, by receiving "symbol for notifying of which modulated signal a modulated signal transmission area for data transmission is" 1603.

An example of the above is to be described.

Now consider the case where the base station is transmitting "modulated signals" using transmission beams as illustrated in FIG. 12. Specific information on a control information symbol in #1 symbol group 1401-1 for modulated signal 1 in FIG. 14 is to be described.

In the case of FIG. 12, the base station is transmitting "modulated signal 1" and "modulated signal 2", and thus information indicated by "symbol for notifying the number of transmission modulated signals when multicasting is performed" 1602 is "2".

1 symbol group 1401-1 for modulated signal 1 in FIG. 14 is for transmitting a signal in the data transmission area of modulated signal 1, and thus information indicated by "symbol for notifying of which modulated signal a modulated signal transmission area for data transmission is" 1603 indicates "modulated signal 1".

For example, a terminal is assumed to receive #1 symbol group 1401-1 for modulated signal 1 in FIG. 14. At this time, the terminal becomes aware that "the number of modulated signals is 2" is obtained from "symbol for notifying the number of transmission modulated signals when multicasting is performed" 1602, and that "modulated signal 1" from "symbol for notifying of which modulated signal a modulated signal transmission area for data transmission is" 1603.

The terminal then becomes aware that "the number of present modulated signals is 2" and that the obtained modulated signal is "modulated signal 1", and thus the terminal is aware that "modulated signal 2" is to be obtained. Accordingly, the terminal can start operation of searching for "modulated signal 2". The terminal searches for one of transmission beams for any of "#1 symbol group 1402-1 for modulated signal 2", "#2 symbol group 1402-2 for modulated signal 2", "#3 symbol group 1402-3 for modulated signal 2" in FIG. 14, for example.

The terminal obtains both "modulated signal 1" and "modulated signal 2", and can obtain data symbols for stream 1 and data symbols for stream 2 with high quality, by obtaining one transmission beam for "#1 symbol group 1402-1 for modulated signal 2", "#2 symbol group 1402-2 for modulated signal 2", and "#3 symbol group 1402-3 for modulated signal 2".

Configuring a control information symbol in the above manner yields advantageous effects that the terminal can precisely obtain data symbols.

As described above, in multicast data transmission and broadcast data transmission, the base station transmits data symbols using a plurality of transmission beams, and a terminal selectively receives a transmission beam with good quality among the plurality of transmission beams, thus achieving advantageous effects that a modulated signal which the base station has transmitted increases an area where high data receiving quality is achieved. This is because the base station performs transmission directivity control and receiving directivity control.

In the above description, a terminal performs receiving directivity control, yet advantageous effects can be obtained as mentioned above without the terminal performing receiving directivity control.

Note that the case where each terminal obtains both a modulated signal of stream 1 and a modulated signal of stream 2 is described with reference to FIG. 7, yet the present disclosure is not limited to such an embodiment. For example, an embodiment in which a modulated signal desired to be obtained varies depending on a terminal may be achieved as in a case where there are a terminal which desires to obtain a modulated signal of stream 1, a terminal which desires to obtain a modulated signal of stream 2, and a terminal which desires to obtain both a modulated signal of stream 1 and a modulated signal of stream 2.

Embodiment 2

Embodiment 1 has described a method in which a base station transmits data symbols using a plurality of transmission beams in multicast data transmission and broadcast data transmission. The present embodiment describes, as a variation of Embodiment 1, the case where a base station performs unicast data transmission as well as multicast data transmission and broadcast data transmission.

Figure 17:
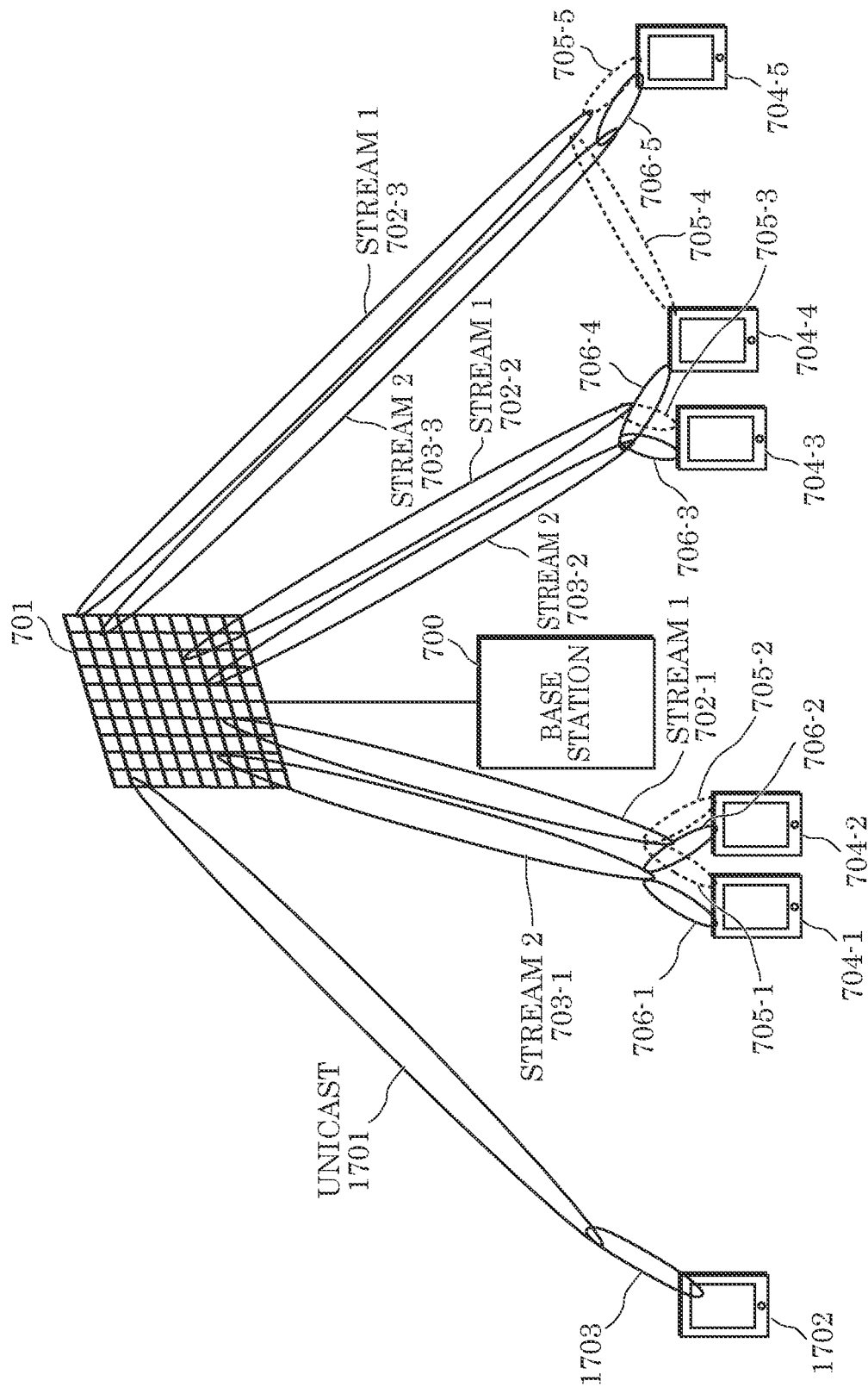
FIG. 17 is a diagram illustrating an example of a state of communication between the base station and terminals.

FIG. 17 illustrates an example of a state of communication between the base station (or an access point, for instance) and terminals. Elements which operate in the same manner as those in FIG. 7 are assigned the same reference numerals, and a detailed description thereof is omitted.

Base station 700 includes a plurality of antennas, and transmits a plurality of transmission signals through antenna 701 for transmission. At this time, base station 700 has a configuration as illustrated in, for example, FIG. 1 or 3, and performs transmission beamforming (directivity control) by signal processor 102 (and/or weighting synthesizer 301) performing precoding (weighting synthesis).

Then, transmission beams 702-1, 702-2, 702-3, 703-1, 703-2, and 703-3 are as described with reference to FIG. 7, and thus a description thereof is omitted.

Terminals 704-1, 704-2, 704-3, 704-4, and 704-5, and receiving directivities 705-1, 705-2, 705-3, 705-4, 705-5, 706-1, 706-2, 706-3, 706-4, and 706-5 are as described with reference to FIG. 7, and thus a description thereof is omitted.

In FIG. 17, a distinguishing point is that the base station performs multicasting, as described with reference to FIG. 7, and also base station 700 and a terminal (for example, 1702) perform unicast communication.

In addition to transmission beams for multicasting 702-1, 702-2, 702-3, 703-1, 703-2, and 703-3, in FIG. 17, base station 700 generates transmission beam 1701 for unicasting, and transmits to terminal 1702 data therefor. Note that FIG. 17 illustrates an example in which base station 700 transmits one transmission beam 1702 to terminal 1702. Yet, the number of transmission beams is not limited to one, and base station 700 may transmit a plurality of transmission beams to terminal 1702 (may transmit a plurality of modulated signals).

Terminal 1702 performs directivity control for receiving, via "signal processor 405" and/or "antennas 401-1 to 401-N" and/or "multipliers 603-1 to 603-L and signal processor 605", and forms receiving directivity 1703. This allows terminal 1702 to receive and demodulate transmission beam 1701.

Note that in order to generate transmission beams which include transmission beam 1701, the base station performs precoding (weighting synthesis) using signal processor 102 (and/or weighting synthesizer 301) in the configuration as illustrated in FIG. 1 or 3, for example.

On the contrary, when terminal 1702 transmits a modulated signal to base station 700, the terminal performs precoding (or weighting synthesis), and transmits transmission beam 1703. Base station 700 performs directivity control for receiving and forms receiving directivity 1701. Accordingly, base station 700 can receive and demodulate transmission beam 1703.

Note that base station 700 transmits transmission beam 702-1 for transmitting data of stream 1 and transmission beam 703-1 for transmitting data of stream 2, using the same frequency (the same frequency band) at the same time. Base station 700 transmits transmission beam 702-2 for transmitting data of stream 1 and transmission beam 703-2 for transmitting data of stream 2, using the same frequency (the same frequency band) at the same time. Further, base station 700 transmits transmission beam 702-3 for transmitting data of stream 1 and transmission beam 703-3 for transmitting data of stream 2, using the same frequency (the same frequency band) at the same time.

Transmission beams 702-1, 702-2, and 702-3 for transmitting data of stream 1 may be beams having the same frequency (the same frequency band), or may be beams having different frequencies (different frequency bands). Transmission beams 703-1, 703-2, and 703-3 for transmitting data of stream 2 may be beams having the same frequency (the same frequency band), or may be beams having different frequencies (different frequency bands).

Then, transmission beam 1701 for unicasting may be a beam having the same frequency (the same frequency band) as or a different frequency (a different frequency band) from those of transmission beams 702-1, 702-2, 702-3, 703-1, 703-2, and 703-3.

A description has been given with reference to FIG. 17, assuming that a terminal which performs unicast communication is a single terminal, yet the number of terminals which perform unicast communication with the base station may be two or more.

Operation of setting unit 158 at this time in the base station having the configuration illustrated in FIG. 1 or 3 is described.

Setting unit 158 receives an input of setting signal 160. Setting signal 160 includes information with regard to "whether to perform transmission for multicasting or transmission for unicasting", and if the base station performs transmission as illustrated in FIG. 17, information indicating "to perform both transmission for multicasting and transmission for unicasting" is input to setting unit 158 according to setting signal 160.

Also, setting signal 160 includes information with regard to "the number of transmission streams when multicasting is performed" and if the base station performs transmission as illustrated in FIG. 17, information indicating that "the number of transmission streams is 2" is input to setting unit 158 according to setting signal 160.

Setting signal 160 may include information with regard to "how many transmission beams are to be used to transmit each stream". If the base station performs transmission as illustrated in FIG. 17, information indicating that "the number of transmission beams for transmitting stream 1 is 3 and the number of transmission beams for transmitting stream 2 is 3" is input to setting unit 158 according to setting signal 160.

Note that the base station in FIGS. 1 and 3 may transmit a control information symbol which includes information with regard to "whether to perform transmission for multicasting or transmission for unicasting", information with regard to "the number of transmission streams when multicasting is performed", information with regard to "how many transmission beams are to be used to transmit each stream", and others. Accordingly, a terminal can appropriately receive data.

Furthermore, the base station may transmit, to a terminal with which the base station performs unicast communication, a control information symbol for training for the base station to perform directivity control, and a control information symbol for training for a terminal to perform directivity control.

Figure 18:
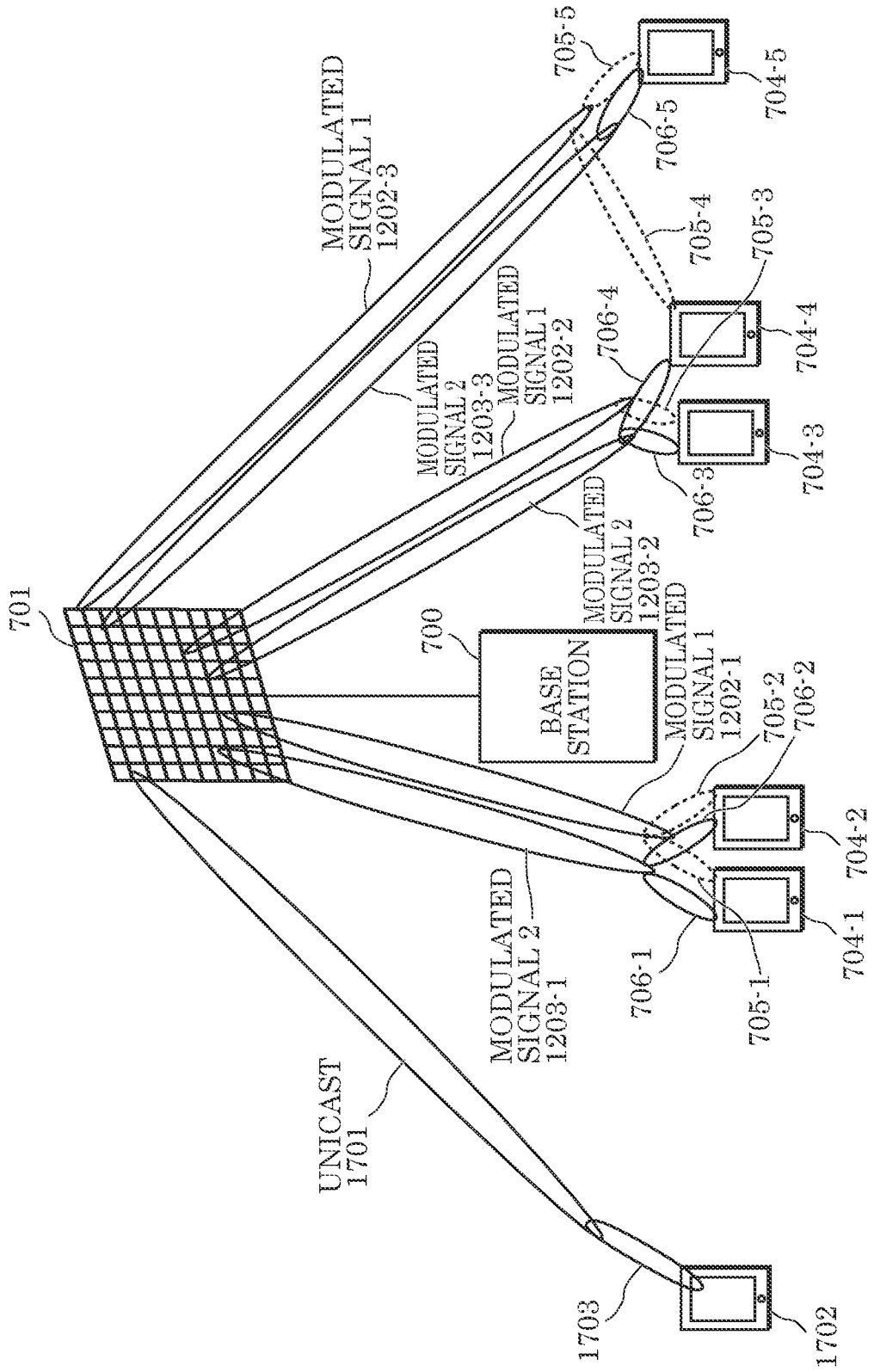
FIG. 18 is a diagram illustrating an example of a state of communication between the base station and terminals.

FIG. 18 illustrates an example of a state of communication between a base station (or an access point or the like) and terminals, and elements which operate in the same manner as those in FIGS. 7 and 12 are assigned the same reference numerals in FIG. 18, and a detailed description thereof is omitted.

Base station 700 includes a plurality of antennas, and transmits a plurality of transmission signals from antenna 701 for transmission. At this time, base station 700 has a configuration as illustrated in, for example, FIG. 1 or 3, and performs transmission beamforming (directivity control) by signal processor 102 (and/or weighting synthesizer 301) performing precoding (weighting synthesis).

A description of transmission beams 1202-1, 1202-2, 1202-3, 1203-1, 1203-2, and 1203-3 is as described with reference to FIG. 12, and thus a description thereof is omitted.

A description of terminals 704-1, 704-2, 704-3, 704-4, and 704-5, and receiving directivities 705-1, 705-2, 705-3, 705-4, 705-5, 706-1, 706-2, 706-3, 706-4, and 706-5 is as given with reference to FIG. 12, and thus a description thereof is omitted.

A distinguishing point in FIG. 18 is that while the base station performs multicasting, base station 700 and a terminal (for example, 1702) perform unicast communication.

In FIG. 18, base station 700 generates transmission beam 1701 for unicasting in addition to transmission beams 1202-1, 1202-2, 1202-3, 1203-1, 1203-2, and 1203-3 for multicasting, and transmits to terminal 1702 data therefor. Note that FIG. 18 illustrates an example in which base station 700 transmits one transmission beam 1701 to terminal 1702, yet the number of transmission beams is not limited to one, and base station 700 may transmit a plurality of transmission beams to terminal 1702 (may transmit a plurality of modulated signals).

Terminal 1702 performs directivity control for receiving, via "signal processor 405" and/or "antennas 401-1 to 401-N" and/or "multipliers 603-1 to 603-L and signal processor 605", and forms receiving directivity 1703. Accordingly, terminal 1702 can receive and demodulate transmission beam 1701.

Note that in order to generate transmission beams which include transmission beam 1701, the base station performs precoding (weighting synthesis) in signal processor 102 (and/or, weighting synthesizer 301) in the configuration as illustrated in, for example, FIG. 1 or 3.

On the contrary, when terminal 1702 transmits a modulated signal to base station 700, the terminal performs precoding (or weighting synthesis), and transmits transmission beam 1703, and base station 700 performs directivity control for receiving, and forms receiving directivity 1701. Accordingly, base station 700 can receive and demodulate transmission beam 1703.

Note that base station 700 transmits transmission beam 1202-1 for transmitting "modulated signal 1" and transmission beam 1203-1 for transmitting "modulated signal 2", using the same frequency (the same frequency band) at the same time. Then, base station 700 transmits transmission beam 1202-2 for transmitting "modulated signal 1" and transmission beam 1203-2 for transmitting "modulated signal 2", using the same frequency (the same frequency band) at the same time. Further, base station 700 transmits transmission beam 1202-3 for transmitting "modulated signal 1" and transmission beam 1203-3 for transmitting "modulated signal 2", using the same frequency (the same frequency band) at the same time.

Transmission beams 1202-1, 1202-2, and 1202-3 for transmitting "modulated signal 1" may be beams having the same frequency (the same frequency band) or may be beams having different frequencies (different frequency bands). Transmission beams 1203-1, 1203-2, and 1203-3 for transmitting "modulated signal 2" may be beams having the same frequency (the same frequency band) or may be beams having different frequencies (different frequency bands).

Transmission beam 1701 for unicasting may be a beam having the same frequency (the same frequency band) as or a different frequency (different frequency band) from those of transmission beams 1202-1, 1202-2, 1202-3, 1203-1, 1203-2, and 1203-3.

A description has been given with reference to FIG. 18, assuming that a terminal which performs unicast communication is a single terminal, yet the number of terminals which perform unicast communication with the base station may be two or more.

Operation of setting unit 158 at this time in the base station having the configuration illustrated in FIG. 1 or 3 is described.

Setting unit 158 receives an input of setting signal 160. Setting signal 160 includes information with regard to "whether to perform transmission for multicasting or transmission for unicasting", and if the base station performs transmission as illustrated in FIG. 18, information indicating "to perform both transmission for multicasting and transmission for unicasting" is input to setting unit 158 according to setting signal 160.

Setting signal 160 also includes information with regard to "the number of transmission streams when multicasting is performed" and if the base station performs transmission as illustrated in FIG. 18, information indicating that "the number of transmission streams is 2" is input to setting unit 158 according to setting signal 160.

Setting signal 160 may include information with regard to "how many transmission beams are to be used to transmit each stream". If the base station performs transmission as illustrated in FIG. 18, information indicating that "the number of transmission beams for transmitting stream 1 is 3 and the number of transmission beams for transmitting stream 2 is 3" is input to setting unit 158 according to setting signal 160.

Note that the base station in FIGS. 1 and 3 may transmit a control information symbol which includes information with regard to "whether to perform transmission for multicasting or transmission for unicasting", information with regard to "the number of transmission streams when multicasting is performed", and information with regard to "how many transmission beams are to be used to transmit each stream", for instance. Accordingly, a terminal can appropriately receive data.

Furthermore, the base station may transmit, to a terminal with which the base station performs unicast communication, a control information symbol for training for the base station to perform directivity control, and a control information symbol for training for a terminal to perform directivity control.

The following describes the case where the base station transmits a plurality of data by multicasting, as a variation of Embodiment 1.

Figure 19:
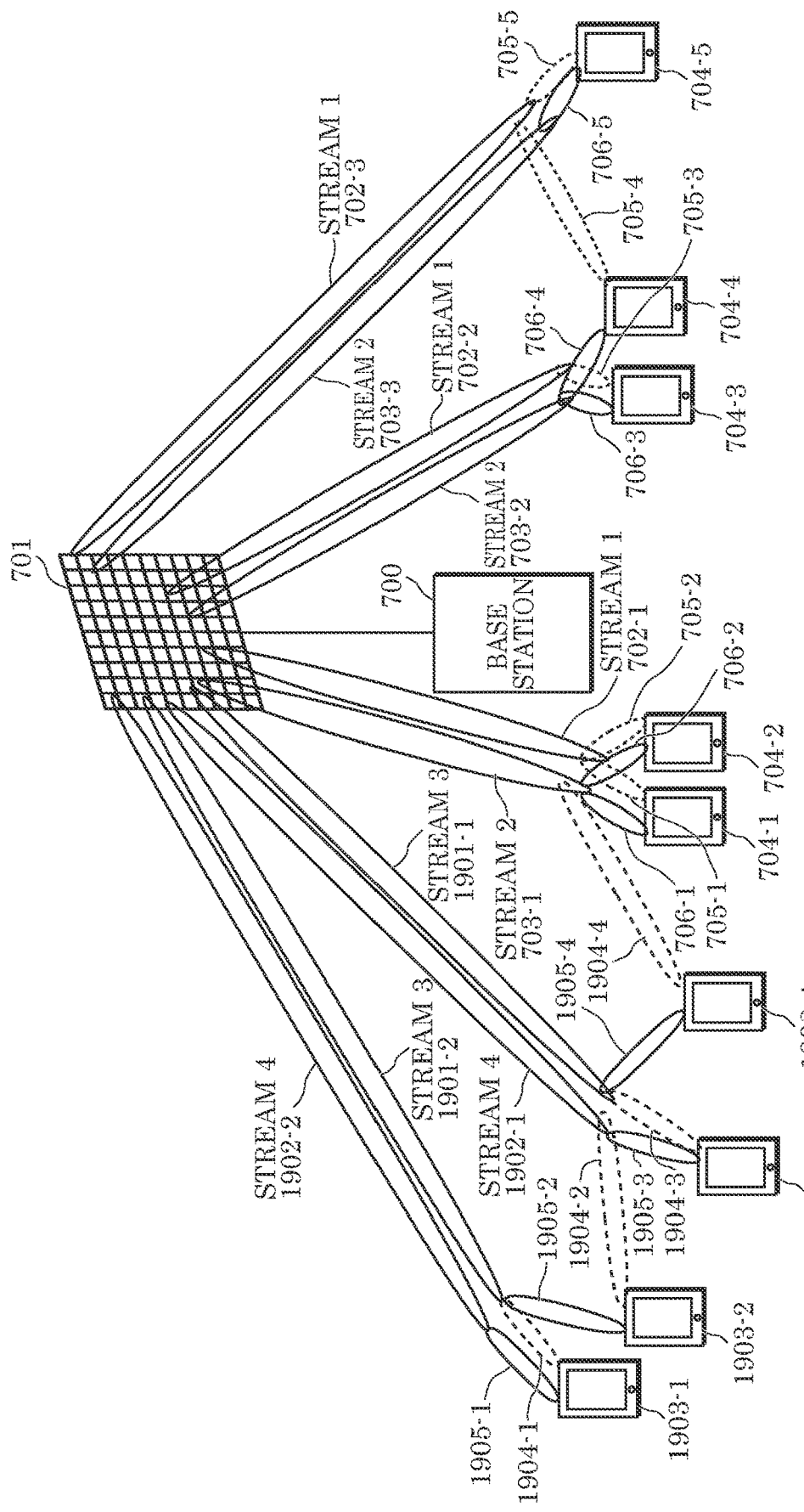
FIG. 19 is a diagram illustrating an example of a state of communication between the base station and terminals.

FIG. 19 illustrates an example of a state of communication between the base station (or an access point, for instance) and terminals, and elements which operate in the same manner as those in FIG. 7 are assigned the same reference numerals in FIG. 19, so that a detailed description thereof is omitted.

Base station 700 includes a plurality of antennas, and transmits a plurality of transmission signals through antenna 701 for transmission. At this time, base station 700 has a configuration as illustrated in, for example, FIG. 1 or 3, and performs transmission beamforming (directivity control) by signal processor 102 (and/or weighting synthesizer 301) performing precoding (weighting synthesis).

A description of transmission beams 702-1, 702-2, 702-3, 703-1, 703-2, and 703-3 is as given with reference to FIG. 7, and thus a description thereof is omitted.

A description of terminals 704-1, 704-2, 704-3, 704-4, and 704-5 and receiving directivities 705-1, 705-2, 705-3, 705-4, 705-5, 706-1, 706-2, 706-3, 706-4, and 706-5 is as described with reference to FIG. 7, and thus a description thereof is omitted.

Base station 700 transmits transmission beams 1901-1, 1901-2, 1902-1, and 1902-2, in addition to transmission beams 702-1, 702-2, 702-3, 703-1, 703-2, and 703-3.

Transmission beam 1901-1 is a transmission beam for transmitting data of stream 3. Transmission beam 1901-2 is also a transmission beam for transmitting data of stream 3.

Transmission beam 1902-1 is a transmission beam for transmitting data of stream 4. Transmission beam 1902-2 is also a transmission beam for transmitting data of stream 4.

Reference numerals 704-1, 704-2, 704-3, 704-4, 704-5, 1903-1, 1903-2, and 1903-3 denote terminals, and each have a configuration as illustrated in FIGS. 4 and 5, for example. Note that operation of terminals 704-1, 704-2, 704-3, 704-4, and 704-5 is as described with reference to FIG. 7.

Terminal 1903-1 performs directivity control for receiving, via "signal processor 405" and/or "antennas 401-1 to 401-N" and/or "multipliers 603-1 to 603-L and processor 605", and forms receiving directivity 1904-1 and receiving directivity 1905-1. Receiving directivity 1904-1 allows terminal 1903-1 to receive and demodulate transmission beam 1901-2 for transmitting data of stream 3, and receiving directivity 1905-1 allows terminal 1903-1 to receive and demodulate transmission beam 1902-2 for transmitting data of stream 4.

Terminal 1903-2 performs directivity control for receiving, via "signal processor 405" and/or "antennas 401-1 to 401-N" and/or "multipliers 603-1 to 603-L and processor 605", and forms receiving directivity 1904-2 and receiving directivity 1905-2. Receiving directivity 1904-2 allows terminal 1903-2 to receive and demodulate transmission beam 1902-1 for transmitting data of stream 4, and receiving directivity 1905-2 allows terminal 1903-2 to receive and demodulate transmission beam 1901-2 for transmitting data of stream 3.

Terminal 1903-3 performs directivity control for receiving, via "signal processor 405" and/or "antennas 401-1 to 401-N" and/or "multipliers 603-1 to 603-L and processor 605", and forms receiving directivity 1904-3 and receiving directivity 1905-3. Receiving directivity 1904-3 allows terminal 1903-3 to receive and demodulate transmission beam 1901-1 for transmitting data of stream 3, and receiving directivity 1905-3 allows terminal 1903-3 to receive and demodulate transmission beam 1902-1 for transmitting data of stream 4.

Terminal 1903-4 performs directivity control for receiving, via "signal processor 405" and/or "antennas 401-1 to 401-N" and/or "multipliers 603-1 to 603-L and processor 605", and forms receiving directivity 1904-4 and receiving directivity 1905-4. Receiving directivity 1904-4 allows terminal 1903-4 to receive and demodulate transmission beam 703-1 for transmitting data of stream 2, and receiving directivity 1905-4 allows terminal 1903-4 to receive and demodulate transmission beam 1901-1 for transmitting data of stream 3.

In FIG. 19, a distinguishing point is that the base station transmits a plurality of streams each including data for multicasting, and also transmits each stream using a plurality of transmission beams, and each terminal selectively receives one or more transmission beams for one more streams among a plurality of streams.

Note that base station 700 transmits transmission beam 702-1 for transmitting data of stream 1 and transmission beam 703-1 for transmitting data of stream 2, using the same frequency (the same frequency band) at the same time. Base station 700 transmits transmission beam 702-2 for transmitting data of stream 1 and transmission beam 703-2 for transmitting data of stream 2, using the same frequency (the same frequency band) at the same time. Further, base station 700 transmits transmission beam 702-3 for transmitting data of stream 1 and transmission beam 703-3 for transmitting data of stream 2, using the same frequency (the same frequency band) at the same time.

Base station 700 transmits transmission beam 1901-1 for transmitting data of stream 3 and transmission beam 1902-1 for transmitting data of stream 4, using the same frequency (the same frequency band) at the same time.

Base station 700 transmits transmission beam 1901-2 for transmitting data of stream 3 and transmission beam 1902-2 for transmitting data of stream 4, using the same frequency (the same frequency band) at the same time.

Transmission beams 702-1, 702-2, and 702-3 for transmitting data of stream 1 may be beams having the same frequency (the same frequency band), or may be beams having different frequencies (different frequency bands). Transmission beams 703-1, 703-2, and 703-3 for transmitting data of stream 2 may be beams having the same frequency (the same frequency band), or may be beams having different frequencies (different frequency bands).

Transmission beams 1901-1 and 1901-2 for transmitting data of stream 3 may be beams having the same frequency (the same frequency band), or may be beams having different frequencies (different frequency bands). Transmission beams 1902-1 and 1902-2 for transmitting data of stream 4 may be beams having the same frequency (the same frequency band), or may be beams having different frequencies (different frequency bands).

Then, data symbols for stream 1 and data symbols for stream 2 may be generated from #1 information 101-1 in FIG. 1, and data symbols for stream 3 and data symbols for stream 4 may be generated from #2 information 101-2. Note that error correction coding may be performed on each of #1 information 101-1 and #2 information 101-2, and thereafter data symbols may be generated therefrom.

Data symbols for stream 1 may be generated from #1 information 101-1 in FIG. 1, data symbols for stream 2 may be generated from #2 information 101-2 in FIG. 1, data symbols for stream 3 may be generated from #3 information 101-3 in FIG. 1, and data symbols for stream 4 may be generated from #4 information 101-4 in FIG. 1. Note that error correction coding may be performed on each of #1 information 101-1, #2 information 101-2, #3 information 101-3, and #4 information 101-4, and thereafter data symbols may be generated therefrom.

Specifically, data symbols for streams may be generated from any of the information in FIG. 1. This yields advantageous effect that a terminal can selectively obtain a stream for multicasting.

Operation of setting unit 158 at this time in the base station having the configuration illustrated in FIG. 1 or 3 is to be described.

Setting unit 158 receives an input of setting signal 160. Setting signal 160 includes information with regard to "whether to perform transmission for multicasting or transmission for unicasting", and if the base station performs transmission as illustrated in FIG. 19, information indicating "to perform transmission for multicasting" is input to setting unit 158 according to setting signal 160.

Setting signal 160 includes information with regard to "the number of transmission streams when multicasting is performed" and if the base station performs transmission as illustrated in FIG. 19, information indicating that "the number of transmission streams is 4" is input to setting unit 158 according to setting signal 160.

Setting signal 160 may include information with regard to "how many transmission beams are to be used to transmit each stream". If the base station performs transmission as illustrated in FIG. 19, information indicating that "the number of transmission beams for transmitting stream 1 is 3, the number of transmission beams for transmitting stream 2 is 3, the number of transmission beams for transmitting stream 3 is 2, and the number of transmission beams for transmitting stream 4 is 2" is input to setting unit 158 according to setting signal 160.

Note that the base station in FIGS. 1 and 3 may transmit a control information symbol which includes, for instance, information with regard to "whether to perform transmission for multicasting or transmission for unicasting", information with regard to "the number of transmission streams when multicasting is performed", and information with regard to "how many transmission beams are to be used to transmit each stream". Accordingly, a terminal can appropriately receive data.

The following describes the case where the base station transmits a plurality of data by multicasting, as a variation of Embodiment 1.

Figure 20:
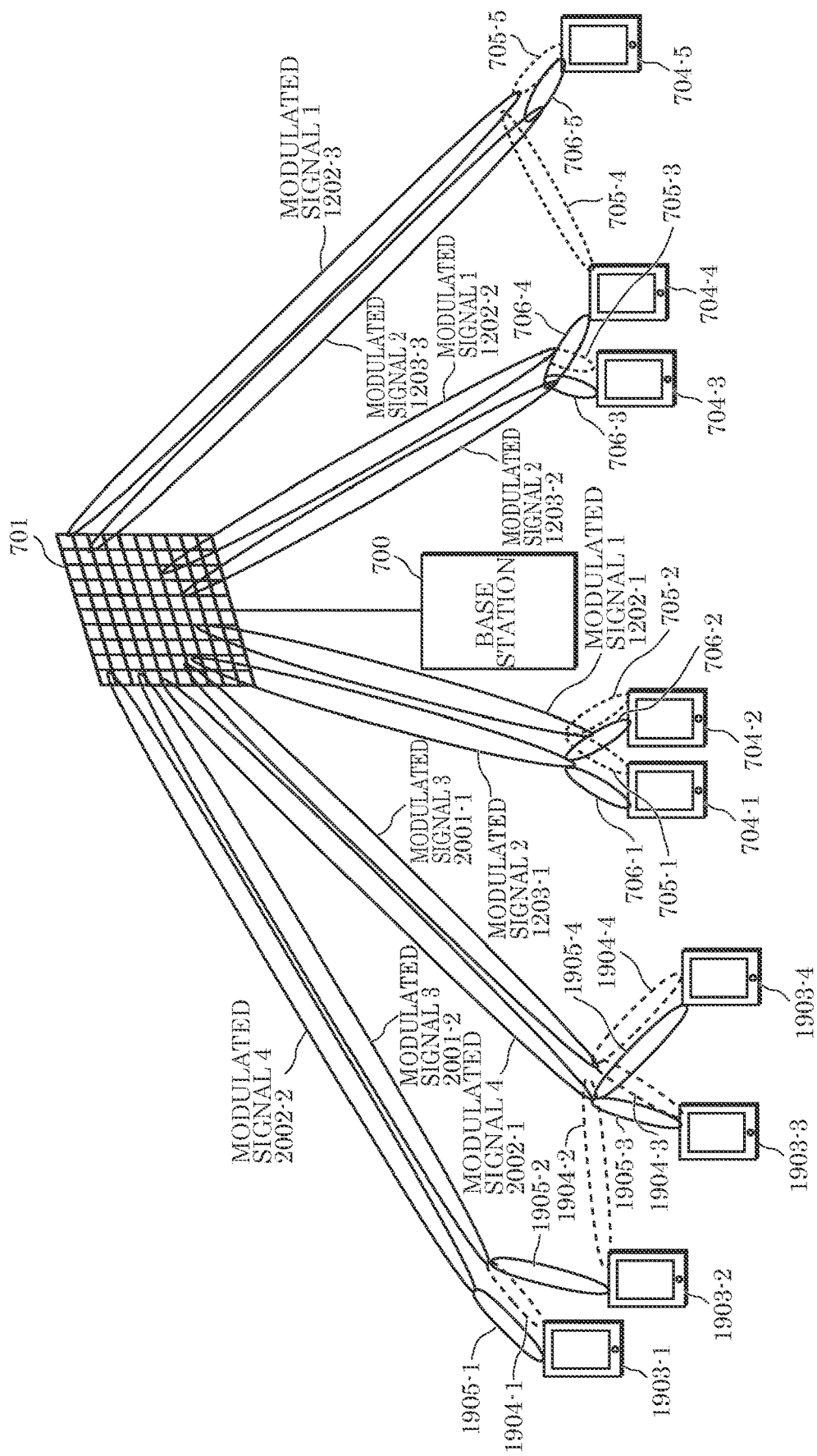
FIG. 20 is a diagram illustrating an example of a state of communication between the base station and terminals.

FIG. 20 illustrates an example of a state of communication between the base station (or an access point, for instance) and terminals, and elements which operate in the same manner as those in FIGS. 7, 12, and 19 are assigned the same reference numerals in FIG. 20, so that a detailed description thereof is omitted.

Base station 700 includes a plurality of antennas, and transmits a plurality of transmission signals from antenna 701 for transmission. At this time, base station 700 has a configuration as illustrated in, for example, FIG. 1 or 3, and performs transmission beamforming (directivity control) by signal processor 102 (and/or weighting synthesizer 301) performing precoding (weighting synthesis).

A description of transmission beams 1202-1, 1202-2, 1202-3, 1203-1, 1203-2, and 1203-3 overlaps a description given with reference to FIG. 12, and thus a description thereof is omitted.

A description of terminals 704-1, 704-2, 704-3, 704-4, and 704-5, and receiving directivity 705-1, 705-2, 705-3, 705-4, 705-5, 706-1, 706-2, 706-3, 706-4, and 706-5 overlaps a description given with reference to FIG. 12, and thus a description thereof is omitted.

Base station 700 transmits transmission beams 2001-1, 2001-2, 2002-1, and 2002-2, in addition to transmission beams 1202-1, 1202-2, 1202-3, 1203-1, 1203-2, and 1203-3.

Transmission beam 2001-1 is a transmission beam for transmitting "modulated signal 3". Transmission beam 2001-2 is also a transmission beam for transmitting "modulated signal 3".

Transmission beam 2002-1 is a transmission beam for transmitting "modulated signal 4". Transmission beam 2002-2 is also a transmission beam for transmitting "modulated signal 4".

Terminals 704-1, 704-2, 704-3, 704-4, 704-5, 1903-1, 1903-2, and 1903-3 have the same configuration as those illustrated in FIGS. 4 and 5, for example. Note that operation of terminals 704-1, 704-2, 704-3, 704-4, and 704-5 is the same as a description given with reference to FIG. 7.

Terminal 1903-1 performs directivity control for receiving, via "signal processor 405" and/or "antennas 401-1 to 401-N" and/or "multipliers 603-1 to 603-L and processor 605", and forms receiving directivity 1904-1 and receiving directivity 1905-1. Receiving directivity 1904-1 allows terminal 1903-1 to receive and demodulate transmission beam 2001-2 for transmitting "modulated signal 3", and receiving directivity 1905-1 allows terminal 1903-1 to receive and demodulate transmission beam 2002-2 for transmitting "modulated signal 4".

Terminal 1903-2 performs directivity control for receiving, via "signal processor 405" and/or "antennas 401-1 to 401-N" and/or "multipliers 603-1 to 603-L and processor 605", and forms receiving directivity 1904-2 and receiving directivity 1905-2. Receiving directivity 1904-2 allows terminal 1903-2 to receive and demodulate transmission beam 2002-1 for transmitting "modulated signal 4", and receiving directivity 1905-2 allows terminal 1903-2 to receive and demodulate transmission beam 2001-2 for transmitting "modulated signal 3".

Terminal 1903-3 performs directivity control for receiving, via "signal processor 405" and/or "antennas 401-1 to 401-N" and/or "multipliers 603-1 to 603-L and processor 605", and forms receiving directivity 1904-3 and receiving directivity 1905-3. Receiving directivity 1904-3 allows terminal 1903-3 to receive and demodulate transmission beam 2001-1 for transmitting "modulated signal 3", and receiving directivity 1905-3 allows terminal 1903-3 to receive and demodulate transmission beam 2002-1 for transmitting "modulated signal 4".

Terminal 1903-4 performs directivity control for receiving, via "signal processor 405" and/or "antennas 401-1 to 401-N" and/or "multipliers 603-1 to 603-L and processor 605", and forms receiving directivity 1904-4 and receiving directivity 1905-4. Receiving directivity 1904-4 allows terminal 1903-4 to receive and demodulate transmission beam 2001-1 for transmitting "modulated signal 3", and receiving directivity 1905-4 allows terminal 1903-4 to receive and demodulate transmission beam 2002-1 for transmitting "modulated signal 4".

In FIG. 20, the base station transmits a plurality of modulated signals each including data for multicasting, and transmits each modulated signal using a plurality of transmission beams. Each terminal selectively receives one or more transmission beams used to transmit one or more streams among the plurality of modulated signals.

Note that base station 700 transmits transmission beam 1202-1 for transmitting "modulated signal 1" and transmission beam 1203-1 for transmitting "modulated signal 2", using the same frequency (the same frequency band) at the same time. Then, base station 700 transmits transmission beam 1202-2 for transmitting "modulated signal 1" and transmission beam 1203-2 for transmitting "modulated signal 2", using the same frequency (the same frequency band) at the same time. Further, base station 700 transmits transmission beam 1202-3 for transmitting "modulated signal 1" and transmission beam 1203-3 for transmitting "modulated signal 2", using the same frequency (the same frequency band) at the same time.

Base station 700 transmits transmission beam 2001-1 for transmitting "modulated signal 3" and transmission beam 2002-1 for transmitting "modulated signal 4", using the same frequency (the same frequency band) at the same time. Then, base station 700 transmits transmission beam 2001-2 for transmitting "modulated signal 3" and transmission beam 2002-2 for transmitting "modulated signal 4", using the same frequency (the same frequency band) at the same time.

Transmission beams 702-1, 702-2, and 702-3 for transmitting data of stream 1 may be beams having the same frequency (the same frequency band), or may be beams having different frequencies (different frequency bands). Transmission beams 703-1, 703-2, and 703-3 for transmitting data of stream 2 may be beams having the same frequency (the same frequency band), or may be beams having different frequencies (different frequency bands).

Transmission beams 2001-1 and 2001-2 for transmitting "modulated signal 3" may be beams having the same frequency (the same frequency band) or may be beams having different frequencies (different frequency bands). Transmission beams 2002-1 and 2002-2 for transmitting "modulated signal 4" may be beams having the same frequency (the same frequency band) or may be beams having different frequencies (different frequency bands).

Operation of setting unit 158 at this time in the base station having the configuration illustrated in FIG. 1 or 3 is to be described.

Setting unit 158 receives an input of setting signal 160. Setting signal 160 includes information with regard to "whether to perform transmission for multicasting or transmission for unicasting", and if the base station performs transmission illustrated in FIG. 19, information indicating "to perform transmission for multicasting" is input to setting unit 158 according to setting signal 160.

Setting signal 160 includes information with regard to "the number of transmission modulated signals when multicasting is performed", and if the base station performs transmission illustrated in FIG. 20, information indicating "the number of transmission modulated signals is 4" is input to setting unit 158 according to setting signal 160.

Setting signal 160 may include information with regard to "how many transmission beams are to be used to transmit each modulated signal". When the base station performs transmission illustrated in FIG. 20, information indicating that "the number of transmission beams for transmitting modulated signal 1 is 3, the number of transmission beams for transmitting modulated signal 2 is 3, the number of transmission beams for transmitting modulated signal 3 is 2, and the number of transmission beams for transmitting modulated signal 4 is 2" is input to setting unit 158 according to setting signal 160.

Note that the base station in FIGS. 1 and 3 may transmit a control information symbol which includes, for instance, information with regard to "whether to perform transmission for multicasting or transmission for unicasting", information with regard to "the number of transmission streams when multicasting is performed", information with regard to "how many transmission beams are to be used to transmit each stream". Accordingly, a terminal can appropriately receive data.

Note that in FIG. 20, if a terminal receives both a transmission beam for "modulated signal 1", and a transmission beam for "modulated signal 2", the terminal can obtain data of stream 1 and data of stream 2 with high receiving quality.

Similarly, if a terminal receives both a transmission beam for "modulated signal 3", and a transmission beam for "modulated signal 4", the terminal can obtain data of stream 3 and data of stream 4 with high receiving quality.

FIG. 20 illustrates an example in which the base station transmits "modulated signal 1", "modulated signal 2", "modulated signal 3", and "modulated signal 4", yet the base station may transmit "modulated signal 5" and "modulated signal 6" for transmitting data of stream 5 and data of stream 6, respectively, and may transmit more modulated signals in order to transmit more streams. Note that the base station transmits each of the modulated signals using one or more transmission beams.

Furthermore, as described with reference to FIGS. 17 and 18, one or more transmission beams for unicasting (or receiving directivity control) may be present.

Figure 21:
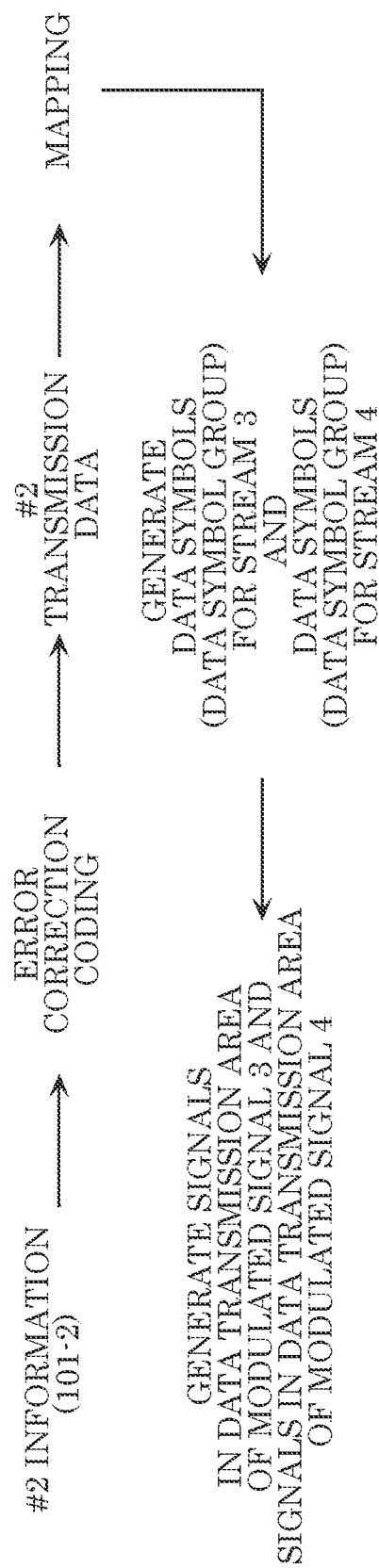
FIG. 21 is a diagram illustrating a relation of a plurality of modulated signals.

A description of a relation between "modulated signal 1" and "modulated signal 2" overlaps a description with reference to FIG. 13, and thus the description thereof is omitted. Here, a description of a relation between "modulated signal 3" and "modulated signal 4" is given with reference to FIG. 21.

For example, #2 information 101-2 is subjected to processing such as error correction coding, and data obtained as a result of the error correction coding is obtained. The data obtained as a result of the error correction coding is named #2 transmission data. Data symbols are obtained by mapping #2 transmission data. The data symbols are separated into data symbols for stream 3 and data symbols for stream 4, so that data symbols (data symbol group) for stream 3 and data symbols (data symbol group) for stream 4 are obtained. At this time, a data symbol having symbol number i for stream 3 is s3(i), and a data symbol having symbol number i for stream 4 is s4(i). Then, "modulated signal 3" tx3(i) having symbol number i is expressed as follows, for example.

[Math 5]

$$tx3(i)=e(i)\times s3(i)+f(i)\times s4(i) \qquad \text{Expression (5)}$$

Then, "modulated signal 4" tx4(i) having symbol number i is expressed as follows, for example.

[Math 6]

$$tx4(i)=g(i)\times s3(i)+h(i)\times s4(i) \qquad \text{Expression (6)}$$

Note that e(i), f(i), g(i), and h(i) in Expressions (5) and (6) can be defined by complex numbers, and thus may be real numbers.

Although e(i), f(i), g(i), and h(i) are indicated, e(i), f(i), g(i), and h(i) may not be functions of symbol number i and may be fixed values.

Then, the base station in FIG. 1 or 3 transmits "a symbol group for modulated signal 3" which includes "signals in a data transmission area of modulated signal 3" which are constituted by data symbols. Then, the base station in FIG. 1 or 3 transmits "a symbol group for modulated signal 4" which includes "signals in a data transmission area of modulated signal 4" which are constituted by data symbols.

Supplementary Note

As a matter of course, the present disclosure may be carried out by combining a plurality of the exemplary embodiments and other contents described herein.

Moreover, each exemplary embodiment and the other contents are only examples. For example, while a "modulating method, an error correction coding method (an error correction code, a code length, a coding rate and the like to be used), control information and the like" are exemplified, it is possible to carry out the present disclosure with the same configuration even when other types of a "modulating method, an error correction coding method (an error correction code, a code length, a coding rate and the like to be used), control information and the like" are applied.

As for a modulating method, even when a modulating method other than the modulating methods described herein is used, it is possible to carry out the exemplary embodiments and the other contents described herein. For example, amplitude phase shift keying (APSK), pulse amplitude modulation (PAM), phase shift keying (PSK), and quadrature amplitude modulation (QAM) may be applied, or in each modulating method, uniform mapping or non-uniform mapping may be performed. APSK includes 16APSK, 64APSK, 128APSK, 256APSK, 1024APSK, and 4096APSK, for example. PAM includes 4PAM, 8PAM, 16PAM, 64PAM, 128PAM, 256PAM, 1024PAM, and 4096PAM, for example. PSK includes BPSK, QPSK, 8PSK, 16PSK, 64PSK, 128PSK, 256PSK, 1024PSK, and 4096PSK, for example. QAM includes 4QAM, 8QAM, 16QAM, 64QAM, 128QAM, 256QAM, 1024QAM, and 4096QAM, for example.

A method for arranging signal points, such as 2 signal points, 4 signal points, 8 signal points, 16 signal points, 64 signal points, 128 signal points, 256 signal points, and 1024 signal points on an I-Q plane (a modulating method having 2 signal points, 4 signal points, 8 signal points, 16 signal points, 64 signal points, 128 signal points, 256 signal points, and 1024 signal points, for instance) is not limited to a signal point arranging method according to the modulating methods described herein.

The "base station" described herein may be a broadcast station, a base station, an access point, a terminal, or a mobile phone, for example. Then, the "terminal" described herein may be a television, a radio, a terminal, a personal computer, a mobile phone, an access point, or a base station, for instance. The "base station" and the "terminal" in the present disclosure may be devices having a communication function, and such devices may be configured to be connected with devices for running applications such as a television, a radio, a personal computer, and a mobile phone, via a certain interface. Furthermore, in the present embodiment, symbols other than data symbols, such as, for example, a pilot symbol and a symbol for control information may be arranged in any manner in frames.

Then, any names may be given to a pilot symbol and a symbol for control information, and such symbols may be, for example, known symbols modulated using PSK modulation in a transmitting device or a receiving device. Alternatively, the receiving device may be able to learn a symbol transmitted by the transmitting device by establishing synchronization. The receiving device performs, using the symbol, frequency synchronization, time synchronization, channel estimation of each modulated signal (estimation of channel state information (CSI)), and signal detection, for instance. Note that a pilot symbol may be referred to as a preamble, a unique word, a postamble, or a reference symbol, for instance.

Moreover, the control information symbol is a symbol for transmitting information that is used for realizing communication other than communication for data (data of an application, for instance) and that is to be transmitted to a communicating party (for example, a modulating method used for communication, an error correction coding method, a coding rate of the error correction coding method, setting information in an upper layer, and the like).

Note that the present disclosure is not limited to each exemplary embodiment, and can be carried out with various modifications. For example, the case where the present disclosure is performed as a communication device is described in each exemplary embodiment. However, the present disclosure is not limited to this case, and this communication method can also be used as software.

Note that a program for executing the above-described communication method may be stored in a ROM (Read Only Memory) in advance, and a CPU (Central Processing Unit) may be caused to operate this program.

Moreover, the program for executing the above-described communication method may be stored in a computer-readable storage medium, the program stored in the recording medium may be recorded in a RAM (Random Access Memory) of a computer, and the computer may be caused to operate according to this program.

Then, the configurations of the above-described exemplary embodiments, for instance, may be each realized as an LSI (Large Scale Integration) which is typically an integrated circuit having an input terminal and an output terminal. The configurations may be separately formed as one chip, or all or at least one of the configurations of the exemplary embodiments may be formed as one chip. The LSI is described here, but the integrated circuit may also be referred to as an IC (Integrated Circuit), a system LSI, a super LSI, or an ultra LSI, depending on a degree of integration. Moreover, a circuit integration technique is not limited to the LSI, and may be realized by a dedicated circuit or a general purpose processor. After manufacturing of the LSI, a programmable FPGA (Field Programmable Gate Array) or a reconfigurable processor which is reconfigurable in connection or settings of circuit cells inside the LSI may be used. Further, when development of a semiconductor technology or another derived technology provides a circuit integration technology which replaces the LSI, as a matter of course, functional blocks may be integrated by using this technology. Application of biotechnology, for instance, is one such possibility.

Embodiment 3

The present embodiment describes a multicast communication method when beamforming different from the beamforming in Embodiments 1 and 2 is applied.

The configuration of the base station is as described with reference to FIGS. 1 to 3 in Embodiment 1, and thus a description of portions which operate in the same manner as those in Embodiment 1 is omitted. Also the configuration of a terminal which communicates with a base station is as described with reference to FIGS. 4 to 6 in Embodiment 1, and thus a description of portions which operate in the same manner as those in Embodiment 1 is omitted.

The following describes an example of operation of a base station and a terminal in the present embodiment.

Figure 22:
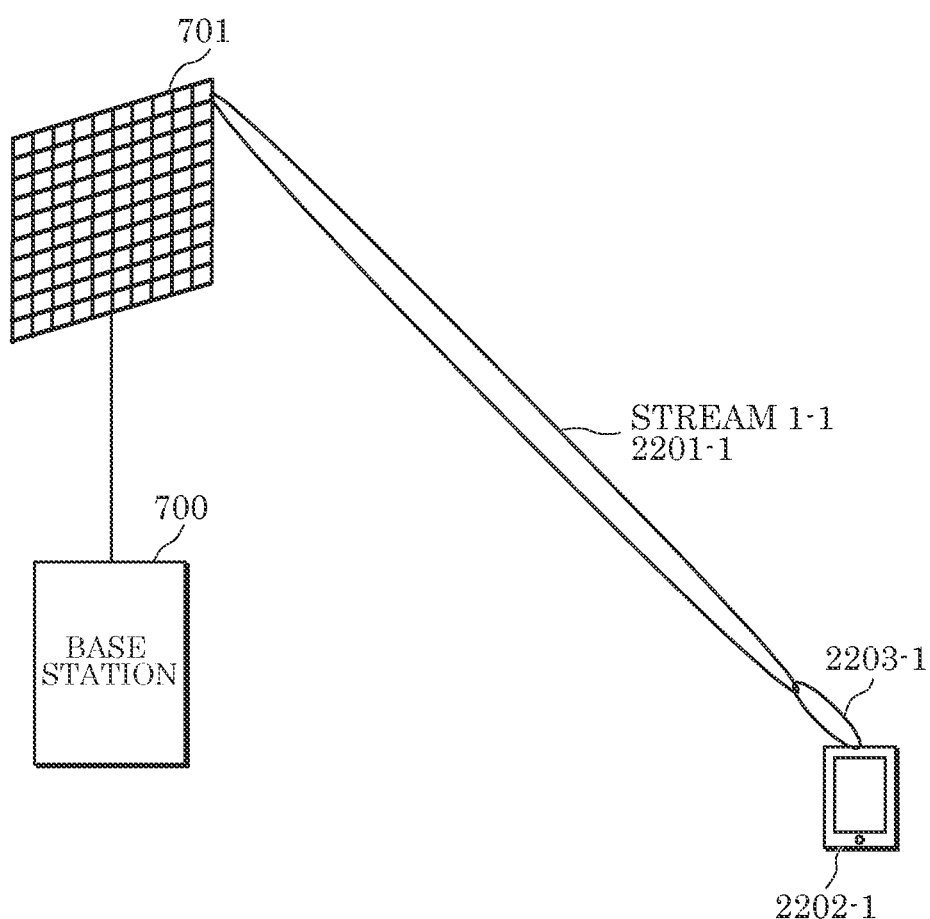
FIG. 22 is a diagram illustrating an example of a state of communication between the base station and a terminal.

FIG. 22 illustrates the case where the base station transmits a transmission stream for multicasting to one terminal.

In FIG. 22, base station 700 transmits transmission beam 2201-1 for "stream 1-1 (a first beam for stream 1) (for multicasting)" from an antenna for transmission to terminal 2202-1, and terminal 2202-1 performs directivity control to generate receiving directivity 2203-1, and receives transmission beam 2201-1 for "stream 1-1".

Figure 23:
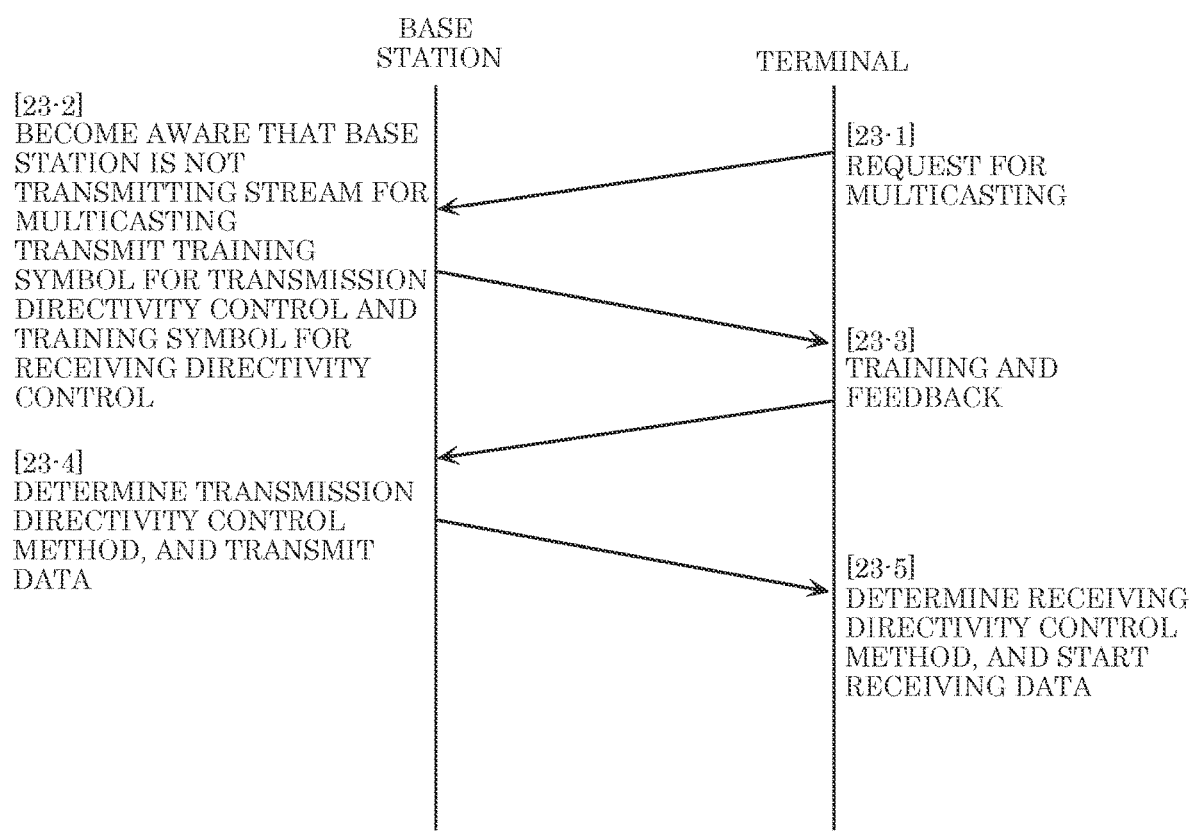
FIG. 23 is a diagram illustrating a procedure of performing communication between the base station and a terminal.

FIG. 23 is for describing a "procedure for performing communication between a base station and a terminal" to achieve the state of communication between the base station and the terminal as illustrated in FIG. 22.

[23-1] First, the terminal transmits a "request to transmit stream 1 by multicasting" to a base station.

[23-2] Upon receiving [23-1], the base station becomes aware that the base station "is not transmitting stream 1 by multicasting". Then, the base station transmits, to the terminal, a training symbol for transmission directivity control, and a training symbol for receiving directivity control, in order to transmit stream 1 by multicasting.

[23-3] The terminal receives the training symbol for transmission directivity control and the training symbol for receiving directivity control transmitted by the base station, and transmits feedback information to the base station in order that the base station performs transmission directivity control and the terminal performs receiving directivity control. [23-4] The base station determines a method for transmission directivity control (determines, for instance, a weighting factor to be used for directivity control), based on the feedback information transmitted by the terminal, performs transmission directivity control, and transmits data symbols for stream 1.

[23-5] The terminal determines a receiving directivity control method (determines, for instance, a weighting factor to be used for directivity control), and starts receiving the data symbols for stream 1 transmitted by the base station.

Note that the "procedure for a base station and a terminal to communicate" in FIG. 23 is an example, and the order of transmitting information items is not limited to the order in FIG. 23, and communication between the base station and the terminal can be similarly established even if the order of transmitting information items has changed. FIG. 23 illustrates, as an example, the case in which the terminal performs receiving directivity control, yet the terminal may not perform receiving directivity control. In such a case, the base station may not transmit a training symbol for receiving directivity control and the terminal does not determine a receiving directivity control method, in FIG. 23.

When the base station performs transmission directivity control, if the base station has a configuration in FIG. 1, for example, multiplication coefficients for multipliers 204-1, 204-2, 204-3, and 204-4 in FIG. 2 are determined, whereas if the base station has a configuration in FIG. 3, weighting factors for weighting synthesizer 301 are determined, for example. Note that the number of streams to be transmitted is "1" in FIG. 22, yet the present disclosure is not limited to this.

When the terminal performs receiving directivity control, if the terminal has a configuration in FIG. 4, for example, multiplication coefficients for multipliers 503-1, 503-2, 503-3, and 503-4 in FIG. 5 are determined, whereas when the terminal has the configuration in FIG. 6, multiplication coefficients for multipliers 603-1, 603-2, . . . , and 603-L, for example, are determined.

Figure 24:
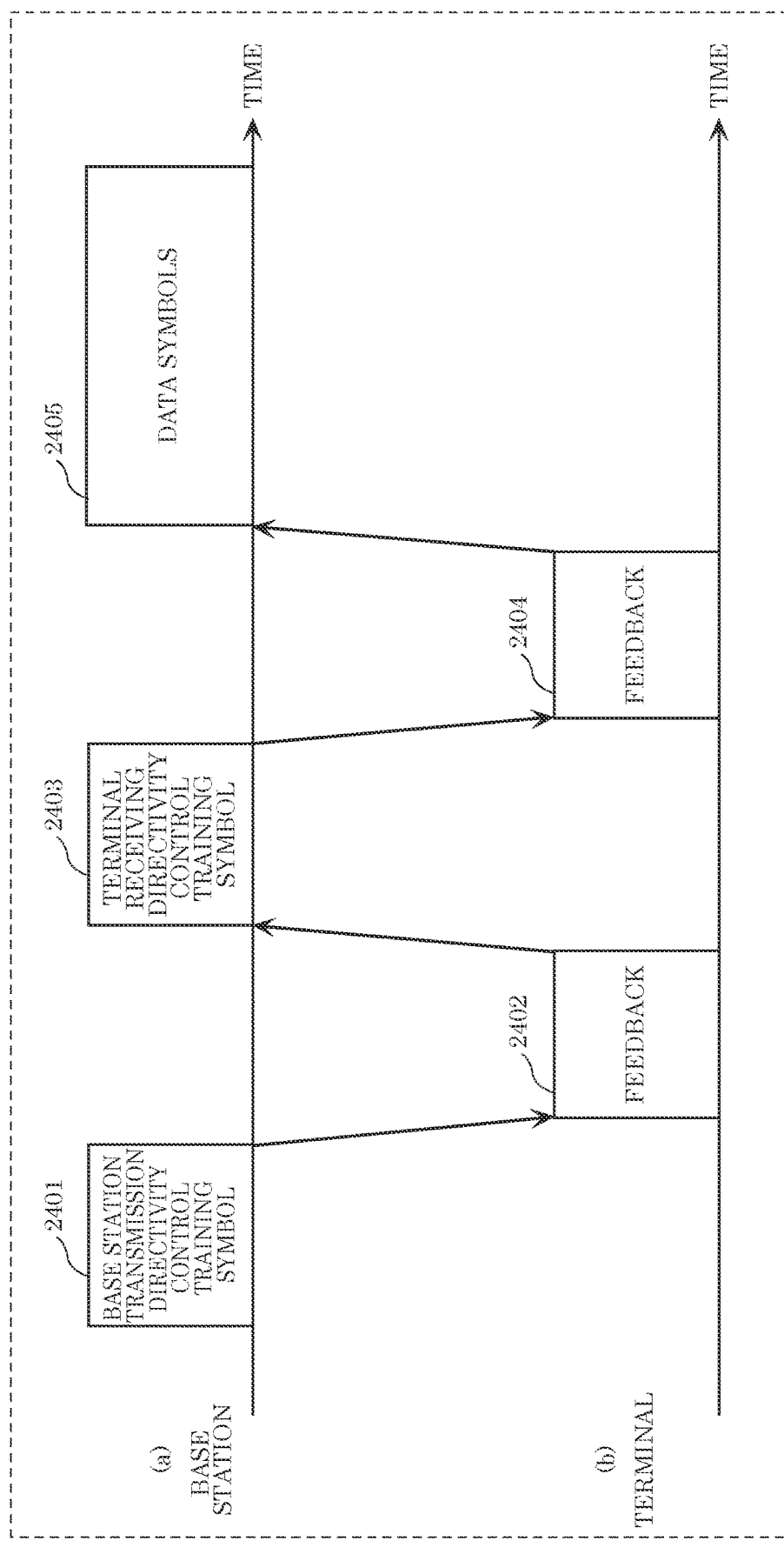
FIG. 24 is a diagram illustrating examples of symbols which the base station and a terminal transmit.

FIG. 24 is a diagram illustrating examples of symbols which the base station transmits and symbols which a terminal transmits along a time-axis, when the base station in FIG. 23 transmits a symbol for transmission directivity control, a symbol for receiving directivity control, and data symbols. In FIG. 24, (a) is a diagram illustrating examples of symbols which the base station transmits, along the time-axis, and (b) is a diagram illustrating examples of symbols which the terminal transmits along the time-axis, while the horizontal axis indicates time in both of (a) and (b).

When the base station and the terminal communicate with each other as illustrated in FIG. 23, first, the base station transmits "base station transmission directivity control training symbol" 2401 as illustrated in FIG. 24. For example, "base station transmission directivity control training symbol" 2401 includes a control information symbol and a known PSK symbol.

Then, the terminal receives "base station transmission directivity control training symbol" 2401 transmitted by the base station, and transmits, as feedback information symbol 2402, information on an antenna to be used by the base station for transmission and information on multiplication coefficients (or weighting factors) to be used for directivity control, for example.

The base station receives "feedback information symbol" 2402 transmitted by the terminal, determines an antenna to be used for transmission from feedback information symbol 2402, and determines a coefficient to be used for transmission directivity control from feedback information symbol 2402. After that, the base station transmits "terminal receiving directivity control training symbol" 2403. For example, "terminal receiving directivity control training symbol" 2403 includes a control information symbol and a known PSK symbol.

Then, the terminal receives "terminal receiving directivity control training symbol" 2403 transmitted by the base station, and determines an antenna which the terminal is to use for receiving and a multiplication coefficient which the terminal is to use for receiving directivity control, for example. Then, the terminal transmits feedback information symbol 2404, notifying that preparation for receiving data symbols is completed.

Then, the base station receives "feedback information symbol" 2404 transmitted by the terminal, and outputs data symbols 2405 based on feedback information symbol 2404.

Note that communication between the base station and the terminal in FIG. 24 is an example, and the order of transmitting symbols and the order in which the base station and the terminal transmit symbols are not limited to those illustrated therein. "Base station transmission directivity control training symbol" 2401, "feedback information symbol" 2402, "terminal receiving directivity control training symbol" 2403, "feedback information symbol" 2404, and "data symbols" 2405 may each include: a preamble for signal detection, time synchronization, frequency synchronization, frequency offset estimation, and channel estimation, a reference symbol, a pilot symbol, and a symbol for transmitting control information, for instance.

Figure 25:
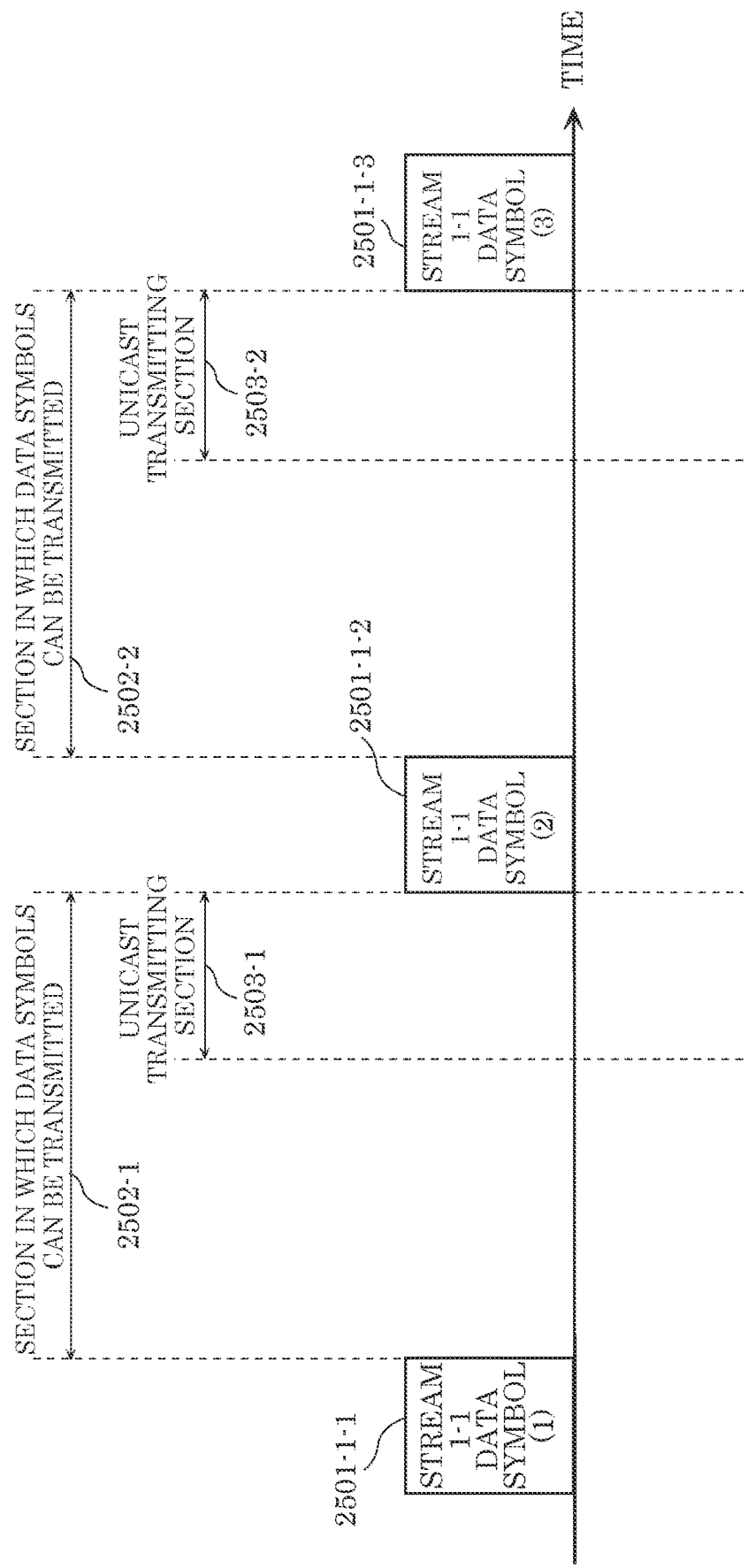
FIG. 25 is a diagram illustrating examples of symbols which the base station transmits.

FIG. 25 illustrates examples of symbols which the base station transmit when the base station transmits data symbols for stream 1 after communication between the base station and the terminal in FIG. 23 is completed, while the horizontal axis indicates time.

In FIG. 25, the base station transmits a first data symbol for transmission beam 1 for stream 1 as "stream 1-1 data symbol (1) (for multicasting)" 2501-1-1. After that, section 2502-1 in which data symbols can be transmitted is arranged.

After that, the base station transmits a second data symbol for transmission beam 1 for stream 1 (for multicasting) as "stream 1-1 data symbol (2) (for multicasting)" 2501-1-2. After that, section 2502-2 in which data symbols can be transmitted is arranged.

After that, the base station transmits a third data symbol for transmission beam 1 for stream 1 (for multicasting) as "stream 1-1 data symbol (3) (for multicasting)" 2501-1-3.

Accordingly, the base station transmits data symbols for "stream (for multicasting) 1-1" 2201-1 illustrated in FIG. 22. Note that in FIG. 25, "stream 1-1 data symbol (1) (for multicasting)" 2501-1-1, "stream 1-1 data symbol (2) (for multicasting)" 2501-1-2, "data symbol 1-1 data symbol (3) (for multicasting)" 2501-1-3, and so on may each include, other than a data symbol, a preamble for signal detection, time synchronization, frequency synchronization, frequency offset estimation, and channel estimation, a reference symbol, a pilot symbol, and a symbol for transmitting control information, for instance.

Note that in FIG. 25, section 2502-1 in which data symbols can be transmitted includes unicast transmitting section 2503-1, and section 2502-2 in which data symbols can be transmitted includes unicast transmitting section 2503-2.

In FIG. 25, a frame includes unicast transmitting sections 2503-1 and 2503-2. For example, in FIG. 25, the base station may transmit symbols for multicasting in a section within section 2502-1 in which data symbols can be transmitted and other than unicast transmitting section 2503-1, and a section within section 2502-2 in which data symbols can be transmitted and other than unicast transmitting section 2503-2. This point will be described later using an example.

Thus, including a unicast transmitting section in a frame is a useful feature for stably operating a wireless communication system. This point will be later described using an example. Note that the unicast transmitting sections may not be in the temporal positions as illustrated in FIG. 25, and may be arranged in any temporal positions. Note that in the unicast transmitting sections, the base station may transmit symbols or the terminal may transmit symbols.

Furthermore, a configuration may be adopted in which the base station can directly set a unicast transmitting section, or as another method, the base station may set the maximum transmission-data transmission speed for transmitting symbols for multicasting.

For example, when the transmission speed at which the base station can transmit data is 2 Gbps (bps: bits per second) and the maximum transmission speed at which the base station can transmit data that can be assigned to transmit symbols for multicasting is 1.5 Gbps, a unicast transmitting section corresponding to 500 Mbps can be set.

Accordingly, a configuration may be adopted in which the base station can indirectly set a unicast transmitting section. Note that another specific example will be described later.

Note that in accordance with the state in FIG. 22, FIG. 25 illustrates a frame configuration in which "stream 1-1 data symbol (1) (for multicasting)" 2501-1-1, "stream 1-1 data symbol (2) (for multicasting)" 2501-1-2, and "data symbol 1-1 data symbol (3) (for multicasting)" 2501-1-3 are present, yet the present disclosure is not limited to such a frame configuration. For example, a data symbol for a stream for multicasting other than stream 1 (stream 1-1) may be present, a data symbol for stream 1-2 which is a second transmission beam for stream 1, and a data symbol for stream 1-3 which is a third transmission beam for stream 1 may be present. This point will be described later.

Figure 26:
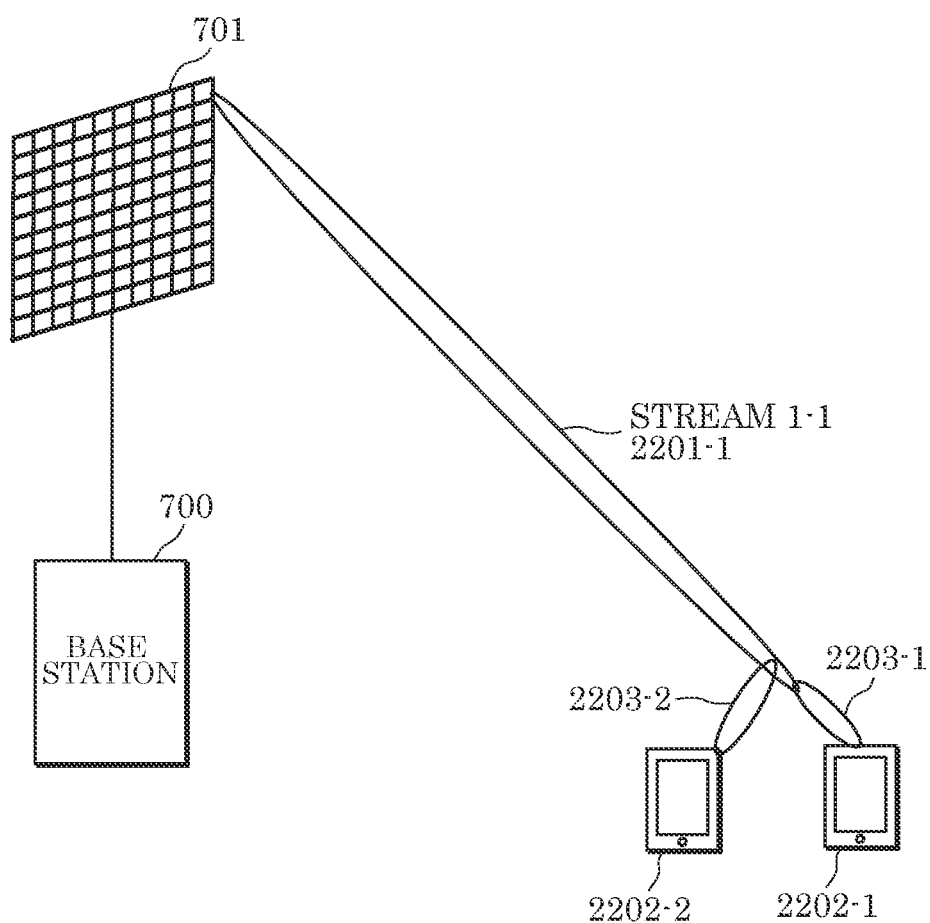
FIG. 26 is a diagram illustrating an example of a state of communication between the base station and terminals.

FIG. 26 illustrates a state when a terminal is newly added to the state in FIG. 22 in which the base station transmits transmission streams for multicasting to one terminal, and elements which operate in the same manner as those in FIG. 22 are assigned the same reference numerals.

In FIG. 26, the terminal newly added is 2202-2. Terminal 2202-2 generates receiving directivity 2203-2 by performing directivity control, and receives transmission beam 2201-1 for "stream 1-1 (for multicasting)".

The following describes FIG. 26.

Figure 27:
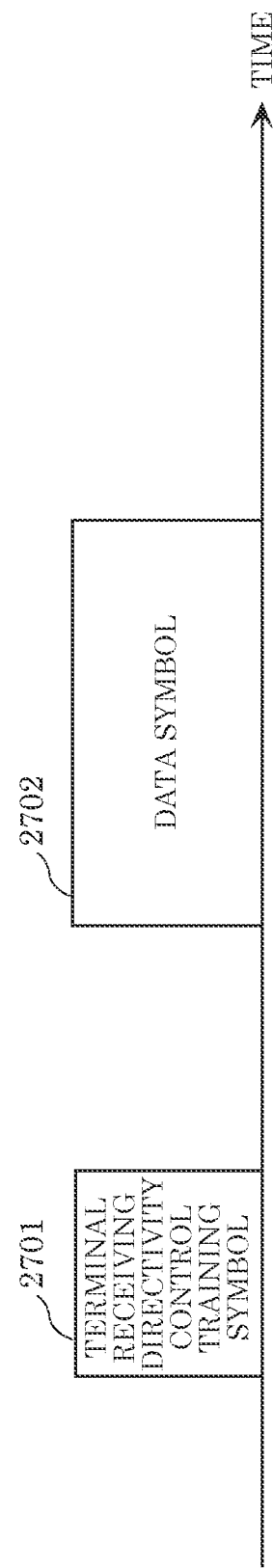
FIG. 27 is a diagram illustrating examples of symbols which the base station transmits.

In the following description, in FIG. 26, terminal 2202-2 newly participates in the multicast communication in a state where base station 700 and terminal 2202-1 are performing multicast communication. Thus, as illustrated in FIG. 27, the base station transmits "terminal receiving directivity control training symbol" 2701 and "data symbol" 2702, and does not transmit "base station transmission training symbol" illustrated in FIG. 24. Note that in FIG. 27, the horizontal axis indicates time.

Figure 28:
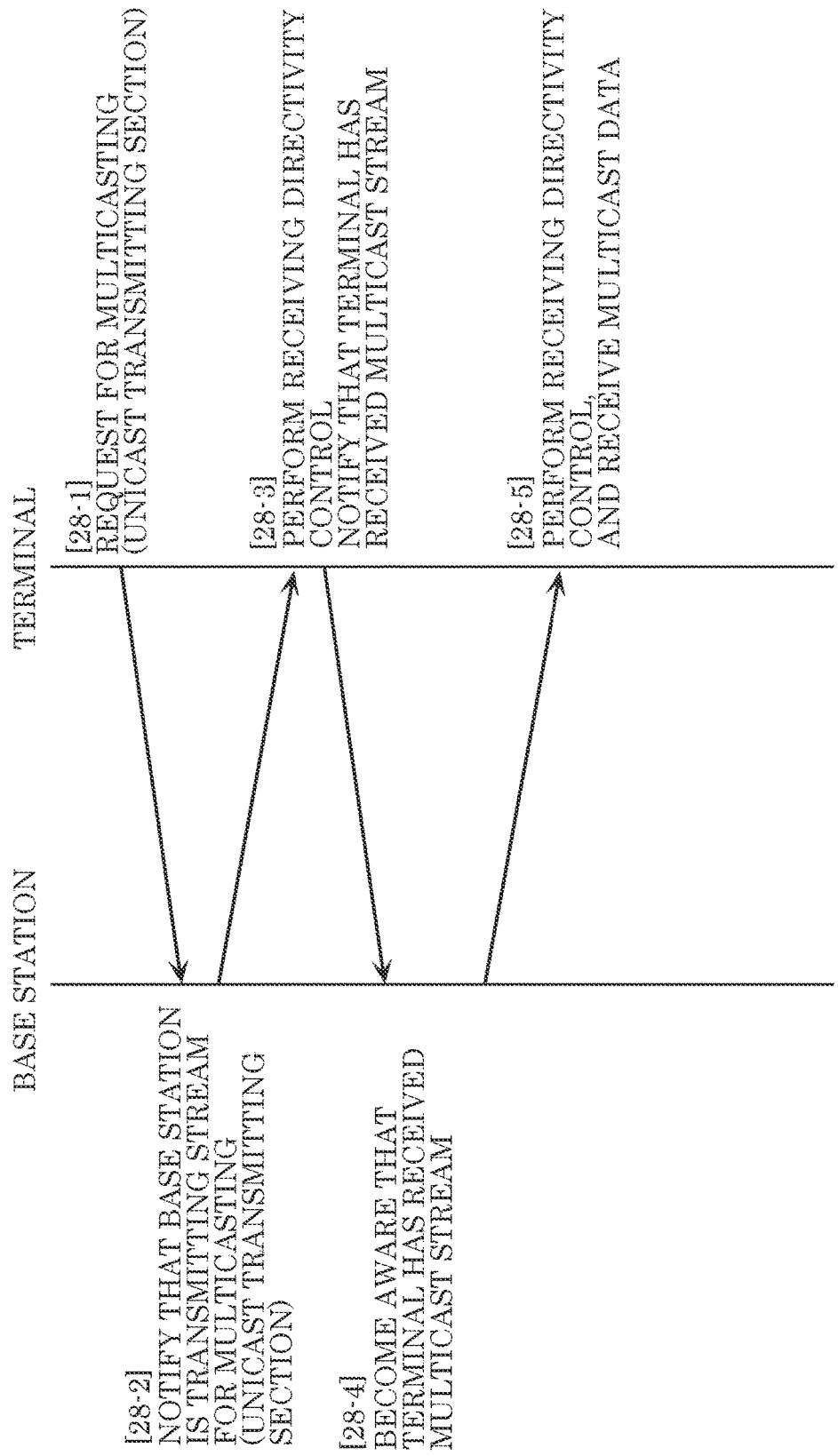
FIG. 28 is a diagram illustrating a procedure of performing communication between the base station and a terminal.

FIG. 28 illustrates an example of operation performed to achieve a state in which the base station transmits transmission beams for multicasting to two terminals as illustrated in FIG. 26.

[28-1] Terminal 2202-2 transmits a "request to transmit stream 1 by multicasting" to the base station. Note that the "request to transmit stream 1 by multicasting" is transmitted in a unicast transmitting section in FIG. 25.

[28-2] Upon receiving [28-1], the base station notifies terminal 2202-2 that "the base station is transmitting stream 1 for multicasting". Note that the base station transmits a notification indicating that "the base station is transmitting stream 1 for multicasting" in a unicast transmitting section in FIG. 25.

[28-3] Upon receiving [28-2], terminal 2202-2 performs receiving directivity control, in order to start receiving stream 1 for multicasting. Then, terminal 2202-2 performs receiving directivity control, and notifies the base station that "terminal 2202-2 has successfully received stream 1 for multicasting".

[28-4] Upon receiving [28-3], the base station becomes aware that the terminal has successfully received "stream 1 for multicasting".

[28-5] Terminal 2202-2 performs receiving directivity control, and starts receiving "stream 1 for multicasting".

Figure 29:
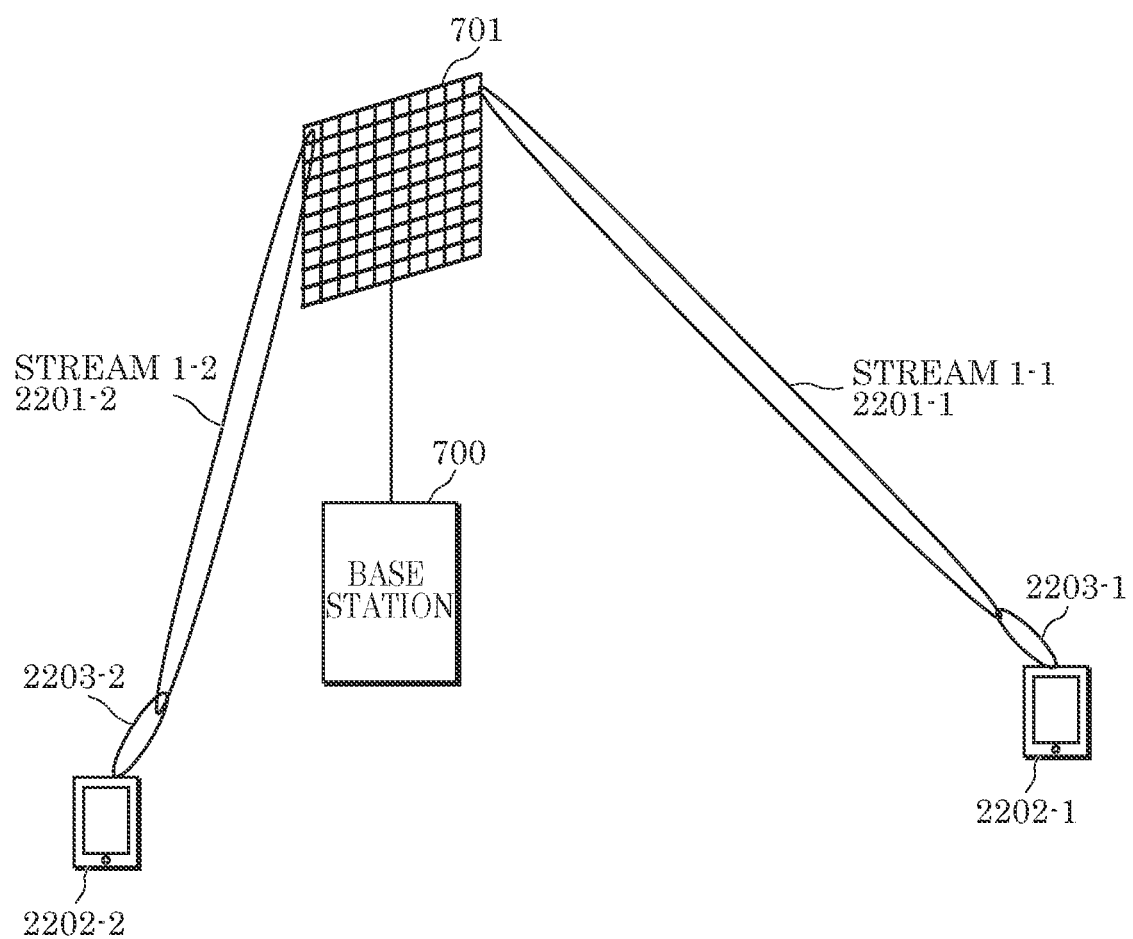
FIG. 29 is a diagram illustrating an example of a state of communication between the base station and terminals.

FIG. 29 illustrates that a terminal is newly added to a state in FIG. 22 in which the base station is transmitting a transmission stream for multicasting to one terminal. Elements which operate in the same manner as those in FIG. 22 are assigned the same reference numerals.

In FIG. 29, the terminal newly added is 2202-2. At this time, different points from FIG. 26 are that base station 700 newly transmits transmission beam 2201-2 for "stream 1-2 (second transmission beam for stream 1) (for multicasting)", and terminal 2202-2 performs directivity control to generate receiving directivity 2203-2, and receives transmission beam 2201-2 for "stream 1-2 (for multicasting)".

The following describes control for achieving the state as in FIG. 29.

In the following description, in FIG. 29, terminal 2202-2 newly participates in multicast communication in a state in which base station 700 and terminal 2202-1 are performing multicast communication.

Figure 30:
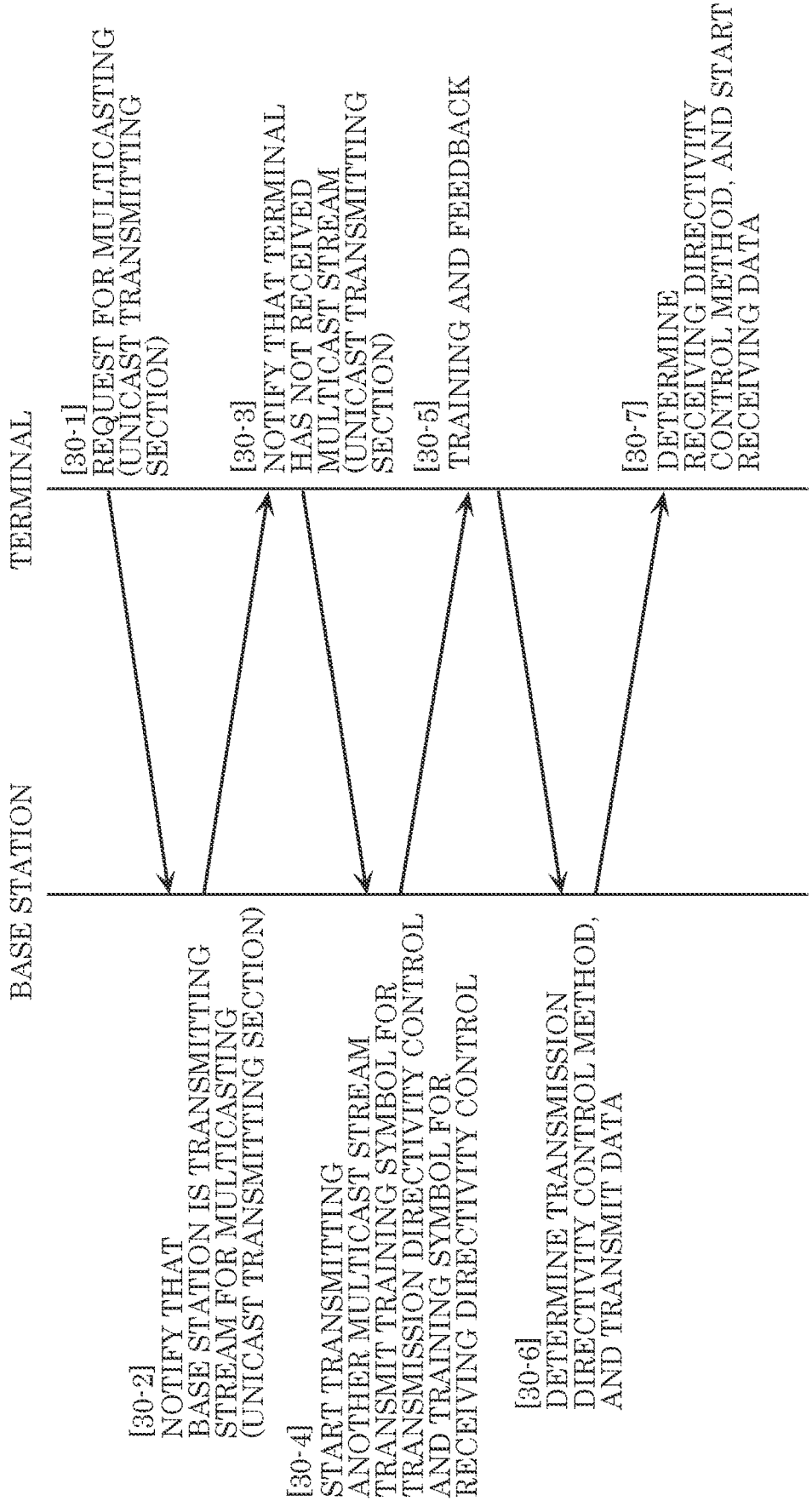
FIG. 30 is a diagram illustrating a procedure of performing communication between the base station and a terminal.

FIG. 30 illustrates an example of operation performed in order to achieve a state in which the base station transmits transmission beams for multicasting to two terminals, as illustrated in FIG. 29.

[30-1] Terminal 2202-2 transmits a "request to transmit stream 1 by multicasting" to the base station. Note that the "request to transmit stream 1 by multicasting" is transmitted in a unicast transmitting section in FIG. 25.

[30-2] Upon receiving [30-1], the base station notifies terminal 2202-2 that "the base station is transmitting stream 1 for multicasting". Note that the base station transmits a notification indicating that "the base station is transmitting stream 1 for multicasting" in a unicast transmitting section in FIG. 25.

[30-3] Upon receiving [30-2], terminal 2202-2 notifies the base station that "terminal 2202-2 has not received stream 1 for multicasting". Note that terminal 2202-2 transmits the notification indicating that "stream 1 for multicasting is not received" in a unicast transmitting section in FIG. 25.

[30-4] Upon receiving [30-3], the base station determines to transmit another transmission beam (specifically, transmission beam 2201-2 in FIG. 29) for stream 1 for multicasting. Note that here, the base station determines to transmit another transmission beam for stream 1 for multicasting, yet the base station may determine not to transmit another transmission beam for stream 1 for multicasting. This point will be later described.

Thus, the base station transmits a training symbol for transmission directivity control and a training symbol for receiving directivity control to terminal 2202-2, in order to transmit stream 1 by multicasting. Note that the base station transmits a transmission beam for stream 1-1 in FIG. 29, separately from transmission of these symbols. This point will be described later.

[30-5] Terminal 2202-2 receives a training symbol for transmission directivity control and a training symbol for receiving directivity control which the base station has transmitted, and transmits feedback information to the base station in order that the base station performs transmission directivity control and terminal 2202-2 performs receiving directivity control.

[30-6] Based on the feedback information transmitted by terminal 2202-2, the base station determines a method for transmission directivity control (determines, for instance, a weighting factor to be used when performing directivity control), and transmits a data symbol for stream 1 (transmission beam 2201-2 for stream 1-2 in FIG. 29).

[30-7] Terminal 2202-2 determines a receiving directivity control method (determines, for instance, a weighting factor to be used when performing directivity control), and starts receiving data symbols for stream 1 (transmission beam 2201-2 for stream 1-2 in FIG. 29) which the base station has transmitted.

Note that the "procedure for a base station and a terminal to communicate" in FIG. 30 is an example, and the order of transmitting information items is not limited to the order in FIG. 30. Thus, communication between the base station and the terminal can be similarly established even if the order of transmitting information items has changed.

FIG. 30 illustrates an example in which the terminal performs receiving directivity control, yet the terminal may not perform receiving directivity control. In such a case, the base station may not transmit a training symbol for receiving directivity control, and the terminal may not determine a receiving directivity control method, in FIG. 30.

When the base station performs transmission directivity control, if the base station has a configuration in FIG. 1, for example, multiplication coefficients for multipliers 204-1, 204-2, 204-3, and 204-4 in FIG. 2 are determined, whereas if the base station has a configuration in FIG. 3, weighting factors for weighting synthesizer 301 are determined, for example. Note that the number of streams to be transmitted is "2" in the case of FIG. 29, yet the present disclosure is not limited to this.

Then, when terminals 2202-1 and 2202-2 perform receiving directivity control, if the terminals have a configuration in FIG. 4, for example, multiplication coefficients for multiplier 503-1, 503-2, 503-3, and 503-4 in FIG. 5 are determined, whereas when the terminals have a configuration in FIG. 6, multiplication coefficients for multipliers 603-1, 603-2, . . . , and 603-L are determined, for example.

Figure 31:
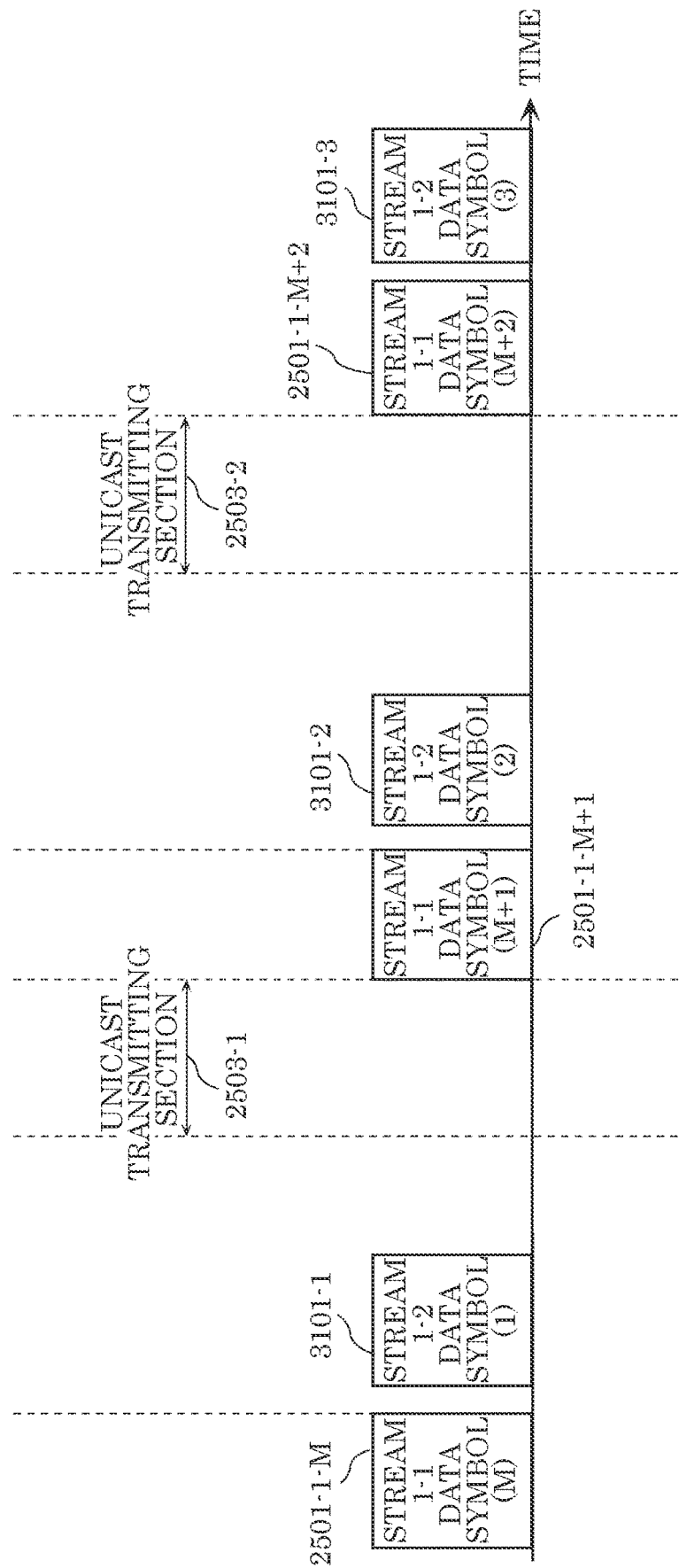
FIG. 31 is a diagram illustrating examples of symbols which the base station transmits.

FIG. 31 illustrates examples of symbols transmitted by the base station when the base station transmits data symbols for stream 1 after communication between the base station and the terminal in FIG. 30 is completed, while the horizontal axis indicates time.

In FIG. 31, "stream 1-1" in FIG. 29 is present, and thus similarly to FIG. 25, "stream 1-1 data symbol (M) (for multicasting)" 2501-1-M, "stream 1-1 data symbol (M+1) (for multicasting)" 2501-1-M+1, and "stream 1-1 data symbol (M+2) (for multicasting)" 2501-1-M+2 are present. Note that "(M), (M+1), (M+2)" are illustrated, and this is because stream 1-1 (for multicasting) is already present before stream 1-2 (for multicasting) is present. Accordingly, in FIG. 31, M is assumed to be an integer of 2 or greater.

Then, as illustrated in FIG. 31, "stream 1-2 data symbol (1) (for multicasting)" 3101-1, "stream 1-2 data symbol (2) (for multicasting)" 3101-2, and "stream 1-2 data symbol (3) (for multicasting)" 3101-3 are present in sections other than unicast transmitting sections 2503-1 and 2503-2.

The features are as follows as described above.

"Stream 1-1 data symbol (M) (for multicasting)" 2501-1-M, "stream 1-1 data symbol (M+1) (for multicasting)" 2501-1-M+1, "stream 1-1 data symbol (M+2) (for multicasting)" 2501-1-M+2, "stream 1-2 data symbol (1) (for multicasting)" 3101-1, "stream 1-2 data symbol (2) (for multicasting)" 3101-2, and "stream 1-2 data symbol (3) (for multicasting)" 3101-3 are all data symbols for transmitting "stream 1".

The terminal can obtain "data of stream 1" by obtaining "data symbols for stream 1-1". The terminal can obtain "data of stream 1" by obtaining "data symbols for stream 1-2".

The directivities of transmission beams for "stream 1-1 data symbol (M) (for multicasting)" 2501-1-M, "stream 1-1 data symbol (M+1) (for multicasting)" 2501-1-M+1, and "stream 1-1 data symbol (M+2) (for multicasting)" 2501-1-M+2 are different from the directivities of transmission beams for "stream 1-2 data symbol (1) (for multicasting)" 3101-1, "stream 1-2 data symbol (2) (for multicasting)" 3101-2, and "stream 1-2 data symbol (3) (for multicasting)" 3101-3. Thus, a set of multiplication coefficients (or weighting factors) for the transmitting device of the base station used in order to generate transmission beams for "stream 1-1 data symbol (M) (for multicasting)" 2501-1-M, "stream 1-1 data symbol (M+1) (for multicasting)" 2501-1-M+1, and "stream 1-1 data symbol (M+2) (for multicasting)" 2501-1-M+2 are different from a set of multiplication coefficients (or weighting factors) for the transmitting device of the base station used in order to generate transmission beams for "stream 1-2 data symbol (1) (for multicasting)" 3101-1, "stream 1-2 data symbol (2) (for multicasting)" 3101-2, and "stream 1-2 data symbol (3) (for multicasting)" 3101-3.

The above allows two terminals to receive multicast streams which the base station has transmitted. At this time, directivity control is performed by the transmitting device and the receiving device, and thus an advantageous effect of increasing an area in which streams for multicasting can be received is yielded. Furthermore, streams and transmission beams are added only when necessary, and thus an advantageous effect of effectively utilizing frequency, time, and space resources for transmitting data.

Note that control as described below may be performed. The details of the control are as follows.

Figure 32:
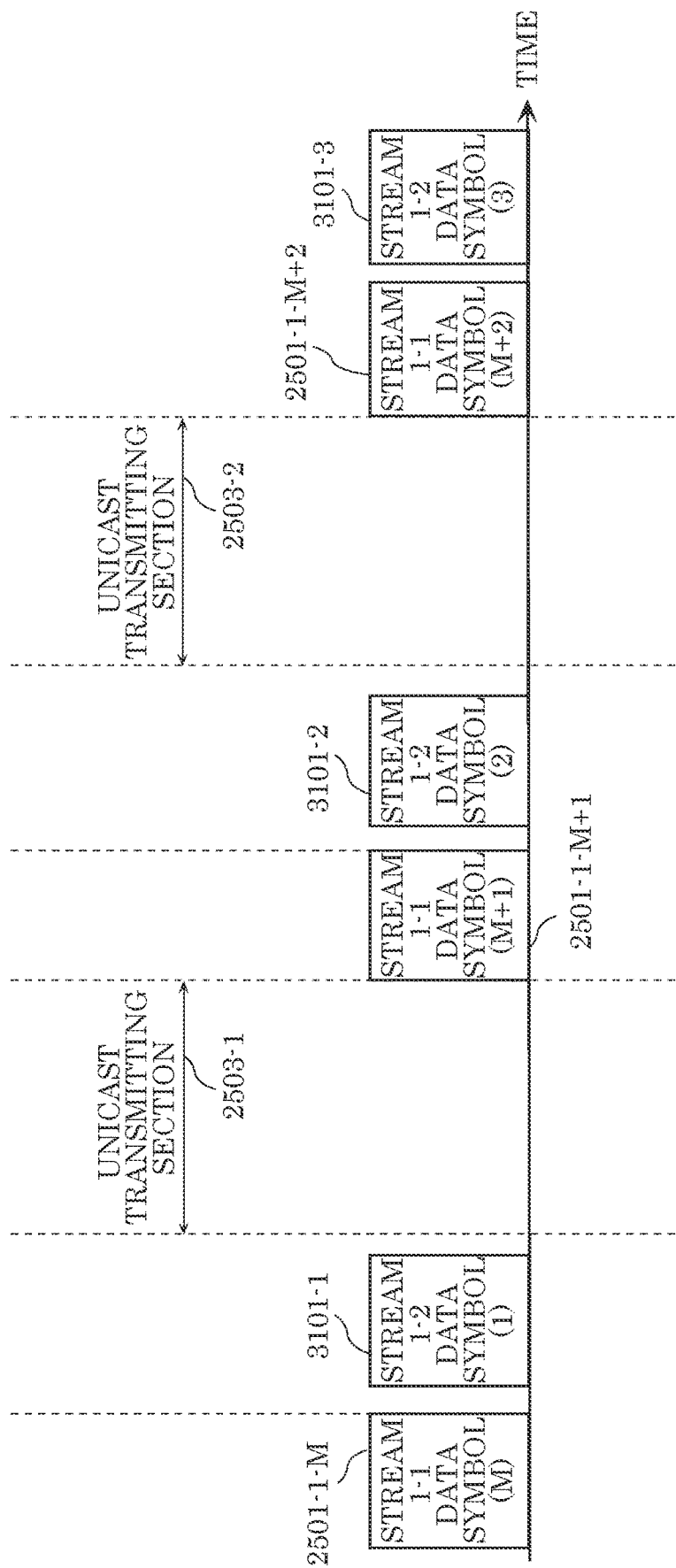
FIG. 32 is a diagram illustrating examples of symbols which the base station transmits.

FIG. 32 illustrates "examples of symbols which the base station transmits when the base station transmits data symbols (for stream 1) after communication between the base station and the terminal in FIG. 30 is completed", which are different from FIG. 31, where the horizontal axis indicates time. Note that elements which operate in the same manner as in FIGS. 25 and 31 are assigned the same reference numerals in FIG. 32.

Different points in FIG. 32 from FIG. 31 are that unicast transmitting sections 2503-1 and 2503-2 are set to longer time periods, and thus the base station does not further add and transmit symbols for multicasting.

Figure 33:
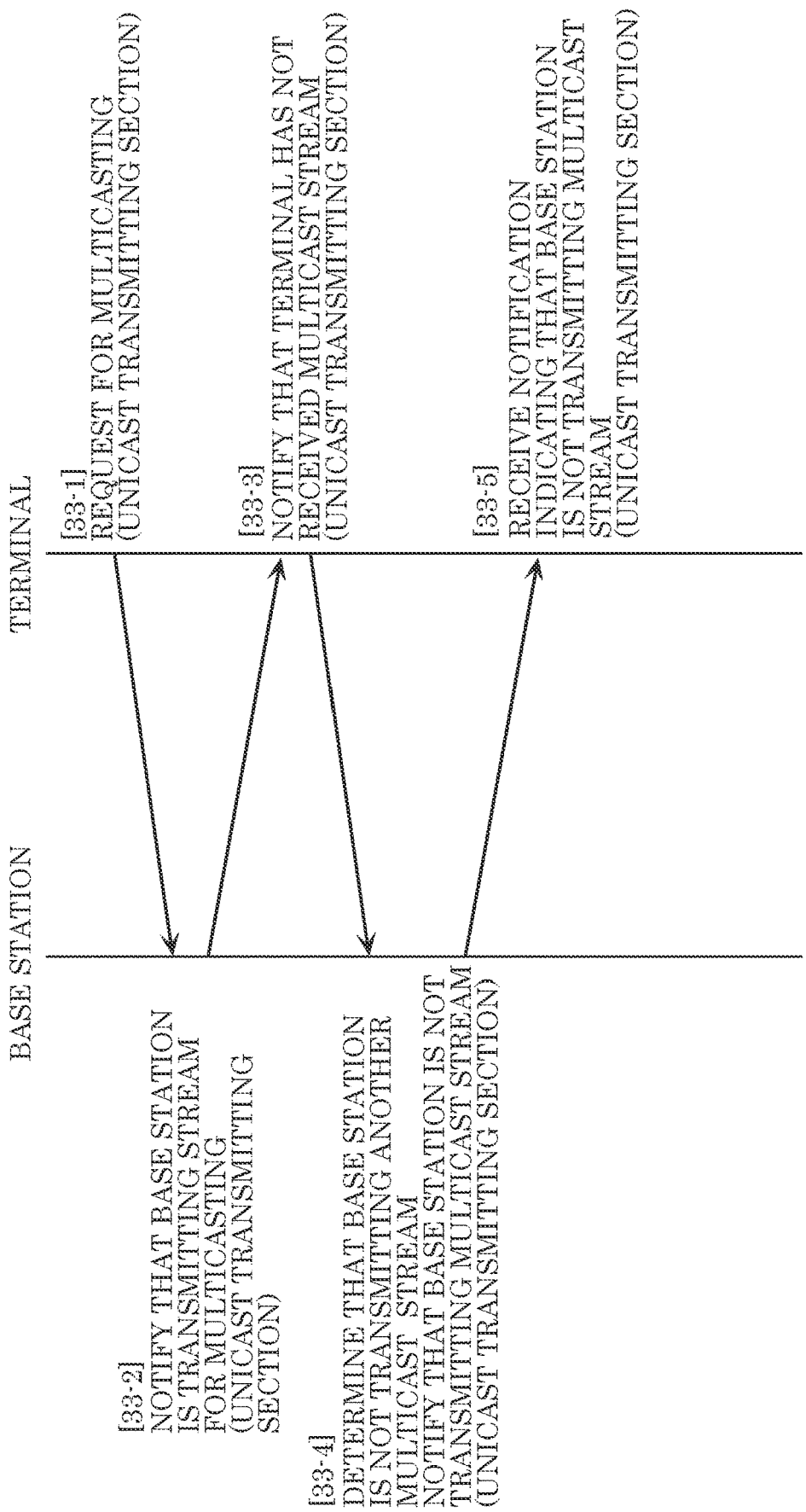
FIG. 33 is a diagram illustrating a procedure of performing communication between the base station and a terminal.

FIG. 33 illustrates an example of operation when new terminal 2202-3 transmits a request to the base station to add a transmission beam, in addition to transmission beams for multicasting transmitted by the base station to two terminals (terminals 2202-1 and 2202-2), as illustrated in FIG. 29. Note that FIG. 32 illustrates a frame of a modulated signal which the base station transmits.

[33-1] Terminal 2202-3 transmits to the base station a "request to transmit stream 1 by multicasting". Note that terminal 2202-3 transmits the "request to transmit stream 1 by multicasting" in a unicast transmitting section in FIG. 32.

[33-2] Upon receiving [33-1], the base station notifies terminal 2202-3 that "the base station is transmitting stream 1 for multicasting". Note that the base station transmits the "notification indicating that the base station is transmitting stream 1 for multicasting" in a unicast transmitting section in FIG. 32.

[33-3] Upon receiving [33-2], terminal 2202-3 notifies the base station that "terminal 2202-3 has not received stream 1 for multicasting". Note that terminal 2202-3 transmits the "notification indicating that stream 1 for multicasting has not been received" in a unicast transmitting section in FIG. 32.

[33-4] Upon receiving [33-3], the base station determines whether a transmission beam other than the transmission beam for stream 1-1 and the transmission beam for stream 1-2 can be transmitted as a transmission beam for stream 1 for multicasting. At this time, taking into consideration that the frame is as illustrated in FIG. 32, the base station determines not to transmit another transmission beam for stream 1 for multicasting. Accordingly, the base station notifies terminal 2202-3 that "the base station is not to transmit another transmission beam for stream 1 for multicasting". Note that the base station transmits the "notification indicating that the base station is not to transmit another transmission beam for stream 1 for multicasting" in a unicast transmitting section in FIG. 32.

[33-5] Terminal 2202-3 receives the "notification indicating that the base station is not to transmit another transmission beam for stream 1 for multicasting".

Note that the "procedure for a base station and a terminal to communicate" in FIG. 33 is an example, and the order of transmitting information items is not limited to the order in FIG. 33, so that communication between the base station and the terminal can be similarly established even if the order of transmitting items has changed. In this manner, if there are insufficient communication resources for multicast transmission, a multicast transmission beam may not be added.

Figure 34:
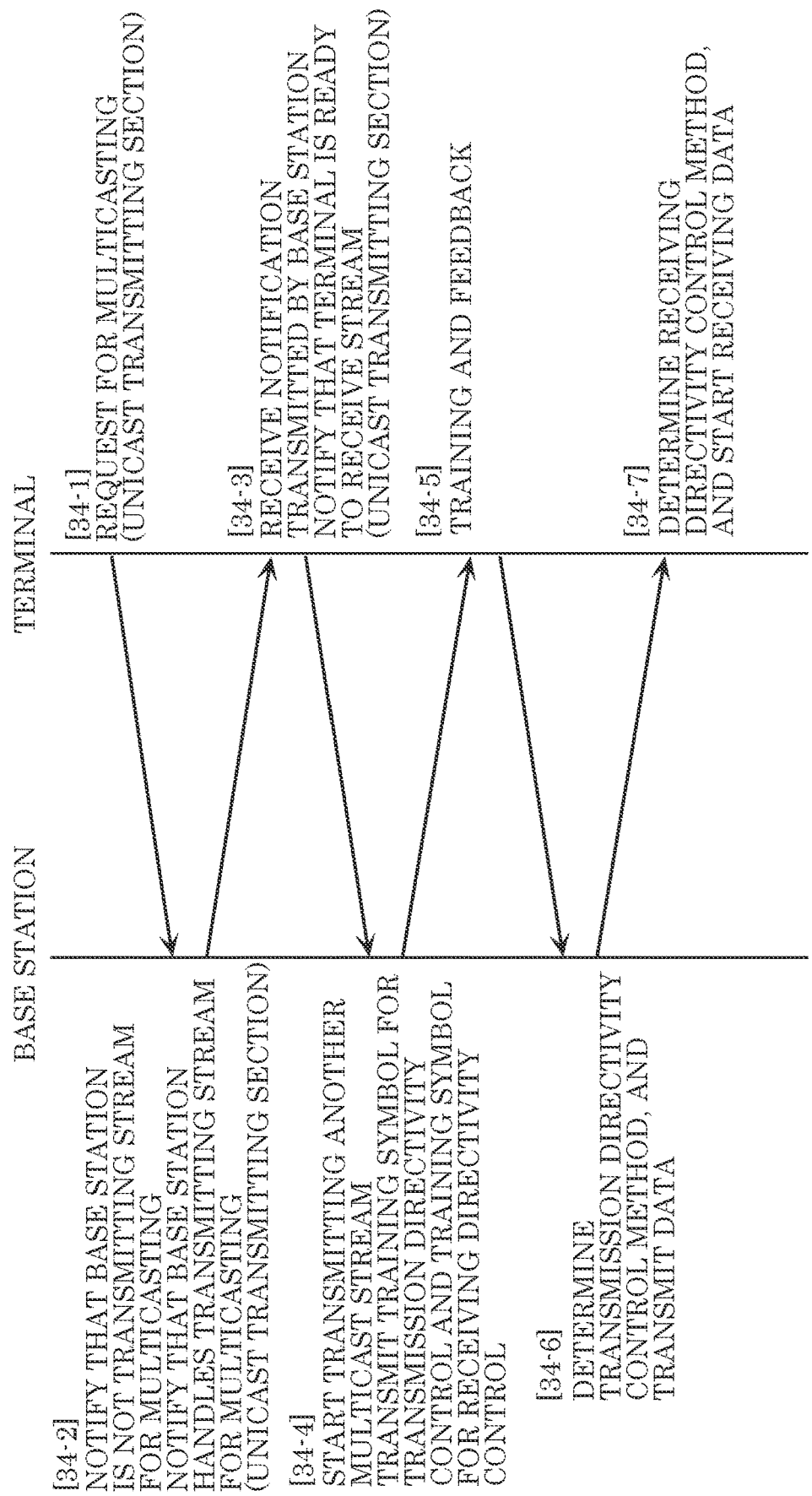
FIG. 34 is a diagram illustrating a procedure of performing communication between the base station and a terminal.

FIG. 34 illustrates an example of operation when new terminal 2202-3 transmits a request to the base station to add a transmission beam for another stream for multicasting (stream 2), in addition to transmission beams for multicasting transmitted by the base station to two terminals (terminals 2202-1 and 2202-2), illustrated in FIG. 29. Note that a frame of a modulated signal transmitted by the base station is in the state as illustrated in FIG. 31.

[34-1] Terminal 2202-3 transmits to the base station a "request to transmit stream 2 by multicasting". Note that terminal 2202-3 transmits the "request to transmit stream 2 by multicasting" in unicast transmitting section 2503 in FIG. 31.

[34-2] Upon receiving [34-1], the base station notifies terminal 2202-3 that "the base station is not transmitting stream 2 for multicasting". In addition, the base station determines "whether the base station can add and transmit a transmission beam for stream 2 for multicasting". At this time, taking into consideration that the frame is in the state as illustrated in FIG. 31, the base station notifies terminal 2202-3 that "the base station is able to transmit a transmission beam for stream 2 for multicasting". Note that the base station transmits the "notification indicating that the base station is not transmitting stream 2 for multicasting" and the "notification indicating that the base station is able to transmit a transmission beam for stream 2 for multicasting" in unicast transmitting section 2503 in FIG. 31.

[34-3] Upon receiving [34-2], terminal 2202-3 notifies the base station that "terminal 2203-3 is ready to receive stream 2 for multicasting". Note that terminal 2202-3 transmits the notification indicating that "terminal 2202-3 is ready to receive stream 2 for multicasting" in unicast transmitting section 2503 in FIG. 31.

[34-4] Upon receiving [34-3], the base station determines to transmit a transmission beam for stream 2 for multicasting. Then, the base station transmits a training symbol for transmission directivity control and a training symbol for receiving directivity control, in order to transmit stream 2 to terminal 2202-3 by multicasting. Note that the base station transmits transmission beams for streams 1-1 and 1-2, as illustrated in FIG. 31, separately from transmission of the above symbols. This point will be described later.

[34-5] Terminal 2202-3 receives the training symbol for transmission directivity control and the training symbol for receiving directivity control which the base station has transmitted, and transmits feedback information to the base station in order that the base station performs transmission directivity control and terminal 2202-3 performs receiving directivity control.

[34-6] Based on the feedback information transmitted by terminal 2202-3, the base station determines a method for transmission directivity control (determines a weighting factor used for directivity control, for instance), and transmits data symbols for stream 2.

[34-7] Terminal 2202-3 determines a receiving directivity control method (determines a weighting factor used for directivity control, for instance), and starts receiving the data symbols for stream 2 which the base station has transmitted.

Note that the "procedure for a base station and a terminal to communicate" in FIG. 34 is an example, and the order of transmitting information items is not limited to the order in FIG. 34, and communication between the base station and the terminal can be similarly established even if the order of transmitting information items has changed. FIG. 34 illustrates an example in which the terminal performs receiving directivity control, yet the terminal may not perform receiving directivity control. In such a case, the base station may not transmit a training symbol for receiving directivity control, and the terminal does not determine a receiving directivity control method, in FIG. 34.

When the base station performs transmission directivity control, for example, multiplication coefficients for multipliers 204-1, 204-2, 204-3, and 204-4 in FIG. 2 are determined if the base station has a configuration in FIG. 1.

Then, when terminals 2202-1, 2202-2, and 2202-3 perform receiving directivity control, if the terminals have a configuration in FIG. 4, multiplication coefficients for multipliers 503-1, 503-2, 503-3, and 503-4 in FIG. 5 are determined, for example, whereas if the terminals have a configuration in FIG. 6, multiplication coefficients for multipliers 603-1, 603-2, . . . , and 603-L are determined, for example.

Figure 35:
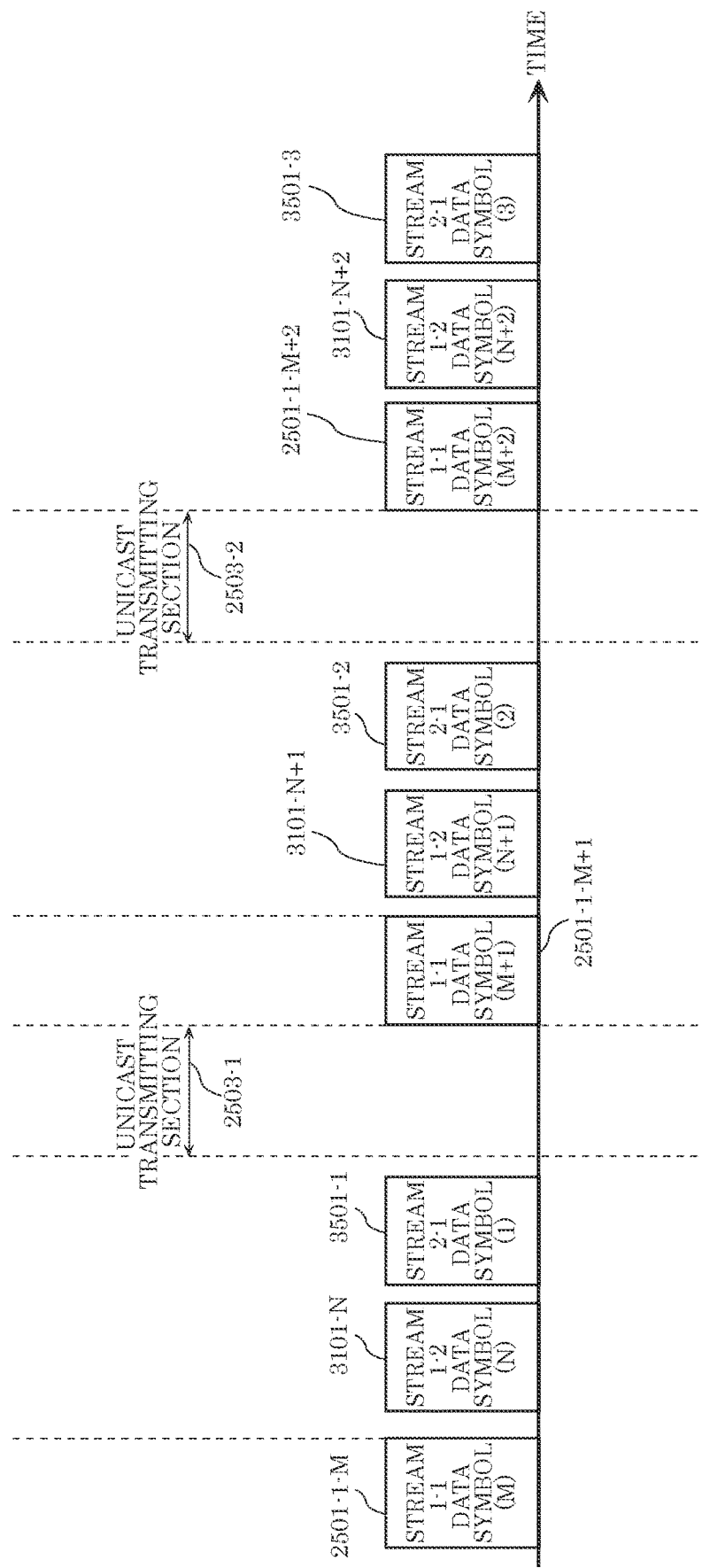
FIG. 35 is a diagram illustrating examples of symbols which the base station transmits.

FIG. 35 illustrates examples of symbols which the base station transmits when the base station transmits data symbols for stream 1 and stream 2 after communication between the base station and a terminal in FIG. 34 is completed, where the horizontal axis indicates time.

In FIG. 35, "stream 1-1" and "stream 1-2" illustrated in FIG. 31 are present, and thus "stream 1-1 data symbol (M) (for multicasting)" 2501-1-M, "stream 1-1 data symbol (M+1) (for multicasting)" 2501-1-M+1, and "stream 1-1 data symbol (M+2) (for multicasting)" 2501-1-M+2 are present. In addition, "stream 1-2 data symbol (N) (for multicasting)" 3101-N, "stream 1-2 data symbol (N+1) (for multicasting)" 3101-N+1, and "stream 1-2 data symbol (N+2) (for multicasting)" 3101-N+2 are present. Note that N and M are integers of 2 or greater.

As illustrated in FIG. 35, in sections other than unicast transmitting sections 2503-1 and 2503-2, "stream 2-1 data symbol (1) (for multicasting)" 3501-1, "stream 2-1 data symbol (2) (for multicasting)" 3501-2, and "stream 2-1 data symbol (3) (for multicasting)" 3501-3 are present.

As described above, the features achieved at this time are as follows.

"Stream 1-1 data symbol (M) (for multicasting)" 2501-1-M, "stream 1-1 data symbol (M+1) (for multicasting)" 2501-1-M+1, "stream 1-1 data symbol (M+2) (for multicasting)" 2501-1-M+2, "stream 1-2 data symbol (N) (for multicasting)" 3101-N, "stream 1-2 data symbol (N+1) (for multicasting)" 3101-N+1, and "stream 1-2 data symbol (N+2) (for multicasting)" 3101-N+2 are all data symbols for transmitting "stream 1".

A terminal obtains "data of stream 1" by obtaining "data symbols for stream 1-1". Further, the terminal obtains "data of stream 1" by obtaining "data symbols for stream 1-2".

The directivities of transmission beams for "stream 1-1 data symbol (M) (for multicasting)" 2501-1-M, "stream 1-1 data symbol (M+1) (for multicasting)" 2501-1-M+1, and "stream 1-1 data symbol (M+2) (for multicasting)" 2501-1-M+2 are different from the directivities of transmission beams for "stream 1-2 data symbol (1) (for multicasting)" 3101-1, "stream 1-2 data symbol (2) (for multicasting)" 3101-2, and "stream 1-2 data symbol (3) (for multicasting)" 3101-3.

Thus, a set of multiplication coefficients (or weighting factors) for the transmitting device of the base station used in order to generate transmission beams for "stream 1-1 data symbol (M) (for multicasting)" 2501-1-M, "stream 1-1 data symbol (M+1) (for multicasting)" 2501-1-M+1, and "stream 1-1 data symbol (M+2) (for multicasting)" 2501-1-M+2 is different from a set of multiplication coefficients (or weighting factors) for the transmitting device of the base station used in order to generate transmission beams for "stream 1-2 data symbol (1) (for multicasting)" 3101-1, "stream 1-2 data symbol (2) (for multicasting)" 3101-2, and "stream 1-2 data symbol (3) (for multicasting)" 3101-3.

"Stream 2-1 data symbol (1) (for multicasting)" 3501-1, "stream 2-1 data symbol (2) (for multicasting)" 3501-2, and "stream 2-1 data symbol (3) (for multicasting)" 3501-3 are data symbols for transmitting "stream 2".

A terminal obtains data of "stream 2" by obtaining "data symbols for stream 2-1". The above allows the terminal to receive a plurality of multicast streams (streams 1 and 2) transmitted by the base station. At this time, directivity control is performed by the transmitting device and the receiving device, and thus an advantageous effect of increasing an area in which streams for multicasting can be received is yielded. Furthermore, streams and transmission beams are added only when necessary, and thus an advantageous effect of effectively utilizing frequency, time, and space resources for transmitting data.

Note that control as described below may be performed. The details of the control are as follows.

FIG. 32 illustrates "examples of symbols which the base station transmits when the base station transmits data symbols (for stream 1)", which is different from FIG. 35, where the horizontal axis indicates time. Note that elements which operate in the same manner as those in FIGS. 25 and 31 are assigned the same reference numerals in FIG. 32.

Different points in FIG. 32 from FIG. 35 are that unicast transmitting sections 2503-1 and 2503-2 are set to longer time periods, and thus the base station does not add and transmit any more symbols for multicasting, that is, for example, symbols for a new stream.

Figure 36:
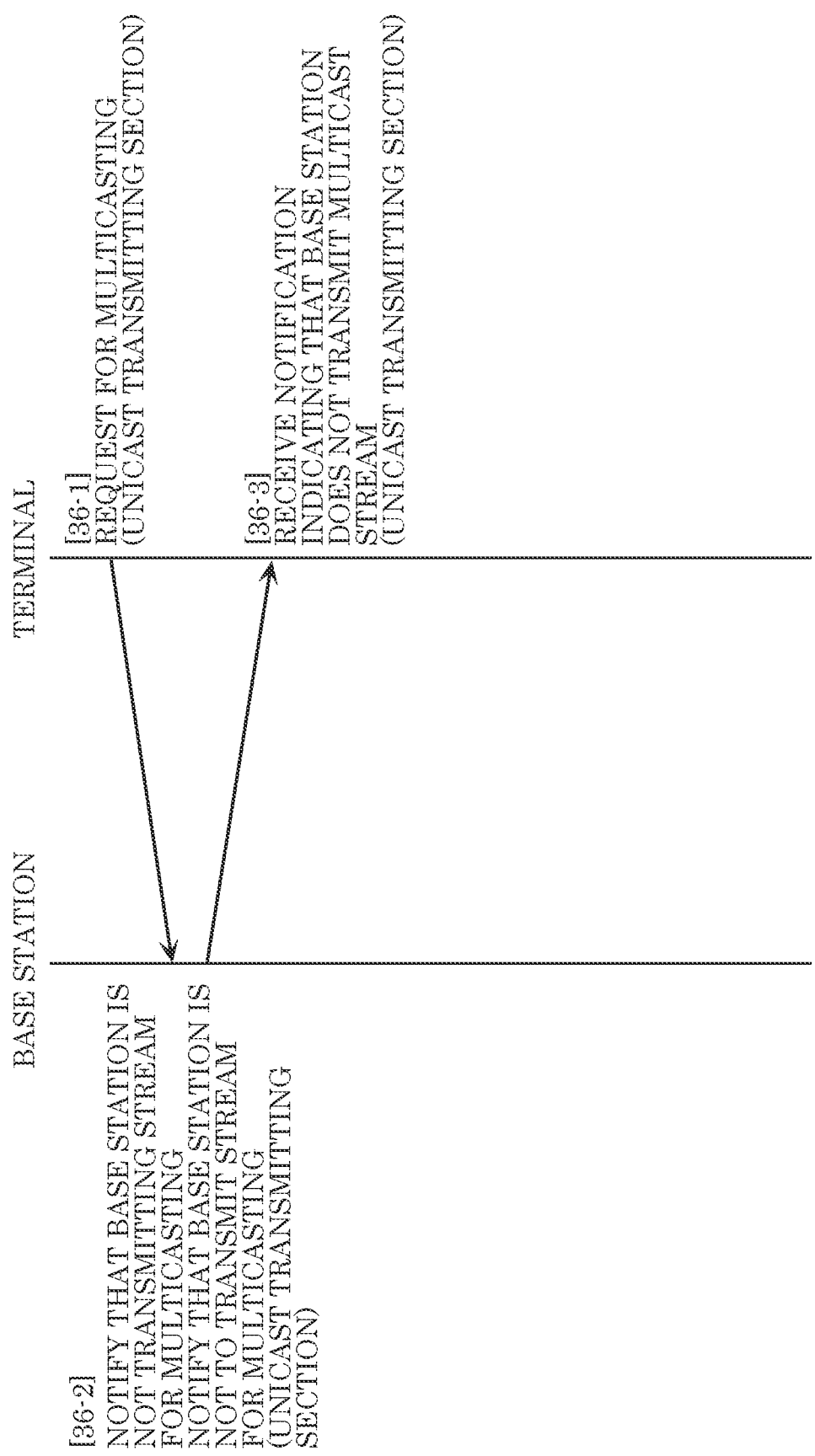
FIG. 36 is a diagram illustrating a procedure of performing communication between the base station and a terminal.

FIG. 36 illustrates an example of operation when new terminal 2202-3 transmits a request to the base station to add a transmission beam for another stream for multicasting (stream 2), in addition to transmission beams for multicasting transmitted by the base station to two terminals (terminals 2202-1 and 2202-2), as illustrated in FIG. 29. Note that FIG. 32 illustrates a frame of a modulated signal which the base station transmits.

[36-1] Terminal 2202-3 transmits to the base station a "request to transmit stream 2 by multicasting". Note that terminal 2202-3 transmits the "request to transmit stream 2 by multicasting" in a unicast transmitting section in FIG. 32.

[36-2] Upon receiving [36-1], the base station notifies terminal 2202-3 that "the base station is not transmitting stream 2 for multicasting". Note that the base station transmits the notification indicating that "the base station is not transmitting stream 2 for multicasting" in a unicast transmitting section in FIG. 32. In addition, the base station determines whether a transmission beam for stream 2 for multicasting can be transmitted. Taking the frame illustrated in FIG. 32 into consideration, the base station determines not to transmit a transmission beam for stream 2 for multicasting. Thus, the base station notifies terminal 2202-3 that "the base station is not to transmit stream 2 for multicasting". Note that the base station transmits the "notification indicating that the base station is not to transmit stream 2 for multicasting" in a unicast transmitting section in FIG. 32.

[36-3] Terminal 2202-3 receives the "notification indicating that the base station is not to transmit stream 2 for multicasting".

Note that the "procedure for a base station and a terminal to communicate" in FIG. 36 is an example, and the order of transmitting information items is not limited to the order in FIG. 36. Communication between the base station and the terminal can be similarly established even if the procedure of transmitting items has changed. In this manner, if there are insufficient communication resources for multicast transmission, a stream and a multicast transmission beam may not be added.

Note that a supplemental description of a method for setting unicast transmitting sections 2503-1 and 2503-2 illustrated in, for instance, FIG. 35 is now given.

For example, in FIG. 35, the maximum value of the number of transmission beams for multicasting is determined in advance or is set.

In response to requests from the terminals, the base station transmits transmission beams for multicasting, the number of which is smaller than or equal to the maximum value. For example, in the case of FIG. 35, the number of transmission beams for multicasting is 3. Then, the base station transmits a plurality of transmission beams for multicasting, and temporal idle time after transmitting the transmission beams is set as a unicast transmitting section.

The unicast transmitting sections may be determined as described above.

Supplementary Note 1

Supplementary Note 1 describes the case where a base station performs unicast communication with a plurality of terminals, or in other words, communicates separately with a plurality of terminals.

At this time, for example, #1 symbol group 901-1 for stream 1, #2 symbol group 901-2 for stream 1, and #3 symbol group 901-3 for stream 1 in FIG. 9 may be control information for broadcast channels, that is, control information which the base station transmits by broadcasting to a plurality of terminals in order that the base station performs data communication with the plurality of terminals. Note that control information is to be used to, for example, establish data communication between the base station and a terminal.

For example, #1 symbol group 901-1 for stream 1, #2 symbol group 901-2 for stream 1, and #3 symbol group 901-3 for stream 1 in FIG. 9 may be common search spaces. Note that a common search space is control information for cell control. Also, a common search space is control information broadcast to a plurality of terminals.

Similarly, for example, #1 symbol group 902-1 for stream 2, #2 symbol group 902-2 for stream 2, and #3 symbol group 902-3 for stream 2 in FIG. 9 may be control information for broadcast channels, that is, control information which the base station transmits by broadcasting to a plurality of terminals in order that the base station performs data communication with the plurality of terminals.

For example, #1 symbol group 902-1 for stream 2, #2 symbol group 902-2 for stream 2, and #3 symbol group 902-3 for stream 2 in FIG. 9 may be common search spaces.

Note that features of #1 symbol group 901-1 for stream 1, #2 symbol group 901-2 for stream 1, #3 symbol group 901-3 for stream 1, #1 symbol group 902-1 for stream 2, #2 symbol group 902-2 for stream 2, and #3 symbol group 902-3 for stream 2 in FIG. 9 are as described in the above embodiments.

For example, #1 symbol group 1401-1 for modulated signal 1, #2 symbol group 1401-2 for modulated signal 1, and #3 symbol group 1401-3 for modulated signal 1 in FIG. 14 may be control information for broadcast channels, that is, control information which the base station transmits by broadcasting to a plurality of terminals in order that the base station performs data communication with the plurality of terminals.

In addition, for example, #1 symbol group 1401-1 for modulated signal 1, #2 symbol group 1401-2 for modulated signal 1, and #3 symbol group 1401-3 for modulated signal 1 in FIG. 14 may be common search spaces.

For example, #1 symbol group 1402-1 for modulated signal 2, #2 symbol group 1402-2 for modulated signal 2, and #3 symbol group 1402-3 for modulated signal 2 in FIG. 14 may be control information for broadcast channels, that is, control information which the base station transmits by broadcasting to a plurality of terminals in order that the base station performs data communication with the plurality of terminals.

For example, #1 symbol group 1402-1 for modulated signal 2, #2 symbol group 1402-2 for modulated signal 2, and #3 symbol group 1402-3 for modulated signal 2 in FIG. 14 may be common search spaces.

Note that #1 symbol group 1401-1 for modulated signal 1, #2 symbol group 1401-2 for modulated signal 1, and #3 symbol group 1401-3 for modulated signal 1 in FIG. 14 are as described in the above embodiments, and #1 symbol group 1402-1 for modulated signal 2, #2 symbol group 1402-2 for modulated signal 2, and #3 symbol group 1402-3 for modulated signal 2 in FIG. 14 are as described in the above embodiments.

For example, stream 1-1 data symbol (1) 2501-1-1, stream 1-1 data symbol (2) 2501-1-2, and stream 1-1 data symbol (3) 2501-1-3 in FIG. 25 may be control information for broadcast channels, that is, control information which the base station transmits by broadcasting to a plurality of terminals in order that the base station performs data communication with the plurality of terminals.

Stream 1-1 data symbol (1) 2501-1-1, stream 1-1 data symbol (2) 2501-1-2, and stream 1-1 data symbol (3) 2501-1-3 in FIG. 25 may be common search spaces.

Note that stream 1-1 data symbol (1) 2501-1-1, stream 1-1 data symbol (2) 2501-1-2, and stream 1-1 data symbol (3) 2501-1-3 in FIG. 25 are as described in the above embodiments.

For example, stream 1-1 data symbol (M) 2501-1-M, stream 1-1 data symbol (M+1) 2501-1-M+1, stream 1-1 data symbol (M+2) 2501-1-M+2, stream 1-2 data symbol (1) 3101-1, stream 1-2 data symbol (2) 3101-2, and stream 1-2 data symbol (3) 3101-3 in FIGS. 31 and 32 may be control information for broadcast channels, that is, control information which the base station transmits by broadcasting to a plurality of terminals in order that the base station performs data communication with the plurality of terminals.

Further, stream 1-1 data symbol (M) 2501-1-M, stream 1-1 data symbol (M+1) 2501-1-M+1, stream 1-1 data symbol (M+2) 2501-1-M+2, stream 1-2 data symbol (1) 3101-1, stream 1-2 data symbol (2) 3101-2, and stream 1-2 data symbol (3) 3101-3 in FIGS. 31 and 32 may be common search spaces.

Note that stream 1-1 data symbol (M) 2501-1_M, stream 1-1 data symbol (M+1) 2501-1_M+1, stream 1-1 data symbol (M+2) 2501-1_M+2, stream 1-2 data symbol (1) 3101_1, stream 1-2 data symbol (2) 3101_2, and stream 1-2 data symbol (3) 3101_3 in FIGS. 31 and 32 are as described in the above embodiments.

For example, in FIG. 35, stream 1-1 data symbol (M) 2501-1-M, stream 1-1 data symbol (M+1) 2501-1-M+1, stream 1-1 data symbol (M+2) 2501-1-M+2, stream 1-2 data symbol (N) 3101-N, stream 1-2 data symbol (N+1) 3101-N+1, and stream 1-2 data symbol (N+2) 3101-N+2 may be control information for broadcast channels, that is, control information which the base station transmits by broadcasting to a plurality of terminals in order that the base station performs data communication with the plurality of terminals.

Further, in FIG. 35, stream 1-1 data symbol (M) 2501-1-M, stream 1-1 data symbol (M+1) 2501-1-M+1, stream 1-1 data symbol (M+2) 2501-1-M+2, stream 1-2 data symbol (N) 3101-N, stream 1-2 data symbol (N+1) 3101-N+1, and stream 1-2 data symbol (N+2) 3101-N+2 may be common search spaces.

For example, stream 2-1 data symbol (1) 3501-1, stream 2-1 data symbol (2) 3501-2, and stream 2-1 data symbol (3) 3501-3 in FIG. 35 may be control information for broadcast channels, that is, control information which the base station transmits by broadcasting to a plurality of terminals in order that the base station performs data communication with the plurality of terminals.

Further, stream 2-1 data symbol (1) 3501-1, stream 2-1 data symbol (2) 3501-2, and stream 2-1 data symbol (3) 3501-3 in FIG. 35 may be common search spaces.

Note that in FIG. 35, stream 1-1 data symbol (M) 2501-1-M, stream 1-1 data symbol (M+1) 2501-1-M+1, stream 1-1 data symbol (M+2) 2501-1-M+2, stream 1-2 data symbol (N) 3101-N, stream 1-2 data symbol (N+1) 3101-N+1, and stream 1-2 data symbol (N+2) 3101-N+2 are as described in the above embodiments, and stream 2-1 data symbol (1) 3501-1, stream 2-1 data symbol (2) 3501-2, and stream 2-1 data symbol (3) 3501-3 in FIG. 35 are as described in the above embodiments.

In FIGS. 9, 14, 25, 31, 32, and 35, when data symbols are transmitted, a single carrier transmission method may be used, or a multi-carrier transmission method such as OFDM may be used. In addition, temporal positions of data symbols are not limited to the positions in FIGS. 9, 14, 25, 31, 32, and 35.

Although a description is given with reference to FIGS. 25, 31, 32, and 35, assuming that the horizontal axis indicates time, similar data transmission can be carried out even if the horizontal axis indicates frequency (carrier). Note that when the horizontal axis indicates frequency (carrier), the base station transmits data symbols using one or more carriers or subcarriers.

Supplementary Note 2

Supplementary Note 2 describes the case where the base station performs unicast communication with a plurality of terminals, or in other words, communicates separately with a plurality of terminals.

At this time, for example, #1 symbol group 901-1 for stream 1, #2 symbol group 901-2 for stream 1, #3 symbol group 901-3 for stream 1, #1 symbol group 902-1 for stream 2, and #2 symbol group 902-2 for stream 2, and #3 symbol group 902-3 for stream 2 in FIG. 9 may be data addressed to the base station or data addressed to a terminal among a plurality of terminals communicating with the base station. At this time, such data may include control information.

Note that #1 symbol group 901-1 for stream 1, #2 symbol group 901-2 for stream 1, #3 symbol group 901-3 for stream 1, #1 symbol group 902-1 for stream 2, #2 symbol group 902-2 for stream 2, and #3 symbol group 902-3 for stream 2 in FIG. 9 are as described in the above embodiments.

For example, #1 symbol group 1401-1 for modulated signal 1, #2 symbol group 1401-2 for modulated signal 1, #3 symbol group 1401-3 for modulated signal 1, #1 symbol group 1401-3 for modulated signal 2, and #2 symbol group 1402-2 for modulated signal 2, and #3 symbol group 1402-3 for modulated signal 2 in FIG. 14 may be data addressed to the base station or data addressed to a terminal among a plurality of terminals communicating with the base station. At this time, such data may include control information.

Note that #1 symbol group 1401-1 for modulated signal 1, #2 symbol group 1401-2 for modulated signal 1, #3 symbol group 1401-3 for modulated signal 1, #1 symbol group 1401-3 for modulated signal 2, and #2 symbol group 1402-2 for modulated signal 2, and #3 symbol group 1402-3 for modulated signal 2 in FIG. 14 are as described in the above embodiments.

For example, stream 1-1 data symbol (1) 2501-1-1, stream 1-1 data symbol (2) 2501-1-2, and stream 1-1 data symbol (3) 2501-1-3 in FIG. 25 may be data addressed to the base station or data addressed to a terminal among a plurality of terminals communicating with the base station. At this time, such data may include control information.

Note that stream 1-1 data symbol (1) 2501-1-1, stream 1-1 data symbol (2) 2501-1-2, and stream 1-1 data symbol (3) 2501-1-3 in FIG. 25 are as described in the above embodiments.

For example, stream 1-1 data symbol (M) 2501-1-M, stream 1-1 data symbol (M+1) 2501-1-M+1, stream 1-1 data symbol (M+2) 2501-1-M+2, stream 1-2 data symbol (1) 3101-1, stream 1-2 data symbol (2) 3101-2, and stream 1-2 data symbol (3) 3101-3 in FIGS. 31 and 32 may be data addressed to the base station or data addressed to a terminal among a plurality of terminals communicating with the base station. At this time, such data may include control information.

Note that stream 1-1 data symbol (M) 2501-1-M, stream 1-1 data symbol (M+1) 2501-1-M+1, stream 1-1 data symbol (M+2) 2501-1-M+2, stream 1-2 data symbol (1) 3101-1, stream 1-2 data symbol (2) 3101-2, and stream 1-2 data symbol (3) 3101-3 in FIGS. 31 and 32 are as described in the above embodiments.

For example, in FIG. 35, stream 1-1 data symbol (M) 2501-1-M, stream 1-1 data symbol (M+1) 2501-1-M+1, stream 1-1 data symbol (M+2) 2501-1-M+2, stream 1-2 data symbol (N) 3101-N, stream 1-2 data symbol (N+1) 3101-N+1, and stream 1-2 data symbol (N+2) 3101-N+2 may be data addressed to the base station or data addressed to a terminal among a plurality of terminals communicating with the base station. At this time, such data may include control information.

For example, stream 2-1 data symbol (1) 3501-1, stream 2-1 data symbol (2) 3501-2, and stream 2-1 data symbol (3) 3501-3 in FIG. 35 may be data addressed to the base station or data addressed to a terminal among a plurality of terminals communicating with the base station. At this time, such data may include control information.

Note that in FIG. 35, stream 1-1 data symbol (M) 2501-1-M, stream 1-1 data symbol (M+1) 2501-1-M+1, stream 1-1 data symbol (M+2) 2501-1-M+2, stream 1-2 data symbol (N) 3101-N, stream 1-2 data symbol (N+1) 3101-N+1, stream 1-2 data symbol (N+2) 3101-N+2, stream 2-1 data symbol (1) 3501-1, stream 2-1 data symbol (2) 3501-2, and stream 2-1 data symbol (3) 3501-3 are as described in the above embodiments.

In FIGS. 9, 14, 25, 31, 32, and 35, when data symbols are transmitted, a single carrier transmission method may be used, or a multi-carrier transmission method such as OFDM may be used. In addition, temporal positions of data symbols are not limited to the positions in FIGS. 9, 14, 25, 31, 32, and 35.

Although a description is given with reference to FIGS. 25, 31, 32, and 35, assuming that the horizontal axis indicates time, similar data transmission can be carried out even if the horizontal axis indicates frequency (carrier). Note that when the horizontal axis indicates frequency (carrier), the base station transmits data symbols using one or more carriers or subcarriers.

Supplementary Note 3

In a time period in which the base station transmits #1 symbol group 901-1 for stream 1, #2 symbol group 901-2 for stream 1, #3 symbol group 901-3 for stream 1, #1 symbol group 902-1 for stream 2, and #2 symbol group 902-2 for stream 2, and #3 symbol group 902-3 for stream 2 are transmitted as shown in the frame configuration in FIG. 9, the base station may transmit another symbol group using a transmission beam different from "a transmission beam for #1 symbol group 901-1 for stream 1, a transmission beam for #2 symbol group 901-2 for stream 1, a transmission beam for #3 symbol group 901-3 for stream 1, a transmission beam for #1 symbol group 902-1 for stream 2, a transmission beam for #2 symbol group 902-2 for stream 2, and a transmission beam for #3 symbol group 902-3 for stream 2".

The base station in FIG. 3 may generate a transmission beam for the above "other symbol group" through "signal processing by signal processor 102 and signal processing by weighting synthesizer 301" or "signal processing by signal processor 102 or signal processing by weighting synthesizer 301".

Further, in a time period in which the base station transmits #1 symbol group 1401-1 for modulated signal 1, #2 symbol group 1401-2 for modulated signal 1, #3 symbol group 1401-3 for modulated signal 1, #1 symbol group 1402-1 for modulated signal 2, #2 symbol group 1402-2 for modulated signal 2, and #3 symbol group 1402-3 for modulated signal 2 as shown in the frame configuration in FIG. 14, the base station may transmit another symbol group using a transmission beam different from "a transmission beam for #1 symbol group 1401-1 for modulated signal 1, a transmission beam for #2 symbol group 1401-2 for modulated signal 1, a transmission beam for #3 symbol group 1401-3 for modulated signal 1, a transmission beam for #1 symbol group 1402-1 for modulated signal 2, a transmission beam for #2 symbol group 1402-2 for modulated signal 2, and a transmission beam for #3 symbol group 1402-3 for modulated signal 2".

At this time, the "other symbol group" may be a symbol group which includes a data symbol addressed to a certain terminal, may be a symbol group which includes a control information symbol group, or may be a symbol group which includes another data symbol for multicasting, as described in other portions of the present disclosure.

The base station in FIG. 3 may generate a transmission beam for the above "other symbol group" through "signal processing by signal processor 102 and signal processing by weighting synthesizer 301" or "signal processing by signal processor 102 or signal processing by weighting synthesizer 301".

Supplementary Note 4

In time periods in which a base station transmits stream 1-1 data symbol (1) 2501-1-1, stream 1-1 data symbol (2) 2501-1-2, and stream 1-1 data symbol (3) 2501-1-3 as shown in the frame configuration in FIG. 25, the base station may transmit another symbol group using a transmission beam different from "transmission beams for transmitting stream 1-1 data symbol (1) 2501-1-1, stream 1-1 data symbol (2) 2501-1-2, and stream 1-1 data symbol (3) 2501-1-3".

Note that the same also applies to the case where the horizontal axis indicates frequency in FIG. 25, and in time periods in which the base station transmits stream 1-1 data symbol (1) 2501-1-1, stream 1-1 data symbol (2) 2501-1-2, and stream 1-1 data symbol (3) 2501-1-3, the base station may transmit another symbol group using a transmission beam different from "transmission beams for transmitting stream 1-1 data symbol (1) 2501-1-1, stream 1-1 data symbol (2) 2501-1-2, and stream 1-1 data symbol (3) 2501-1-3.

In time periods in which the base station transmits stream 1-1 data symbol (M) 2501-1-M, stream 1-1 data symbol (M+1) 2501-1 M+1, and stream 1-1 data symbol (M+2) 2501-1-M+2 as shown in the frame configuration in FIGS. 31 and 32, the base station may transmit another symbol group using a transmission beam different from "transmission beams for transmitting stream 1-1 data symbol (M) 2501-1-M, stream 1-1 data symbol (M+1) 2501-1 M+1, and stream 1-1 data symbol (M+2) 2501-1-M+2.

Note that the same also applies to the case where the horizontal axis indicates frequency in FIGS. 31 and 32, and in time periods in which the base station transmits stream 1-1 data symbol (M) 2501-1-M, stream 1-1 data symbol (M+1) 2501-1 M+1, and stream 1-1 data symbol (M+2) 2501-1-M+2, the base station may transmit another symbol group using a transmission beam different from "transmission beams for transmitting stream 1-1 data symbol (M) 2501-1-M, stream 1-1 data symbol (M+1) 2501-1 M+1, and stream 1-1 data symbol (M+2) 2501-1-M+2.

In time periods in which the base station transmits stream 1-2 data symbol (1) 3101-1, stream 1-2 data symbol (2) 3101-2, and stream 1-2 data symbol (3) 3101-3 as shown in the frame configuration in FIGS. 31 and 32, the base station may transmit another symbol group using a transmission beam different from "transmission beams for transmitting stream 1-2 data symbol (1) 3101-1, stream 1-2 data symbol (2) 3101-2, and stream 1-2 data symbol (3) 3101-3.

Note that in FIGS. 31 and 32, the same also applies to the case where the horizontal axis indicates frequency in FIGS. 31 and 32, and in time periods in which the base station transmits stream 1-2 data symbol (1) 3101-1, stream 1-2 data symbol (2) 3101-2, and stream 1-2 data symbol (3) 3101-3, the base station may transmit another symbol group using a transmission beam different from transmission beams for transmitting "stream 1-2 data symbol (1) 3101-1, stream 1-2 data symbol (2) 3101-2, and stream 1-2 data symbol (3) 3101-3".

In time periods in which the base station transmits stream 1-1 data symbol (M) 2501-1-M, stream 1-1 data symbol (M+1) 2501-M+1, and stream 1-1 data symbol (M+2) 2501-M+2 as shown in the frame configuration in FIG. 35, the base station may transmit another symbol group using a transmission beam different from "transmission beams for transmitting "stream 1-1 data symbol (M) 2501-1-M, stream 1-1 data symbol (M+1) 2501-M+1, and stream 1-1 data symbol (M+2) 2501-M+2".

Note that the same also applies to the case where the horizontal axis indicates frequency, and in time periods in which the base station transmits stream 1-1 data symbol (M) 2501-1-M, stream 1-1 data symbol (M+1) 2501-M+1, and stream 1-1 data symbol (M+2) 2501-M+2, the base station may transmit another symbol group using a transmission beam different from "transmission beams for transmitting stream 1-1 data symbol (M) 2501-1-M, stream 1-1 data symbol (M+1) 2501-M+1, and stream 1-1 data symbol (M+2) 2501-M+2".

In time periods in which the base station transmits stream 1-2 data symbol (N) 3101-N, stream 1-2 data symbol (N+1) 3101-N+1, and stream 1-2 data symbol (N+2) 3101-N+2 as shown in the frame configuration in FIG. 35, the base station may transmit another symbol group using a transmission beam different from "transmission beams for transmitting stream 1-2 data symbol (N) 3101_N, stream 1-2 data symbol (N+1) 3101_N+1, and stream 1-2 data symbol (N+2) 3101_N+2".

Note that the same also applies to the case where the horizontal axis indicates frequency in FIG. 35, and in time periods in which the base station transmits stream 1-2 data symbol (N) 3101-N, stream 1-2 data symbol (N+1) 3101-N+1, and stream 1-2 data symbol (N+2) 3101-N+2, the base station may transmit another symbol group using a transmission beam different from "transmission beams for transmitting stream 1-2 data symbol (N) 3101-N, stream 1-2 data symbol (N+1) 3101-N+1, and stream 1-2 data symbol (N+2) 3101-N+2".

In time periods in which the base station transmits stream 2-1 data symbol (1) 3501-1, stream 2-1 data symbol (2) 3501-2, and stream 2-1 data symbol (3) 3501-3 as shown in the frame configuration in FIG. 35, the base station may transmit another symbol group using a transmission beam different from "transmission beams for transmitting stream 2-1 data symbol (1) 3501-1, stream 2-1 data symbol (2) 3501-2, and stream 2-1 data symbol (3) 3501-3".

Note that the same also applies to the case where the horizontal axis indicates frequency in FIG. 35, and in time periods in which the base station transmits stream 2-1 data symbol (1) 3501-1, stream 2-1 data symbol (2) 3501-2, and stream 2-1 data symbol (3) 3501-3, the base station may transmit another symbol group using a transmission beam different from "transmission beams for transmitting stream 2-1 data symbol (1) 3501-1, stream 2-1 data symbol (2) 3501-2, and stream 2-1 data symbol (3) 3501-3".

In the above, the "other symbol group" may be a symbol group which includes a data symbol addressed to a certain terminal, or may be a symbol group which includes a control information symbol or a symbol group which includes another data symbol for multicasting, as described in other portions of the specification.

At this time, the base station in FIG. 1 may generate a transmission beam for the above "other symbol group" through signal processing by signal processor 102, or may generate a transmission beam for the above "other symbol group" by selecting antennas from antenna unit 106-1 to antenna unit 106-M.

The base station in FIG. 3 may generate a transmission beam for the above "other symbol group" through "signal processing by signal processor 102 and signal processing by weighting synthesizer 301" or "signal processing by signal processor 102 or signal processing by weighting synthesizer 301".

Then, unicast transmitting sections 2503-1 and 2503-2 as illustrated in FIGS. 25, 31, and 32 may not be set.

Supplementary Note 5

A description with regard to FIGS. 31 and 32 includes the statement as follows.

"Stream 1-1 data symbol (M) (for multicasting)" 2501-1-M, "stream 1-1 data symbol (M+1) (for multicasting)" 2501-1-M+1, "stream 1-1 data symbol (M+2) (for multicasting)" 2501-1-M+2, "stream 1-2 data symbol (1) (for multicasting)" 3101-1, "stream 1-2 data symbol (2) (for multicasting)" 3101-2, and "stream 1-2 data symbol (3) (for multicasting)" 3101-3 are all data symbols for transmitting "stream 1".

A terminal can obtain "data of stream 1" by obtaining "data symbols for stream 1-1". Furthermore, a terminal can obtain "data of stream 1" by obtaining "data symbols for stream 1-2".

A description with regard to FIG. 35 includes the following statement.

"Stream 1-1 data symbol (M) (for multicasting)" 2501-1-M, "stream 1-1 data symbol (M+1) (for multicasting)" 2501-1-M+1, "stream 1-1 data symbol (M+2) (for multicasting)" 2501-1-M+2, "stream 1-2 data symbol (N) (for multicasting)" 3101-N, "stream 1-2 data symbol (N+1) (for multicasting)" 3101-N+1, and "stream 1-2 data symbol (N+2) (for multicasting)" 3101-N+2 are all data symbols to transmit "stream 1".

A terminal can obtain "data of stream 1" by obtaining "data symbols for stream 1-1". Furthermore, a terminal can obtain "data of stream 1" by obtaining "data symbols for stream 1-2".

The following gives a supplementary description with regard to the above. For example, in FIG. 35, the above can be achieved using <method 1-1>, <method 1-2>, <method 2-1>, or <method 2-2> as below.

<Method 1-1>
Stream 1-1 data symbol (M) 2501-1-M and stream 1-2 data symbol (N) 3101-N include the same data.
Then, stream 1-1 data symbol (M+1) 2501-1-M+1 and stream 1-2 data symbol (N+1) 3101-N+1 include the same data.
Stream 1-1 data symbol (M+2) 2501-1-M+2 and stream 1-2 data symbol (N+2) 3101-N+2 include the same data.

<Method 1-2>
Stream 1-2 data symbol (L) 3101-L which includes the same data as the data included in stream 1-1 data symbol (K) 2501-1-K is present. Note that K and L are integers.

<Method 2-1>
Stream 1-1 data symbol (M) 2501-1-M and stream 1-2 data symbol (N) 3101-N include the same data in part.
Then, stream 1-1 data symbol (M+1) 2501-1-M+1 and stream 1-2 data symbol (N+1) 3101-N+1 include the same data in part.
Stream 1-1 data symbol (M+2) 2501-1-M+2 and stream 1-2 data symbol (N+2) 3101-N+2 include the same data in part.

<Method 2-2>
Stream 1-2 data symbol (L) 3101-L which includes a part of data included in stream 1-1 data symbol (K) 2501-1-K is present. Note that K and L are integers.

Specifically, a first base station or a first transmission system generates a first packet group which includes data of a first stream, and a second packet group which includes data of the first stream, transmits a packet included in the first packet group in a first period using a first transmission beam, and transmits a packet included in the second packet group in a second period using a second transmission beam different from the first transmission beam. The first period and the second period do not overlap.

Here, the second packet group may include a second packet which includes data same as data included in a first packet included in the first packet group. As a configuration different from the above, the second packet group may include a third packet which includes data same as a part of the data included in the first packet included in the first packet group.

The first transmission beam and the second transmission beam may be transmission beams transmitted using the same antenna unit and having different directivities, or may be transmission beams transmitted using different antenna units.

In addition to the configuration of the first base station or the first transmission system, a second base station or a second transmission system further generates a third packet group which includes data of the first stream, and transmits a packet included in the third packet group in a third period using a third transmission beam different from the first transmission beam and the second transmission beam. The third period does not overlap the first period and the second period.

Here, the second base station or the second transmission system may repeatedly set the first period, the second period, and the third period in a predetermined order.

Further, in addition to the configuration of the first base station or the first transmission system, the third base station or the third transmission system further generates a third packet group which includes data of the first stream, and transmits a packet included in the third packet group in the third period using the third transmission beam different from the first transmission beam and the second transmission beam. At least a portion of the third period overlaps the first period.

Here, the third base station or the third transmission system may repeatedly set the first period, the second period, and the third period, the third periods repeatedly set may each at least partially overlap the first period, or at least one of the third periods repeatedly set may not overlap the first period(s).

Further, in addition to the configuration of the first base station or the first transmission system, a fourth base station or a fourth transmission system further generates a fourth packet which includes data of a second stream, and transmits the fourth packet in a fourth period using a fourth transmission beam different from the first transmission beam. At least a portion of the fourth period overlaps the first period.

Note that the first period and the second period do not overlap in the above description, yet the first period and the second period may partially overlap, the entire first period may overlap the second period, or the entire first period may overlap the entire second period.

A fifth base station or a fifth transmission system may generate one or more packet groups each of which includes data of the first stream, transmit the one or more packet groups using a different transmission beam for each packet group, and increase or decrease the number of packet groups to be generated, based on a signal transmitted from a terminal.

Note that the above describes "streams", yet as described in other portions of the specification, "stream 1-1 data symbol (M) 2501-1-M, stream 1-1 data symbol (M+1) 2501-1-M+1, stream 1-1 data symbol (M+2) 2501-1-M+2, stream 1-2 data symbol (1) 3101-1, stream 1-2 data symbol (2) 3101-2, and stream 1-2 data symbol (3) 3101-3" in FIGS. 31 and 32, and "stream 1-1 data symbol (M) 2501-1-M, stream 1-1 data symbol (M+1) 2501-1-M+1, stream 1-1 data symbol (M+2) 2501-1-M+2, stream 1-2 data symbol (N) 3101-N, stream 1-2 data symbol (N+1) 3101-N+1, and stream 1-2 data symbol (N+2) 3101-N+2" in FIGS. 31 and 32 may be symbols which include data symbols addressed to a certain terminal, symbols which include a control information symbol, or symbols which include a data symbol for multicasting.

Supplementary Note 6

As a matter of course, the present disclosure may be carried out by combining a plurality of the exemplary embodiments and other contents such as supplementary notes described herein.

As the configuration of the base station, the examples of the configuration are not limited to those in FIGS. 1 and 3, and as long as the base station includes a plurality of transmission antennas and generates and transmits a plurality of transmission beams (transmission directivity beams), the present disclosure can be carried out with such a base station.

Moreover, the exemplary embodiments are mere examples. For example, while a "modulating method, an error correction coding method (an error correction code, a code length, a coding rate and the like to be used), control information and the like" are exemplified, it is possible to carry out the present disclosure with the same configuration even when other types of "a modulating method, an error correction coding method (an error correction code, a code length, a coding rate and the like to be used), control information and the like" are applied.

As for a modulating method, even when a modulating method other than the modulating methods described herein is used, it is possible to carry out the exemplary embodiments and the other contents described herein. For example, APSK (such as 16APSK, 64APSK, 128APSK, 256APSK, 1024APSK, and 4096APSK), PAM (such as 4PAM, 8PAM, 16PAM, 64PAM, 128PAM, 256PAM, 1024PAM and 4096PAM), PSK (such as BPSK, QPSK, 8PSK, 16PSK, 64PSK, 128PSK, 256PSK, 1024PSK and 4096PSK), and QAM (such as 4QAM, 8QAM, 16QAM, 64QAM, 128QAM, 256QAM, 1024QAM and 4096QAM) may be applied, or in each modulating method, uniform mapping or non-uniform mapping may be performed. Moreover, a method for arranging signal points, such as 2 signal points, 4 signal points, 8 signal points, 16 signal points, 64 signal points, 128 signal points, 256 signal points, and 1024 signal points on an I-Q plane (a modulating method having signal points such as 2 signal points, 4 signal points, 8 signal points, 16 signal points, 64 signal points, 128 signal points, 256 signal points, and 1024 signal points) is not limited to a signal point arranging method of the modulating methods described herein.

Herein, it can be considered that communication/broadcast apparatuses, such as a broadcast station, a base station, an access point, a terminal, and a mobile phone, each include the transmitting device. In this case, it can be considered that communication apparatuses, such as a television, a radio, a terminal, a personal computer, a mobile phone, an access point, and a base station, each include the receiving device. Moreover, it can be also considered that each of the transmitting device and the receiving device according to the present disclosure is an apparatus having communication functions and has a form connectable via any interface to devices for running applications such as a television, a radio, a personal computer, and a mobile phone. Moreover, in the present exemplary embodiment, symbols other than data symbols, for example, pilot symbols (such as preambles, unique words, postambles, and reference symbols), and control information symbols may be arranged in frames in any way. Then, these symbols are named a pilot symbol and a control information symbol here, but may be named in any way, and a function itself is important.

Moreover, the pilot symbol only needs to be a known symbol modulated by using PSK modulation in a transmitting device and a receiving device. The receiving device performs frequency synchronization, time synchronization, channel estimation of each modulated signal (estimation of CSI (Channel State Information)), signal detection, and the like by using this symbol. Alternatively, the pilot symbol may allow the receiving device to learn a symbol transmitted by the transmitting device by establishing synchronization.

Moreover, the control information symbol is a symbol for transmitting information that is used for realizing communication other than communication for data (data of an application, for instance) and that is to be transmitted to a communicating party (for example, a modulating method used for communication, an error correction coding method, a coding rate of the error correction coding method, setting information in an upper layer, and the like).

Note that the present disclosure is not limited to the exemplary embodiments, and can be carried out with various modifications. For example, the case where the present disclosure is performed as a communication apparatus is described in the exemplary embodiments. However, the present disclosure is not limited to this case, and this communication method can also be used as software.

Note that a program for executing the above-described communication method may be stored in a ROM in advance, and a CPU may be caused to operate this program.

Moreover, the program for executing the communication method may be stored in a computer-readable storage medium, the program stored in the recording medium may be recorded in a RAM of a computer, and the computer may be caused to operate according to this program.

Then, the configurations of the above-described exemplary embodiments, for instance, may be each realized as an LSI (Large Scale Integration) which is typically an integrated circuit having an input terminal and an output terminal. The configurations may be separately formed as one chip, or all or at least one of the configurations of the exemplary embodiments may be formed as one chip. The LSI is described here, but the integrated circuit may also be referred to as an IC (Integrated Circuit), a system LSI, a super LSI, or an ultra LSI, depending on a degree of integration. Moreover, a circuit integration technique is not limited to the LSI, and may be realized by a dedicated circuit or a general purpose processor. After manufacturing of the LSI, a programmable FPGA (Field Programmable Gate Array) or a reconfigurable processor which is reconfigurable in connection or settings of circuit cells inside the LSI may be used. Further, when development of a semiconductor technology or another derived technology provides a circuit integration technology which replaces the LSI, as a matter of course, functional blocks may be integrated by using this technology. Application of biotechnology, for instance, is one such possibility.

Various frame configurations have been described herein. For example, the base station (AP) which includes the transmitting device in FIG. 1 transmits a modulated signal having a frame configuration described herein, using a multi-carrier method such as an OFDM method. At this time, it is conceivable to apply a method in which when a terminal (user) communicating with the base station (AP) transmits a modulated signal, the modulated signal may be transmitted by the terminal according to a single carrier method (the base station (AP) can simultaneously transmit data symbol groups to a plurality of terminals using the OFDM method, and the terminal can reduce power consumption by using a single carrier method).

A time division duplex (TDD) method in which a terminal transmits a modulation signal, using a portion of a frequency band used for a modulated signal transmitted by the base station (AP) may be applied.

The configuration of antenna units 106-1, 106-2, . . . , and 106-M in FIG. 1 is not limited to the configurations described in the embodiments. For example, antenna units 106-1, 106-2, . . . , and 106-M may not each include a plurality of antennas, and may not receive an input of signal 159.

The configuration of antenna units 401-1, 401-2, . . . , and 401-N in FIG. 4 is not limited to the configuration described in the embodiments. For example, antenna units 401-1, 401-2, . . . , and 401-N may not each include a plurality of antennas, and may not receive an input of signal 410.

Supplementary Description

The following gives supplementary description of the transmitting device, the receiving device, the transmitting method, and the receiving method according to the present disclosure.

A transmitting device according to an aspect of the present disclosure is a transmitting device which includes a plurality of transmission antennas, the transmitting device including: a signal processor which generates a first baseband signal by modulating data of a first stream, and a second baseband signal by modulating data of a second stream; and a transmitter which generates, from the first baseband signal, a plurality of first transmission signals having different directivities, generates, from the second baseband signal, a plurality of second transmission signals having different directivities, and transmits the plurality of first transmission signals and the plurality of second transmission signals at a same time.

Each transmission signal of the plurality of first transmission signals and the plurality of second transmission signals may include a control signal for notifying which one of the data of the first stream and the data of the second stream the transmission signal is for transmitting.

Each of the plurality of first transmission signals and the plurality of second transmission signals may include a training signal for a receiving device to perform directivity control.

A receiving device according to an aspect of the present disclosure is a receiving device which includes a plurality of receiving antennas, the receiving device including: a receiver which selects at least one first signal and at least one second signal from among a plurality of first signals for transmitting data of a first stream and a plurality of second signals for transmitting data of a second stream, and performs directivity control for receiving the at least one first signal selected and the at least one second signal selected, to receive the at least one first signal and the at least one second signal, the plurality of first signals and the plurality of second signals having different directivities and being transmitted by a transmitting device at a same time; and a signal processor which demodulates the at least one first signal received and the at least one second signal received, and outputs the data of the first stream and the data of the second stream.

The receiver may select the at least one first signal and the at least one second signal, based on a control signal included in each of a plurality of signals to be received, the control signal being for notifying which one of the data of the first stream and the data of the second stream the signal is for transmitting.

The receiver may perform the directivity control using a training signal included in each of a plurality of signals to be received.

A transmitting method according to an aspect of the present disclosure is a transmitting method performed by a transmitting device which includes a plurality of transmission antennas, the transmitting method including: signal generating processing of generating a first baseband signal by modulating data of a first stream, and a second baseband signal by modulating data of a second stream; and transmission processing of generating, from the first baseband signal, a plurality of first transmission signals having different directivities, generating, from the second baseband signal, a plurality of second transmission signals having different directivities, and transmitting the plurality of first transmission signals and the plurality of second transmission signals at a same time.

A receiving method according to an aspect of the present disclosure is a receiving method performed by a receiving device which includes a plurality of receiving antennas, the receiving method including: receiving processing of selecting at least one first signal and at least one second signal from among a plurality of first signals for transmitting data of a first stream and a plurality of second signals for transmitting data of a second stream, and performing directivity control for receiving the at least one first signal selected and the at least one second signal selected, to receive the at least one first signal and the at least one second signal, the plurality of first signals and the plurality of second signals having different directivities and being transmitted by a transmitting device at a same time; and signal processing of demodulating the at least one first signal received and the at least one second signal received, and outputting the data of the first stream and the data of the second stream.

The present disclosure provides possibility of expanding a communication range in multicast/broadcast communication in which a plurality of streams are used, compared with the case where an antenna having a quasi-omni pattern is used.

INDUSTRIAL APPLICABILITY

The present disclosure is useful in communication in which a plurality of antennas are used.

REFERENCE MARKS IN THE DRAWINGS 700 base station
701 antenna
702, 703 transmission beam
704 terminal
705, 706 receiving directivity

The invention claimed is:

1. A transmitting device comprising:
a signal processor configured to generate N baseband signals from N respective data streams, the N respective data streams being generated from multicast data, N being an integer greater than 1; and
a transmitter configured to perform directivity control on the N baseband signals to generate transmission signals such that the transmission signals are transmitted simultaneously through transmission antennas to provide N beam groups of the N respective data streams,
wherein beams in each beam group of the N beam groups have different directivities and carry a corresponding data stream which corresponds to the each beam group, and
wherein each of the beams in the N beam groups carries first information indicating that the multicast data is derived from the N respective data streams.

2. The transmitting device according to claim 1, wherein each of the beams in the N beam groups carries second information indicating which data stream among the N respective data streams is carried in the beam.

3. A receiving device comprising:
a receiver comprising reception antennas via which transmission signals are to be received, the receiver being configured to perform directivity control on the transmission signals to generate at least one baseband signal of at least one data stream, the transmission signals having been transmitted simultaneously through transmission antennas to provide N beam groups of N respective data streams, N baseband signals having been generated from the N respective data streams, beams in each beam group of the N beam groups having different directivities and carrying a corresponding data stream which corresponds to the each beam group, N being an integer greater than 1; and a signal processor configured to derive first information (i) which is carried by at least one of the beams corresponding to the at least one data stream and (ii) which indicates that multicast data is derived from the N respective data streams, the signal processor being configured to control the receiver to perform another directivity control on the transmission signals to receive the N data streams simultaneously.

4. The receiving device according to claim 3, wherein each of the beams in the N beam groups includes second information indicating which data stream among the N respective data streams is carried in the beam.

5. A transmitting method comprising:

generating N baseband signals from N respective data streams, the N respective data streams being generated from multicast data, N being an integer greater than 1; and performing directivity control on the N baseband signals to generate transmission signals such that the transmission signals are transmitted simultaneously through transmission antennas to provide N beam groups of the N respective data streams, wherein beams in each beam group of the N beam groups have different directivities and carry a corresponding data stream which corresponds to the each beam group, and wherein each of the beams in the N beam groups carries first information indicating that the multicast data is derived from the N respective data streams.

6. A receiving method comprising:

receiving transmission signals via reception antennas;

performing directivity control on the transmission signals to generate at least one baseband signal of at least one data stream, the transmission signals having been transmitted simultaneously through transmission antennas to provide N beam groups of N respective data streams, N baseband signals having been generated from the N respective data streams, beams in each beam group of the N beam groups having different directivities and carrying a corresponding data stream which corresponds to the each beam group, N being an integer greater than 1;

deriving first information (i) which is carried by at least one of the beams corresponding to the at least one data stream and (ii) which indicates that multicast data is derived from the N respective data streams; and performing another directivity control on the transmission signals to receive the N respective data streams simultaneously.

* * * * *